(12) United States Patent
Gentry et al.

(10) Patent No.: US 8,532,289 B2
(45) Date of Patent: Sep. 10, 2013

(54) FAST COMPUTATION OF A SINGLE COEFFICIENT IN AN INVERSE POLYNOMIAL

(75) Inventors: Craig B. Gentry, New York, NY (US); Shai Halevi, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 13/205,795

(22) Filed: Aug. 9, 2011

(65) Prior Publication Data

US 2012/0039465 A1    Feb. 16, 2012

Related U.S. Application Data

(60) Provisional application No. 61/374,152, filed on Aug. 16, 2010.

(51) Int. Cl.
*H04L 29/06* (2006.01)
(52) U.S. Cl.
USPC .......... 380/44; 380/45; 380/46; 380/47; 380/30; 380/56; 380/57; 380/58; 380/277; 380/278; 380/279; 380/280; 380/281; 380/282; 380/283; 380/284; 380/285; 380/286; 708/490; 708/491; 708/492

(58) Field of Classification Search
USPC .............. 708/490–492; 380/44–47
See application file for complete search history.

(56) References Cited

U.S. PATENT DOCUMENTS

| | | | |
|---|---|---|---|
| 4,405,829 A | 9/1983 | Rivest et al. | 380/30 |
| 7,054,444 B1 | 5/2006 | Paillier | 380/30 |
| 7,089,276 B2 * | 8/2006 | Miller et al. | 708/492 |
| 7,500,111 B2 | 3/2009 | Hacigumus et al. | 713/193 |
| 7,640,432 B2 | 12/2009 | Gennaro et al. | |
| 7,856,100 B2 | 12/2010 | Wang et al. | |
| 7,869,598 B2 | 1/2011 | Kerschbaum | |
| 7,877,410 B2 | 1/2011 | Staddom et al. | |
| 8,311,213 B2 * | 11/2012 | Rane et al. | 380/28 |

(Continued)

OTHER PUBLICATIONS

Yumiko, et al, "Identity-Based Hierarchical Strongly key-insulated Encryption and its application", 2005, International Association for cryptography research.*

(Continued)

*Primary Examiner* — Taghi Arani
*Assistant Examiner* — Josnel Jeudy
(74) *Attorney, Agent, or Firm* — Harrington & Smith

(57) ABSTRACT

In one exemplary embodiment of the invention, a method for computing a resultant and a free term of a scaled inverse of a first polynomial v(x) modulo a second polynomial $f_n(x)$, including: receiving the first polynomial v(x) modulo the second polynomial $f_n(x)$, where the second polynomial is of a form $f_n(x)=x^n \pm 1$, where $n=2^k$ and k is an integer greater than 0; computing lowest two coefficients of a third polynomial g(z) that is a function of the first polynomial and the second polynomial, where $$g(z) \stackrel{def}{=} \prod_{i=0}^{n-1} (v(\rho_i) - z),$$

where $\rho_0, \rho_1, \ldots, \rho_{n-1}$ are roots of the second polynomial $f_n(x)$ over a field; outputting the lowest coefficient of g(z) as the resultant; and outputting the second lowest coefficient of g(z) divided by n as the free term of the scaled inverse of the first polynomial v(x) modulo the second polynomial $f_n(x)$.

15 Claims, 8 Drawing Sheets

(56) References Cited

U.S. PATENT DOCUMENTS

| | | |
|---|---|---|
| 2002/0103999 A1 | 8/2002 | Camnisch et al. |
| 2002/0164035 A1 | 11/2002 | Yokota et al. |
| 2003/0172262 A1 | 9/2003 | Curry |
| 2005/0120233 A1 | 6/2005 | Halcrow et al. |
| 2005/0193048 A1 | 9/2005 | Vaudenay et al. ............ 708/400 |
| 2006/0262933 A1 | 11/2006 | Furukawa |
| 2007/0005594 A1* | 1/2007 | Pinkas et al. ...................... 707/6 |
| 2008/0226066 A1 | 9/2008 | Yi et al. |
| 2008/0294909 A1 | 11/2008 | Ostrovsky et al. ............ 713/189 |
| 2009/0062942 A1 | 3/2009 | Smaragdis et al. ............. 700/94 |
| 2009/0103721 A1 | 4/2009 | Sada et al. ...................... 380/42 |
| 2009/0138459 A1 | 5/2009 | Walter et al. |
| 2009/0268908 A1 | 10/2009 | Bikel et al. .................... 380/255 |
| 2009/0327748 A1 | 12/2009 | Agrawal et al. ............... 713/189 |
| 2010/0329448 A1 | 12/2010 | Rane et al. ...................... 380/28 |
| 2011/0099385 A1* | 4/2011 | Takahashi ..................... 713/189 |
| 2011/0110525 A1 | 5/2011 | Gentry ........................... 380/285 |
| 2012/0039473 A1 | 2/2012 | Gentry et al. ................. 380/277 |
| 2012/0066510 A1 | 3/2012 | Weinman ....................... 713/189 |

OTHER PUBLICATIONS

Gama, Nicolas, et al., "Predicting Lattice Reduction", In Advances in Cryptology—EUROCRYPT '08, vol. 4965 of Lecture Notes in Computer Science, pp. 31-51, 2008.

Gentry, Craig, "Toward Basing Fully Homomorphic Encryption on Worst-Case Hardness", In Advances in Cryptology—CRYPTO '10, vol. 6223 of Lecture Notes in Computer Science, 22 pgs., 2010.

Goldreich, Oded, et al., "Public-Key Cryptosystems from Lattice Reduction Problems", In Advances in Cryptology—CRYPTO '97, vol. 1294 of Lecture notes in Computer Science, pp. 112-131, 1997.

Lyubashevsky, Vadim, et al., On Ideal Lattices and Learning with Errors Over Rings. In Advances in Cryptology—EUROCRYPT '10, vol. 6110 of Lecture Notes in Computer Science, pp. 1-23, 2010.

Micciancio, Daniels, "Improving Lattice Based Cryptosystems Using the Hermite Normal Form", In CaLC '01, vol. 2146 of Lecture Notes in Computer Science, pp. 126-145, 2001.

Peikert, Christ et al., "Lattices that Admit Logarithmic Worst-Case to Average-Case Connection Factors", In Proceedings of the $39_{th}$ Annual ACM Symposium on Theory of Computing STOC'07, pp. 478-487, Apr. 4, 2007.

Schnorr, C.P., "A Hierarchy of Polynomial Time Lattice Basis Reduction Algorithms", Theor. Comput. Sci., 53.201, pp. 201-224, 1987.

Schoup, NTL: A Library for doing Number Theory, http://shoup.net/ntl/; Version 5.5.2, Nov. 2010.

Smart, Nigel P., et al., "Fully Homomorphic Encryption with Relatively Small Key and Ciphertext Sizes", In Public Key Crypotography-PKC'10, vol. 6056 of Lecture Notes In Computer Science, pp. 420-443, 2010.

Stehle, Damien, et al., "Faster Fully Homomorphic Encryption", Crypotology ePrint Archive, Report 2010/399, http://eprint.iacr.org/; 25 pgs. 2010.

Applebaum, Benny, et al., "Fast Cryptographic Primitives and Circular-Secure Encryption Based on Hard Learning Problems", CRYTPO, vol. 5677 of Lecture Notes in Computer Science, pp. 595-618, 2009.

Brakerski, Zvika, et al., Efficient Fully Homomorphic Encryption from (Standard) LWE, FOCS, http://eprint.iacr.org/; 37 pgs. 2011.

Brakerski, Zvika, et al., "Fully Homomorphic Encryption from Ring-LWE and Security for Key Dependent Messages", CRYPTO, 2011, 20 pgs.

Coron, Jean-Sebastien, et al., "Fully Homomorphic Encryption over the Integers with Shorter Public Keys", CRYPTO, 2011, 24 pgs.

Gentry, Craig et al., "Fully Homomorphic Enryption without Squashing Using Depth-3 Arithmetic Circuits", FOCS, http://eprint.iacr.org/; 2011, 21 pgs.

Gentry, Craig, et al., "Implementing Gentry's Fully-Homomorphic Encryption Scheme", EUROCRYPT, vol. 0632, Lecture notes in Computer Science, 2011, pp. 129-148.

Gentry, Craig, et al., "Fully Homomorphic Encryption with Polylog Overhead", http://eprint.iacr.org/; 2011, 32 pgs.

Lauter, Kristin, et al., "Can Homomorphic Encryption be Practical?", ACM, 2011, 11 pgs.

Melchor, Carlos Aguilar, et al., "Additively Homomorphic Enryption with d-Operand Multiplications", CRYPTOm vik, 6223, Lecture Notes in Computer Science, 2010, pp. 138-154.

Regev, Oded, "The Learning with Errors Problem", IEEE, 2010, pp. 191-204.

Smart, N.P. et al., "Fully Homomorphic SIMD Operations", http://eprint.iacr.org/; 2011, 19 pgs.

Stehle, Damien, et al., "Faster Fully Homomorphic Encryption", ASIACRYPT, vol. 6477, Lecture Notes in Computer Science, 2010, pp. 377-394.

Chunsheng, Gu, "New fully Homomorphic Encryption over the Integers", School of Computer Engineering, Jiangsu Teachers Univ. of Technology, Mar. 2011, 9 pgs.

Dodis, Yevgeniy, et al., "Cryptography Against Continuous Memory Attacks", IEEE 2010, pp. 511-520.

Avanzi, Roberto M., "Fast Evaluation of Polynomials With Small Coefficients Modulo an Integer", http://caccioppoli.mac.rub.de/website/papers/trick.pdf; 2005, 5 pgs.

Gentry, Craig, et al., "Public Challenges for Fully-Homomorphic Encryption", TBA, 2010, 2 pgs.

Micciancio, Daniele, "Generalized Compact Knapsacks, Cyclic Lattices, and Efficient One-Way Functions", Computational Complexity 16(4), Dec. 2007, pp. 365-411.

Paterson, Michael S., et al., "On The Number Of Nonscalar Multiplications Necessary to Evaluate Polynomials", SIAM Journal on Computing, 2(1), pp. 60-66, 1973.

Granlund, Torbjorn, et al., "The GNU MP Multiple Precision Arithmetic Library", Version 5.0.1, Feb. 2010, 144 pgs.

Dijk et al., http://csis.bits-pilani.ac.in/faculty/murali/netsec-11/seminadrefs/jaldeepl.pdf; [online] published Jun. 2010 [retrieved on Jul. 5, 2012] Retrieved from the Internet URL: http://csis.bits-pilani.acin/faculty/murali/netsec-11/seminar/refs/jaldeepl.pdf; entire document.

U.S. Appl. No. 13/205,755, Craig B. Gentry, et al., "Fast Evaluation of Many Polynomials With Small Coefficients on the Same Point", filed Aug. 9, 2011, 104 pgs.

U.S. Appl. No. 13/205,813, Craig B. Gentry, et al., "Efficient Implementation of Fully Homomorphic Encryption", filed Aug. 9, 2011, 108 pgs.

C.A. Melchor, G. Castagnos, and P. Gaborit. Lattice-based homomorphic encryption of vector spaces. In *IEEE International Symposium on Information Theory, ISIT'2008*, pp. 1858-1862, 2008.

C.A. Melchor, P. Gaborit, and J. Herranz. Additively Homomorphic Encryption with d-Operand Multiplications. Technical Report 2008/378, IACR ePrint archive, 2008. Available at http://eprint.iacr.org/2008/378/.

M. Ajtai. Generating Hard Instances of the Short Basis Problem. *ICALP'99*, LNCS 1644, pp. 1-9, 1999.

J. Alwen and C. Peikert. Generating Shorter Bases for Hard Random Lattices. In *STACS*, pp. 75-86, 2009.

D. Boneh, E.-J. Goh, and K. Nissim. Evaluating 2-DNF Formulas on Ciphertexts. (TCC '05, LNCS 3378, pp. 325-341, 2005), 2006.

Y. Dodis, S. Goldwasser, Y. Kalai, C. Peikert, and V. Vaikuntanathan. Public-Key Encryption Schemes with Auxiliary Inputs. In *TCC*, pp. 361-381, 2010.

C. Gentry. *A Fully Homomorphic Encryption Scheme*. Dissertation, Stanford University, 2009. Available at http://crypto.stanford.edu/craig.

C. Gentry. Fully Homomorphic Encryption Using Ideal Lattices. In *Proc. of STOC '09*, pp. 169-178. ACM, 2009.

C. Gentry, C. Peikert, and V. Vaikuntanathan. Trapdoors for Hard Lattices and New Cryptographic Constructions. (In *STOC*, pp. 197-206, 2008), 2007.

A. Kawachi, K. Tanaka, and K. Xagawa. Multi-bit Cryptosystems Based on Lattice Problems. In *Public Key Cryptography (PKC'07)*, LNCS 4450, pp. 315-329. Springer, 2007.

Y. Lindell and B. Pinkas. A Proof of Yao's Protocol for Secure Two-Party Computation. (*J. Cryptology*, 22(2), 2009), 2004.

C. Peikert. Public-Key Cryptosystems from the Worst-Case Shortest Vector Problem. In *STOC'09*, pp. 333-342. ACM, 2009.

O. Regev. On Lattices, Learning with Errors, Random Linear Codes, and Cryptography. *J. ACM*, 56(6), 2009. Preliminary version in *Proc. of STOC* '05 , pp. 84-93, 2005.

T. Sander, A. Young, and M. Yung. Non-Interactive CryptoComputing for $NC^1$. In *40th Annual Symposium on Foundations of Computer Science*, pp. 554-567. IEEE, 1999.

A. C. Yao. Protocols for Secure Computations (extended abstract). In *23rd Annual Symposium on Foundations of Computer Science—FOCS '82*, pp. 160-164. IEEE, 1982.

J. Domingo-Ferrer. "A Provably Secure Additive and Multiplicative Privacy Homomorphism." Information Security. 5th International Conference, ISC 2002 Proceedings, pp. 471-483, 2002.

K. Henry. The Theory and Applications of Homomorphic Cryptography. Dissertation, University of Waterloo, 2008.

J. Black, P. Rogaway, T. Shrimpton. Encryption-Scheme Security in the Presence of Key-Dependent Messages. In Proc. of SAC '02, LNCS 2595. Springer, pp. 62-75, 2002.

M. Blaze, G. Bleumer, M. Strauss. Divertible Protocols and Atomic Proxy Cryptography. Eurocrypt '98. LNCS 1403, pp. 127-144, 1998.

D. Boneh, S. Halevi, M. Hamburg, R. Ostrovsky. Circular-Secure Encryption from Decision Diffe-Hellman. In Proc. of Crypto '08, LNCS 5157, pp. 108-125, 2008.

R. Canetti, O. Goldreich, S. Halevi. The Random Oracle Methodology, Revisited. (Extended abstract in *Proc. of the 30th ACM Symp. on Theory of Computing (STOC)*, pp. 209-218, 1998), 2002.

Y. Ishai, A. Paskin. Evaluating Branching Programs on Encrypted Data. In Proc. of TOC '07, 2007.

M. Naor, K. Nissim. Communication Preserving Protocols for Secure Function Evaluation. In Proc. of STOC '01, pp. 590-599, 2001.

R. Ostrovsky, W.E. Skeith III. Private Searching on Streaming Data. (Preliminary Version In Proc. of Crypto '05. LNCS 3621, pp. 223-240, 2005.) *J. Cryptology*, vol. 20:4, pp. 397-430, Nov. 2006, Oct. 2007 (two versions provided).

R.L. Rivest, L. Adelman, M.L. Dertouzos. On Data Banks and Privacy Homomorphisms. In Foundations of Secure Computation, pp. 169-180, 1978.

R.L. Rivest, A. Shamir, L. Adelman. A Method for Obtaining Digital Signatures and Public-Key Cryptosystems. In Comm. of the ACM, 21.2, pp. 120-126, 1978.

IBM Researcher Solves Longstanding Cryptographic Challenge. IBM Press Release (available online), Jun. 25, 2009.

Homomorphic Encryption. IBM Research, Security (available online), Accessed Sep. 28, 2009.

Homomorphic encryption. Wikipedia, accessed Sep. 30, 2009.

U.S. Appl. No. 12/749,944, Halevi et al., "An Efficient Homomorphic Encryption Scheme for Bilinear Forms", filed Mar. 30, 2010, 61 pgs.

U.S. Appl. No. 12/590,584, Craig B. Gentry, "A Fully Homomorphic Encryption Method Based on a Bootstrappable Encryption Scheme, Computer Program and Apparatus", filed Nov. 10, 2009, 80 pgs.

R. Cramer, I. Damgaard, J.B. Nielsen. Multiparty Computation from Threshold Homomorphic Encryption. In Proc. of Crypto '01, LNCS 2045, pp. 279-298, 2001.

M. Franklin, S. Haber. Joint Encryption and Message-Efficient Secure Computation. J. Cryptology, 9(4), pp. 217-232, 1996.

O. Goldreich, S. Micali, A. Wigderson. How to Play Any Mental Game—A Completeness Theorem for Protocols with Honest Majority. J. of the ACM, vol. 38, No. 1, pp. 691-729, 1991. Preliminary Version in FOCS '86.

O. Goldreich, R. Ostrovsky. Software Protection and Simulation on Oblivious RAMs. JACM, 1996.

S. Goldwasser, Y.T. Kalai, G.N. Rothblum. One-Time Programs. In Proc. of Crypto '08. Springer, LNCS 5157, pp. 39-56, 2008.

S. Halevi, H. Krawczyk. Security Under Key-Dependent Inputs. In Proc. of ACM CCS '07, 2007.

F. Armknecht and A.-R. Sadeghi. A New Approach for Algebraically Homomorphic Encryption. Cryptology ePrint Archive: Report 2008/422, 2008.

S. Arora, C. Lund, R. Motwani, M. Sudan, and M. Szegedy. Proof Verification and the Hardness of Approximation Problems. J. of the ACM, vol. 45, No. 3, pp. 501-555, 1998.

D. Barrington. Bounded-Width Polynomial-Size Branching Programs Recognize Exactly Those Languages in $NC^1$. In Proc of STOC '86, pp. 1-5, 1986.

D. Beaver. Minimal-Latency Secure Function Evaluation. In Proc. of Eurocrypt '00, pp. 335-350. Springer, 2000.

J.D.C. Benaloh. Verifiable Secret-Ballot Elections. Ph.D. thesis, Yale Univ., Dept. of Comp. Sci., 1988.

D. Boneh, R. Lipton. Searching for Elements in Black-Box Fields and Applications. In Proc of Crypto '96, LNCS 1109, pp. 283-297. Springer, 1996.

E.F. Brickell and Y. Yacobi. On Privacy Homomorphisms. In Proc. of Eurocrypt '87, LNCS 304, pp. 117-125. Springer, 1988.

R. Canetti, S. Hohenberger. Chosen-Ciphertext Secure Proxy Re-Encryption. In Proc. of ACM CCS '07, 2007.

W. van Dam, S. Hallgren, L. Ip. Quantum Algorithms for some Hidden Shift Problems. In Proc. of SODA '03, pp. 489-498, 2003. Full version in SIAM J. Comput. 36(3): pp. 763-778, 2006.

I. Damgard, M.J. Jurik. A Length-Flexible Threshold Cryptosystem with Applications. ACISP '03, LNCS 2727, pp. 350-356, 2003.

I. Damgard, J.B. Nielsen. Universally Composable Efficient Multiparty Computation from Threshold Homomorphic Encryption. In Proc. of Crypto '03, LNCS 2729, pp. 247-264. Springer, 2003.

M. van Dijk, S. Devadas. Interval Obfuscation. To be published as an MIT-CSAIL Technical Report in 2009.

I.B. Damgard, M.J. Jurik. A Length-Flexible Threshold Cryptosystem with Applications. BRICS Report Series, RS-03-16, ISSN 0909-0878, 2003.

T. ElGamal. A Public Key Cryptosystem and a Signature Scheme Based on Discrete Logarithms. Trans. on Info. Theory, vol. IT-31, No. 4, pp. 469-472, Jul. 1985.

M.R. Fellows, N. Koblitz. Combinatorial Cryptosystems Galore! In Contemporary Mathematics, vol. 168 of Finite Fields: Theory, Applications, and Algorithms, FQ2, pp. 51-61, 1993.

S. Goldwasser, D. Kharchenko. Proof of Plaintext Knowledge for the Ajtai-Dwork Cryptosystem. In Proc. of TCC 2005, pp. 529-555, 2005.

S. Goldwasser, S. Micali. Probabilistic Encryption & How to Play Mental Poker Keeping Secret All Partial Information. In Proc of STOC '82, pp. 365-377, 1982.

J. Kilian. A Note on Efficient Zero-Knowledge Proofs and Arguments. In Proc. of STOC '92, pp. 723-732, 1992.

J. Kilian. Improved Efficient Arguments. In Proc. of Crypto '95, LNCS 963, pp. 311-324, 1995.

F. Levy-dit-Vehel and L. Perret. A Polly Cracker system based on Satisfiability. In Coding, Crypt. and Comb., Prog. in Comp. Sci. and App. Logic, v. 23, pp. 177-192, 2003.

H. Lipmaa. An Oblivious Transfer Protocol with Log-Squared Communication. In Proc. of ICS '05 pp. 314-328, 2005.

L. Van Ly. Polly Two—A Public-Key Cryptosystem based on Polly Cracker, Ph.D. thesis, Ruhr-University at Bochum, Bochum, Germany 2002.

L. Van Ly. Polly two : a new algebraic polynomial-based Public-Key Scheme. AAECC, 17: 267-283, 2006.

U. Maurer, D. Raub. Black-Box Extension Fields and the Inexistence of Field-Homomorphic One-Way Permutations. Asiacrypt '07, pp. 427-443, 2007.

D. Naccache, J. Stern. A New Public Key Cryptosystem Based on Higher Residues. ACM CCS '98, 1998.

T. Okamoto, S. Uchiyama. A New Public-Key Cryptosystem as Secure as Factoring. Eurocrypt '98, LNCS 1403, pp. 308-318, 1998.

P. Paillier. Public-Key Cryptosystems Based on Composite Degree Residuosity Classes. Eurocrypt '99, pp. 223-238, 1999.

C. Peikert, B. Waters. Lossy Trapdoor Functions and Their Applications. STOC '08, pp. 187-196, 2008.

A.C-C. Yao. How to Generate and Exchange Secrets. FOCS '86, pp. 162-167, 1986.

C. Peikert, B. Waters. Lossy Trapdoor Functions and Their Applications. (41 pp.), 2008.

* cited by examiner

| $i =$ | 1 | 2 | 3 | 4 | 5 | 6 | 7 | 8 | 9 | Max Index |
|---|---|---|---|---|---|---|---|---|---|---|
| $B = \{z_i\}$ | $z_1$ | $z_2$ | $z_3$ | $z_4$ | $z_5$ | $z_6$ | $z_7$ | $z_8$ | $z_9$ | $N$ |
| $S = \{s_j\}$ | | $s_1 = z_2$ | | | | $s_2 = z_6$ | $s_3 = z_7$ | | | $n$ |
| $\vec{\sigma} = \langle \sigma_i \rangle$ | 0 | 1 | 0 | 0 | 0 | 1 | 1 | 0 | 0 | $N$ |
| $\vec{d} = \langle d_i \rangle$ | encr(0) | encr(1) | encr(0) | encr(0) | encr(0) | encr(1) | encr(1) | encr(0) | encr(0) | $N$ |
| Part ($p_j$) | 1 | 1 | 1 | 2 | 2 | 2 | 3 | 3 | 3 | $n$ |
| $\vec{y} = \langle y_i \rangle = \langle c \times z_i \rangle$[#] | $cz_1$ | $cz_2$ | $cz_3$ | $cz_4$ | $cz_5$ | $cz_6$ | $cz_7$ | $cz_8$ | $cz_9$ | $N$ |
| $\vec{x} = \langle x_i \rangle = \langle \text{encr}(y_i \cdot \sigma_i) \rangle$[°] $\sigma_i$ = encr(0) | encr($cz_1 \cdot \sigma_1$) = encr(0) | encr($cz_2$) | encr(0) | encr(0) | encr(0) | encr($cz_6$) | encr($cz_7$) | encr(0) | encr(0) | |
| Sum $x_i$[†] | encr($cz_2 + cz_6 + cz_7$)[‡] | | | | | | | | | |

[#]Each $y_i$ is represented in binary (as a sequence of bits).
[°]Each $x_i$ is a sequence of ciphertexts with each ciphertext being an encryption of a bit from $y_i$ (as multiplied by $\sigma_i$).
[†]Not direct addition of ciphertexts.
[‡]This is a functional representation of the output. Encryptions of zero (encr(0)) are omitted for clarity.

FIG. 6

701 — PROVIDING A CIPHERTEXT COMPRISING A CIPHERTEXT ELEMENT $c$ THAT IS OBTAINED BY ENCRYPTING AT LEAST ONE BIT $b$ USING A PUBLIC KEY $h$, WHERE THE PUBLIC KEY $h$ AND A PRIVATE KEY $w$ COLLECTIVELY COMPRISE AN ENCRYPTION KEY PAIR SUCH THAT THE PRIVATE KEY $w$ ENABLES DECRYPTION OF DATA THAT HAS BEEN ENCRYPTED USING THE PUBLIC KEY $h$ TO FORM A CIPHERTEXT, WHERE THERE EXISTS A BIG SET $B$ THAT INCLUDES $N$ ELEMENTS $z_i$ SUCH THAT $B = \{z_1, z_2, ..., z_N\}$, WHERE THERE EXISTS A SMALL SET $S$ THAT INCLUDES $n$ ELEMENTS $s_j$ SUCH THAT $S = \{s_1, s_2, ..., s_n\}$, WHERE THE SMALL SET $S$ IS A SUBSET OF THE BIG SET $B$, WHERE $n < N$, WHERE $n$ IS AN INTEGER GREATER THAN ONE, WHERE SUMMING UP THE ELEMENTS $s_j$ OF THE SMALL SET $S$ YIELDS THE PRIVATE KEY $w$, WHERE THERE EXISTS A BIT VECTOR $\vec{\sigma}$ THAT INCLUDES $N$ BITS $\sigma_i$ SUCH THAT $\vec{\sigma} = \langle \sigma_1, \sigma_2, ..., \sigma_N \rangle$, WHERE FOR ALL $i$ THE BIT $\sigma_i = 1$ IF $z_i \in S$ ELSE THE BIT $\sigma_i = 0$, WHERE THERE EXISTS AN ENCRYPTED VECTOR $\vec{d}$ THAT INCLUDES $N$ CIPHERTEXTS $d_i$ SUCH THAT $\vec{d} = \langle d_1, d_2, ..., d_N \rangle$, WHERE FOR ALL $i$ THE CIPHERTEXT $d_i$ OF THE ENCRYPTED VECTOR $\vec{d}$ IS AN ENCRYPTION OF THE BIT $\sigma_i$

↓

702 — POST-PROCESSING THE PROVIDED CIPHERTEXT ELEMENT $c$ BY MULTIPLYING THE PROVIDED CIPHERTEXT ELEMENT $c$ BY ALL ELEMENTS OF THE BIG SET $B$ TO OBTAIN AN INTERMEDIATE VECTOR $\vec{y} = \langle y_1, y_2, ..., y_N \rangle$, WHERE FOR ALL $i$ THE ELEMENT $y_i$ OF THE INTERMEDIATE VECTOR $\vec{y}$ IS COMPUTED AS $y_i = c \times z_i$

↓

703 — HOMOMORPHICALLY MULTIPLYING THE ELEMENTS $y_i$ OF THE INTERMEDIATE VECTOR $\vec{y}$ BY THE CIPHERTEXTS $d_i$ IN THE ENCRYPTED VECTOR $\vec{d}$ TO OBTAIN A CIPHERTEXT VECTOR $\vec{x}$ COMPRISED OF CIPHERTEXTS, WHERE THE CIPHERTEXT VECTOR $\vec{x}$ INCLUDES $N$ CIPHERTEXT ELEMENTS $x_i$ SUCH THAT $\vec{x} = \langle x_1, x_2, ..., x_N \rangle$, WHERE FOR ALL $i$ THE CIPHERTEXT ELEMENT $x_i$ IN THE CIPHERTEXT VECTOR $\vec{x}$ IS AN ENCRYPTION OF THE PRODUCT $y_i \cdot \sigma_i$

↓

704 — HOMOMORPHICALLY SUMMING ALL OF THE CIPHERTEXT ELEMENTS $x_i$ OF THE CIPHERTEXT VECTOR $\vec{x}$ TO OBTAIN A RESULTING CIPHERTEXT THAT COMPRISES AN ENCRYPTION OF THE AT LEAST ONE BIT $b$, WHERE THE BIG SET $B$ IS PARTITIONED INTO $n$ PARTS $p_j$ WITH EACH OF THE $n$ PARTS $p_j$ HAVING A PLURALITY OF DIFFERENT ELEMENTS FROM THE BIG SET $B$, WHERE THE ELEMENTS $s_j$ OF THE SMALL SET $S$ CONSIST OF ONE ELEMENT FROM EACH OF THE $n$ PARTS $p_j$

FIG. 7

PROVIDING A CIPHERTEXT COMPRISING A CIPHERTEXT ELEMENT $c$ THAT IS OBTAINED BY ENCRYPTING AT LEAST ONE BIT $b$ USING A PUBLIC KEY $h$, WHERE THE PUBLIC KEY $h$ AND A PRIVATE KEY $w$ COLLECTIVELY COMPRISE AN ENCRYPTION KEY PAIR SUCH THAT THE PRIVATE KEY $w$ ENABLES DECRYPTION OF DATA THAT HAS BEEN ENCRYPTED USING THE PUBLIC KEY $h$ TO FORM A CIPHERTEXT, WHERE THERE EXISTS A BIG SET $B$ THAT INCLUDES $N$ ELEMENTS $z_i$ SUCH THAT $B = \{z_1, z_2, \ldots, z_N\}$, WHERE THERE EXISTS A SMALL SET $S$ THAT INCLUDES $n$ ELEMENTS $s_j$ SUCH THAT $S = \{s_1, s_2, \ldots, s_n\}$, WHERE THE SMALL SET $S$ IS A SUBSET OF THE BIG SET $B$, WHERE $n < N$, WHERE $n$ IS AN INTEGER GREATER THAN ONE, WHERE SUMMING UP THE ELEMENTS $s_j$ OF THE SMALL SET $S$ YIELDS THE PRIVATE KEY $w$, WHERE THERE EXISTS A BIT VECTOR $\vec{\sigma}$ THAT INCLUDES $N$ BITS $\sigma_i$ SUCH THAT $\vec{\sigma} = \langle \sigma_1, \sigma_2, \ldots, \sigma_N \rangle$, WHERE FOR ALL $i$ THE BIT $\sigma_i = 1$ IF $z_i \in S$ ELSE THE BIT $\sigma_i = 0$, WHERE THERE EXISTS AN ENCRYPTED VECTOR $\vec{d}$ THAT INCLUDES $N$ CIPHERTEXTS $d_i$ SUCH THAT $\vec{d} = \langle d_1, d_2, \ldots, d_N \rangle$, WHERE FOR ALL $i$ THE CIPHERTEXT $d_i$ OF THE ENCRYPTED VECTOR $\vec{d}$ IS AN ENCRYPTION OF THE BIT $\sigma_i$ — 801

↓

POST-PROCESSING THE PROVIDED CIPHERTEXT ELEMENT $c$ BY MULTIPLYING THE PROVIDED CIPHERTEXT ELEMENT $c$ BY ALL ELEMENTS OF THE BIG SET $B$ TO OBTAIN AN INTERMEDIATE VECTOR $\vec{y} = \langle y_1, y_2, \ldots, y_N \rangle$, WHERE FOR ALL $i$ THE ELEMENT $y_i$ OF THE INTERMEDIATE VECTOR $\vec{y}$ IS COMPUTED AS $y_i = c \times z_i$ — 802

↓

HOMOMORPHICALLY MULTIPLYING THE ELEMENTS $y_i$ OF THE INTERMEDIATE VECTOR $\vec{y}$ BY THE CIPHERTEXTS $d_i$ IN THE ENCRYPTED VECTOR $\vec{d}$ TO OBTAIN A CIPHERTEXT VECTOR $\vec{x}$ COMPRISED OF CIPHERTEXTS, WHERE THE CIPHERTEXT VECTOR $\vec{x}$ INCLUDES $N$ CIPHERTEXT ELEMENTS $x_i$ SUCH THAT $\vec{x} = \langle x_1, x_2, \ldots, x_N \rangle$, WHERE FOR ALL $i$ THE CIPHERTEXT ELEMENT $x_i$ IN THE CIPHERTEXT VECTOR $\vec{x}$ IS AN ENCRYPTION OF THE PRODUCT $y_i \cdot \sigma_i$ — 803

↓

HOMOMORPHICALLY SUMMING ALL OF THE CIPHERTEXT ELEMENTS $x_i$ OF THE CIPHERTEXT VECTOR $\vec{x}$ TO OBTAIN A RESULTING CIPHERTEXT THAT COMPRISES AN ENCRYPTION OF THE AT LEAST ONE BIT $b$, WHERE THE BIG SET $B$ IS COMPRISED OF $m$ GEOMETRIC PROGRESSIONS $\vec{G_k} = \langle g_l \rangle$, WHERE EACH GEOMETRIC PROGRESSION $\vec{G_k}$ COMPRISES A PLURALITY OF DIFFERENT ELEMENTS $z_i$ FROM THE BIG SET $B$, WHERE $m$ IS AN INTEGER GREATER THAN ZERO, WHERE FOR EACH GEOMETRIC PROGRESSION $\vec{G_k}$ A RATIO OF SUCCESSIVE ELEMENTS $g_l / g_{l-1}$ IS THE SAME FOR ALL $l$ — 804

FIG. 8

FAST COMPUTATION OF A SINGLE COEFFICIENT IN AN INVERSE POLYNOMIAL

CROSS-REFERENCE TO RELATED APPLICATIONS

This patent application claims priority under 35 U.S.C. §119(e) from U.S. Provisional Patent Application No. 61/374,152, filed Aug. 16, 2010, the disclosure of which is incorporated by reference herein in its entirety.

TECHNICAL FIELD

The exemplary embodiments of this invention relate generally to encryption and decryption and, more specifically, relate to various encryption and decryption techniques that may be particularly applicable for homomorphic encryption.

BACKGROUND

This section endeavors to supply a context or background for the various exemplary embodiments of the invention as recited in the claims. The content herein may comprise subject matter that could be utilized, but not necessarily matter that has been previously utilized, described or considered. Unless indicated otherwise, the content described herein is not considered prior art, and should not be considered as admitted prior art by inclusion in this section.

Encryption schemes that support operations on encrypted data (aka homomorphic encryption) have a very wide range of applications in cryptography. This concept was introduced by Rivest et al. shortly after the discovery of public key cryptography [13], and many known public-key cryptosystems support either addition or multiplication of encrypted data. However, supporting both at the same time seems harder, and until very recently attempts at constructing so-called "fully homomorphic" encryption turned out to be insecure.

BRIEF SUMMARY

In one exemplary embodiment of the invention, a method for computing a resultant and a free term of a scaled inverse of a first polynomial $v(x)$ modulo a second polynomial $f_n(x)$, comprising: receiving the first polynomial $v(x)$ modulo the second polynomial $f_n(x)$, where the second polynomial is of a form $f_n(x)=x^n \pm 1$, where $n=2^k$ and k is an integer greater than 0; computing lowest two coefficients of a third polynomial $g(z)$ that is a function of the first polynomial and the second polynomial, where $$g(z) \stackrel{def}{=} \prod_{i=0}^{n-1} (v(\rho_i) - z),$$

where $\rho_0, \rho_1, \ldots, \rho_{n-1}$ are roots of the second polynomial $f_n(x)$ over a field; outputting the lowest coefficient of $g(z)$ as the resultant; and outputting the second lowest coefficient of $g(z)$ divided by n as the free term of the scaled inverse of the first polynomial $v(x)$ modulo the second polynomial $f_n(x)$.

In another exemplary embodiment of the invention, a computer readable storage medium tangibly embodying a program of instructions executable by a machine for performing operations for computing a resultant and a free term of a scaled inverse of a first polynomial $v(x)$ modulo a second polynomial $f_n(x)$, said operations comprising: receiving the first polynomial $v(x)$ modulo the second polynomial $f_n(x)$, where the second polynomial is of a form $f_n(x)=x^n \pm 1$, where $n=2^k$ and k is an integer greater than 0; computing lowest two coefficients of a third polynomial $g(z)$ that is a function of the first polynomial and the second polynomial, where $$g(z) \stackrel{def}{=} \prod_{i=0}^{n-1} (v(\rho_i) - z),$$

where $\rho_0, \rho_1, \ldots, \rho_{n-1}$ are roots of the second polynomial $f_n(x)$ over a field; outputting the lowest coefficient of $g(z)$ as the resultant; and outputting the second lowest coefficient of $g(z)$ divided by n as the free term of the scaled inverse of the first polynomial $v(x)$ modulo the second polynomial $f_n(x)$.

In a further exemplary embodiment of the invention, an apparatus comprising: at least one storage medium configured to store a first polynomial $v(x)$ modulo a second polynomial $f_n(x)$, where the second polynomial is of a form $f_n(x)=x^n \pm 1$, where $n=2^k$ and k is an integer greater than 0; and at least one processor configured to compute a resultant and a free term of a scaled inverse of the first polynomial $v(x)$ modulo the second polynomial $f_n(x)$ by computing lowest two coefficients of a third polynomial $g(z)$ that is a function of the first polynomial and the second polynomial, where $$g(z) \stackrel{def}{=} \prod_{i=0}^{n-1} (v(\rho_i) - z),$$

where $\rho_0, \rho_1, \ldots, \rho_{n-1}$ are roots of the second polynomial $f_n(x)$ over a field; outputting the lowest coefficient of $g(z)$ as the resultant; and outputting the second lowest coefficient of $g(z)$ divided by n as the free term of the scaled inverse of the first polynomial $v(x)$ modulo the second polynomial $f_n(x)$.

BRIEF DESCRIPTION OF THE SEVERAL VIEWS OF THE DRAWINGS

The foregoing and other aspects of the exemplary embodiments of this invention are made more evident in the following Detailed Description, when read in conjunction with the attached Drawing Figures, wherein:

FIG. 6 shows a table with an example for implementing various exemplary embodiments of the invention;

FIG. 7 depicts a logic flow diagram illustrative of the operation of another exemplary method, and the operation of an exemplary computer program, in accordance with the exemplary embodiments of this invention; and FIG. 8 depicts a logic flow diagram illustrative of the operation of a further exemplary method, and the operation of an exemplary computer program, in accordance with the exemplary embodiments of this invention.

DETAILED DESCRIPTION

1 Introduction

Figure 1:
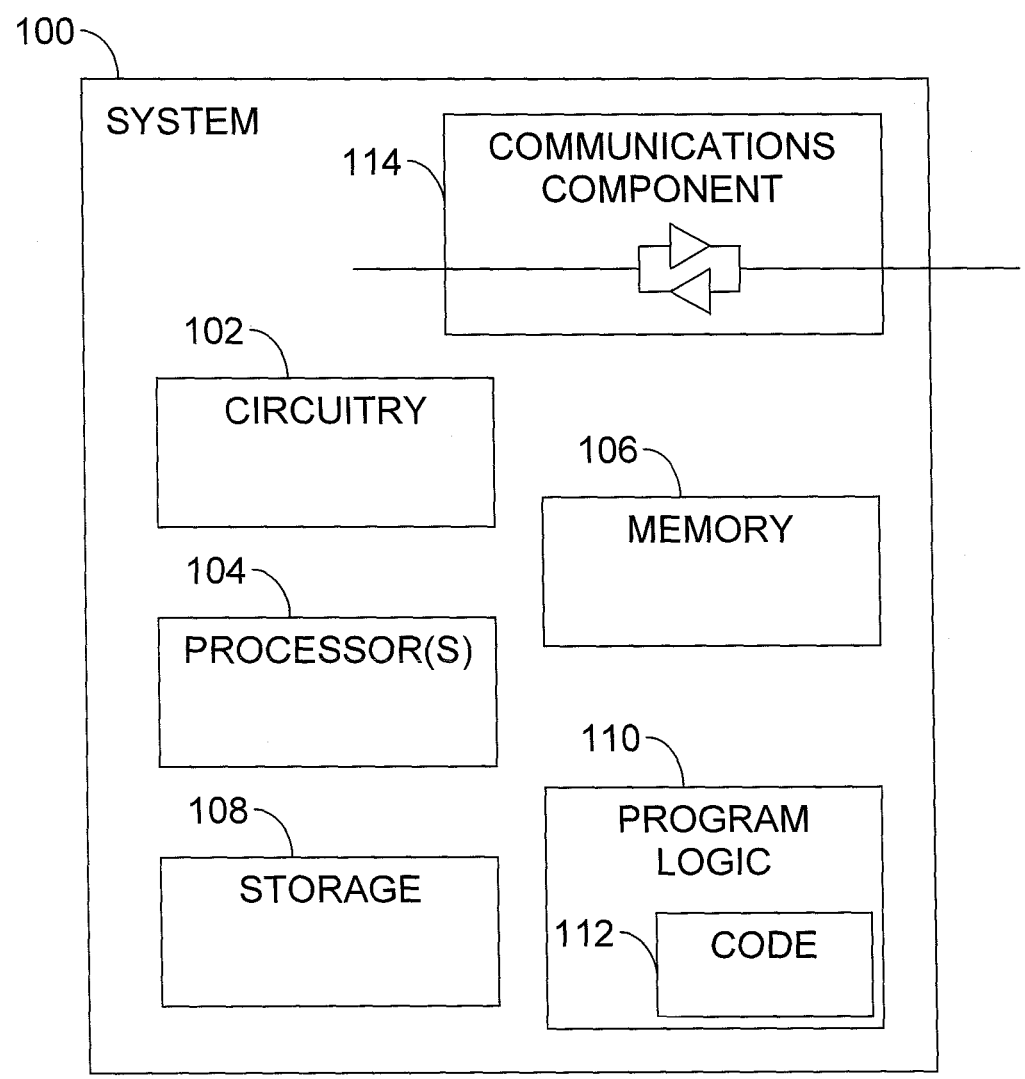
FIG. 1 illustrates a block diagram of an exemplary system in which various exemplary embodiments of the invention may be implemented.

In 2009, Gentry described the first plausible construction of a fully homomorphic cryptosystem [3]. Gentry's construction consists of several steps: He first constructed a "somewhat homomorphic" scheme that supports evaluating low-degree polynomials on the encrypted data, next he needed to "squash" the decryption procedure so that it can be expressed as a low-degree polynomial which is supported by the scheme, and finally he applied a "bootstrapping" transformation to obtain a fully homomorphic scheme. The crucial point in this process is to obtain a scheme that can evaluate polynomials of high-enough degree, and at the same time has decryption procedure that can be expressed as a polynomial of low-enough degree. Once the degree of polynomials that can be evaluated by the scheme exceeds the degree of the decryption polynomial (times two), the scheme is called "bootstrappable" and it can then be converted into a fully homomorphic scheme.

Towards a bootstrappable scheme, Gentry described in [3] a somewhat homomorphic scheme, which is roughly a GGH-type scheme [6, 8] over ideal lattices. Gentry later proved [4] that with an appropriate key-generation procedure, the security of that scheme can be (quantumly) reduced to the worst-case hardness of some problems in ideal lattices.

This somewhat homomorphic scheme is not yet bootstrappable, so Gentry described in [3] a transformation to squash the decryption procedure, reducing the degree of the decryption polynomial. This is done by adding to the public key an additional hint about the secret key, in the form of a "sparse subset-sum" problem (SSSP). Namely the public key is augmented with a big set of vectors, such that there exists a very sparse subset of them that adds up to the secret key. A ciphertext of the underlying scheme can be "post-processed" using this additional hint, and the post-processed ciphertext can be decrypted with a low-degree polynomial, thus obtaining a bootstrappable scheme.

Stehlé and Steinfeld described in [14] two optimizations to Gentry's scheme, one that reduces the number of vectors in the SSSP instance, and another that can be used to reduce the degree of the decryption polynomial (at the expense of introducing a small probability of decryption errors). In exemplary embodiments of the instant implementation, the first optimization is used but not the second. The reason for not using the second optimization is that the decryption error probability is too high for the parameter settings. Some improvements to Gentry's key-generation procedure were discussed in [9].

1.1 The Smart-Vercauteren Implementation

The first attempt to implement Gentry's scheme was made in 2010 by Smart and Vercauteren [13]. They chose to implement a variant of the scheme using "principal-ideal lattices" of prime determinant. Such lattices can be represented implicitly by just two integers (regardless of their dimension), and moreover Smart and Vercauteren described a decryption method where the secret key is represented by a single integer.

Smart and Vercauteren were able to implement the underlying somewhat homomorphic scheme, but they were not able to support large enough parameters to make Gentry's squashing technique go through. As a result they could not obtain a bootstrappable scheme or a fully homomorphic scheme.

One obstacle in the Smart-Vercauteren implementation was the complexity of key generation for the somewhat homomorphic scheme: For one thing, they must generate many candidates before they find one whose determinant is prime. (One may need to try as many as $n^{1.5}$ candidates when working with lattices in dimension n.) And even after finding one, the complexity of computing the secret key that corresponds to this lattice is at least $\tilde{\Theta}(n^{2.5})$ for lattices in dimension n. For both of these reasons, they were not able to generate keys in dimensions n>2048.

Moreover, Smart and Vercauteren estimated that the squashed decryption polynomial will have degree of a few hundreds, and that to support this procedure with their parameters they need to use lattices of dimension at least $n=2^{27}$ ($\approx 1.3 \times 10^8$), which is well beyond the capabilities of the key-generation procedure.

1.2 This Implementation

Exemplary embodiments for the instant implementation continue in the same direction of the Smart-Vercauteren implementation and describe optimizations that allow for also implementing the squashing part, thereby obtaining a bootstrappable scheme and a fully homomorphic scheme.

For key-generation, a faster algorithm is presented for computing the secret key, and also eliminates the requirement that the determinant of the lattice be prime. Also presented are many simplifications and optimizations for the squashed decryption procedure, and as a result the decryption polynomial has degree only fifteen. Finally, the choice of parameters is somewhat more aggressive than Smart and Vercauteren (which is complemented herein by analyzing the complexity of known attacks).

Differently from [13], the dimension n is decoupled from the size of the integers that are chosen during key generation. The latter parameter is denoted t herein. It is the logarithm of the parameter η in [13]. Decoupling these two parameters allows for decoupling functionality from security. Namely, one can obtain bootstrappable schemes in any given dimension, but of course the schemes in low dimensions will not be secure. The analysis suggests that the scheme may be practically secure at dimension $n=2^{13}$ or $n=2^{15}$, and this analysis is put to the test by publishing a few challenges in dimensions ranging from 512 up to $2^{15}$.

Various exemplary embodiments of the invention describe working implementations of a variant of Gentry's fully homomorphic encryption scheme (STOC 2009), similar to the variant used in an earlier implementation effort by Smart and Vercauteren (PKC 2010). Smart and Vercauteren implemented the underlying "somewhat homomorphic" scheme, but were not able to implement the bootstrapping functionality that is needed to get the complete scheme to work. It is shown that a number of optimizations allow for the implementation all aspects of the scheme, including the bootstrapping functionality.

One of the optimizations is a key-generation method for the underlying somewhat homomorphic encryption, that does not require full polynomial inversion. This reduces the asymptotic complexity from $\tilde{O}(n^{2.5})$ to $\tilde{O}(n^{1.5})$ when working with dimension-n lattices (and practically reducing the time from many hours/days to a few seconds/minutes). Other non-limiting examples of optimizations include a batching technique for encryption, a careful analysis of the degree of the decryption polynomial, and some space/time trade-offs for the fully-homomorphic scheme.

Exemplary embodiments of the implementation are tested with lattices of several dimensions, corresponding to several security levels. From a "toy" setting in dimension 512, to "small," "medium," and "large" settings in dimensions 2048, 8192, and 32768, respectively. The public-key size ranges in size from 70 Megabytes for the "small" setting to 2.3 Gigabytes for the "large" setting. The time to run one bootstrapping operation (on a 1-CPU 64-bit machine with large memory) ranges from 30 seconds for the "small" setting to 30 minutes for the "large" setting.

1.3 Organization

To aid reading, listed here are examples of the optimizations that are described in this report, with pointers to the sections where they are presented.

Somewhat-Homomorphic Scheme.

1. Replace the Smart-Vercauteren requirement [13] that the lattice has prime determinant, by the much weaker requirement that the Hermite normal form (HNF) of the lattice has a particular form, as explained in Step 3 of Section 3. Also provided is a simple criterion for checking for this special form.
2. Decrypt using a single coefficient of the secret inverse polynomial (similarly to Smart-Vercauteren [13]), but for convenience use modular arithmetic rather than rational division. See Section 6.1.
3. Use a highly optimized algorithm for computing the resultant and one coefficient of the inverse of a given polynomial v(x) with respect to $f(x)=x^{2^n}\pm 1$ (without having to compute the entire inverse). See Section 4.
4. Use batch techniques to speed-up encryption. Specifically, use an efficient algorithm for batch evaluation of many polynomials with small coefficients on the same point. See Section 5. The algorithm, when specialized to evaluating a single polynomial, is essentially the same as Avanzi's trick [1], which itself is similar to the algorithm of Paterson and Stockmeyer [10]. The time to evaluate k polynomials is only $O(\sqrt{k})$ more than evaluating a single polynomial.

Fully Homomorphic Scheme.

5. The secret key in this implementation is a binary vector of length S≈1000, with only s=15 bits set to one, and the others set to zero. Significant speedup is obtained by representing the secret key in s groups of S bits each, such that each group has a single 1-bit in it. See Section 8.1.
6. The public key of the bootstrappable scheme contains an instance of the sparse-subset-sum problem, and instances are used that have a very space-efficient representation. Specifically, the instances are derived from geometric progressions. See Section 9.1.
7. Similarly, the public key of the fully homomorphic scheme contains an encryption of all the secret-key bits, and a space-time tradeoff is used to optimize the space that it takes to store all these ciphertexts without paying too much in running time. See Section 9.2.

Finally, the choice of parameters is presented in Section 10, and some performance numbers are given in Section 11. Throughout the text more emphasis is placed on concrete parameters than on asymptotics—asymptotic bounds can be found in [14].

2 Background

Notations.

Throughout this report '·' is used to denote scalar multiplication and '×' to denote any other type of multiplication. For integers z, d, denote the reduction of z modulo d by either $[z]_d$ or $\langle z \rangle_d$. Use $[z]_d$ when the operation maps integers to the interval [−d/2, d/2), and use $\langle z \rangle_d$ when the operation maps integers to the interval [0,d). Use the generic "z mod d" when the specific interval does not matter (e.g., mod 2). For example, $[13]_5=-2$ vs. $\langle 13 \rangle_5=3$, but $[9]_7=\langle 9 \rangle_7=2$.

For a rational number q, denote by $\lceil q \rfloor$ the rounding of q to the nearest integer, and by $\lceil q \rceil$ denote the distance between q and the nearest integer. That is, if $$q = \frac{a}{b}$$

then $$\lceil q \rfloor \stackrel{def}{=} \frac{[a]_b}{b}$$

and $$\lceil q \rceil \stackrel{def}{=} q - \lceil q \rfloor.$$

For example, $$\left\lceil \frac{13}{5} \right\rfloor = 3$$

and $$\left\lceil \frac{13}{5} \right\rceil = \frac{-2}{5}.$$

These notations are extended to vectors in the natural way: for example if $\vec{q}=\langle q_0, q_1, \ldots, q_{n-1}\rangle$ is a rational vector then rounding is done coordinate-wise, $\lceil \vec{q} \rfloor = \langle \lceil q_0 \rfloor, \lceil q_1 \rfloor, \ldots, \lceil q_{n-1} \rfloor \rangle$.

2.1 Lattices

A full-rank n-dimensional lattice is a discrete subgroup of $R^n$ (i.e., $\mathbb{R}^n$, an n-dimensional vector space over the set of real numbers), concretely represented as the set of all integer linear combinations of some basis $B=(\vec{b}_1, \ldots, \vec{b}_n) \in R^n$ of linearly independent vectors. Viewing the vectors $\vec{b}_i$ as the rows of a matrix $B \in R^{n \times n}$, one has: $L=L(B)=\{\vec{y} \times B: \vec{y} \in Z^n\}$, where $Z^n$ is $\mathbb{Z}^n$ (an n-dimensional vector space over the set of integers).

Every lattice of dimension n>1 has an infinite number of lattice bases. If $B_1$ and $B_2$ are two lattice bases of lattice L, then there is some unimodular matrix U (i.e., U has integer entries and $det(U)=\pm 1$) satisfying $B_1=U \times B_2$. Since U is unimodular, $|det(B_i)|$ is invariant for different bases of L. Since it is invariant, one may refer to det(L). This value is precisely the size of the quotient group $Z^n/L$ if L is an integer lattice. To basis B of lattice L one associates the half-open parallelepiped $$P(B) \leftarrow \left\{ \sum_{i=1}^{n} x_i \vec{b_i} : x_i \in [-1/2, 1/2) \right\}.$$

The volume of P(B) is precisely det(L).

For $\vec{c} \in R^n$ and basis B of lattice L, use $\vec{c}$ mod B to denote the unique vector $\vec{c'} \in P(B)$ such that $\vec{c} - \vec{c'} \in L$. Given $\vec{c}$ and B, $\vec{c}$ mod B can be computed efficiently as $\vec{c} - \lceil \vec{c} \times B^{-1} \rfloor \times B = [\vec{c} \times B^{-1}] \times B$. (Recall that $\lceil \cdot \rfloor$ means rounding to the nearest integer and $[\cdot]$ is the fractional part.)

Every rational full-rank lattice has a unique Hermite normal form (HNF) basis where $b_{i,j}=0$ for all $i<j$ (lower-triangular), $b_{j,j}>0$ for all j, and $b_{j,i} \in [-b_{i,i}/2, +b_{i,i}/2)$ for all $i>j$. Given any basis B of L, one can compute HNF(L) efficiently via Gaussian elimination. The HNF is in some sense the "least revealing" basis of L, and thus typically serves as the public key representation of the lattice [8].

Short Vectors and Bounded Distance Decoding.

The length of the shortest nonzero vector in a lattice L is denoted $\lambda_1(L)$, and Minkowski's theorem says that for any n-dimensional lattice L one has $\lambda_1(L) \leq \sqrt{n} \cdot \det(L)^{1/n}$. Heuristically, for random lattices the quantity $\det(L)^{1/n}$ serves as a threshold: for $t \ll \det(L)^{1/n}$ one does not expect to find any nonzero vectors in L of size t, but for $t \gg \det(L)^{1/n}$ one expects to find exponentially many vectors in L of size t.

In the "bounded distance decoding" problem (BDDP), one is given a basis B of some lattice L, and a vector $\vec{c}$ that is very close to some lattice point of L, and the goal is to find the point in L nearest to $\vec{c}$. In the promise problem γ-BDDP, one has a parameter γ>1 and the promise that $\text{dist}(L, \vec{c}) \stackrel{\text{def}}{=} \min_{\vec{v} \in L} \{\|\vec{c} - \vec{v}\|\} \leq \det(L)^{1/n}/\gamma$. (BDDP is often defined with respect to $\lambda_1$ rather than with respect to $\det(L)^{1/n}$, but the current definition is more convenient in the instant case.)

Gama and Nguyen conducted extensive experiments with lattices in dimensions 100-400 [2], and concluded that for those dimensions it is feasible to solve γ-BDDP when $\gamma > 1.01^n \approx 2^{n/70}$. More generally, the best algorithms for solving the γ-BDDP in n-dimensional lattices takes time exponential in $n/\log \gamma$. Specifically, in time $2^k$ currently known algorithms can solve γ-BDDP in dimension n up to $$\gamma = 2^{\frac{\mu n}{k/\log k}},$$

where μ is a parameter that depends on the exact details of the algorithm. (Extrapolating from the Gama-Nguyen experiments, one may expect something like $\mu \in [0.1, 0.2]$.)

2.2 Ideal Lattices

Let f(x) be an integer monic irreducible polynomial of degree n. In this paper, $f(x) = x^n + 1$ is used, where n is a power of 2. Let R be the ring of integer polynomials modulo f(x), $R \stackrel{\text{def}}{=} Z[x]/(f(x))$. Each element of R is a polynomial of degree n-1, and thus is associated to a coefficient vector in $Z^n$. In this way, one can view each element of R as being both a polynomial and a vector. For $\vec{v}(x)$, let $\|\vec{v}\|$ be the Euclidean norm of its coefficient vector. For every ring R, there is an associated expansion factor $\gamma_{Mult}(R)$ such that $\|\vec{u} \times \vec{v}\| \leq \gamma_{Mult}(R) \cdot \|\vec{u}\| \cdot \|\vec{v}\|$, where × denotes multiplication in the ring. When $f(x) = x^n + 1$, $\gamma_{Mult}(R)$ is $\sqrt{n}$. However, for "random vectors" $\vec{u}$, $\vec{v}$ the expansion factor is typically much smaller, and experiments suggest that one typically has $\|\vec{u} \times \vec{v}\| \approx \|\vec{u}\| \cdot \|\vec{v}\|$.

Let I be an ideal of R—that is, a subset of R that is closed under addition and multiplication by elements of R. Since I is additively closed, the coefficient vectors associated to elements of I form a lattice. Call I an ideal lattice to emphasize this object's dual nature as an algebraic ideal and a lattice. Alternative representations of an ideal lattice are possible—e.g., see [11, 7]. Ideals have additive structure as lattices, but they also have multiplicative structure. The product IJ of two ideals I and J is the additive closure of the set $\{\vec{v} \times \vec{w} : \vec{v} \in I, \vec{w} \in J\}$, where '×' is ring multiplication. To simplify things, principal ideals of R will be used—i.e., ideals with a single generator. The ideal $(\vec{v})$ generated by $\vec{v} \in R$ corresponds to the lattice generated by the vectors $\{\vec{v_i} \stackrel{\text{def}}{=} \vec{v} \times x^i \mod f(x) : i \in [0, n-1]\}$; call this the rotation basis of the ideal lattice $(\vec{v})$.

Let K be a field containing the ring R (in the instant case $K=Q[x]/(f(x))$). The inverse of an ideal $I \subseteq R$ is $I^{-1} = \{\vec{w} \in K : \forall \vec{v} \in I, \vec{v} \times \vec{w} \in R\}$. The inverse of a principal ideal $(\vec{v})$ is given by $(\vec{v}^{-1})$, where the inverse $\vec{v}^{-1}$ is taken in the field K.

2.3 GGH-Type Cryptosystems

Briefly recall Micciancio's "cleaned-up version" of GGH cryptosystems [6, 8]. The secret and public keys are "good" and "bad" bases of some lattice L. More specifically, the key-holder generates a good basis by choosing $B_{sk}$ to be a basis of short, "nearly orthogonal" vectors. Then it sets the public key to be the Hermite normal form of the same lattice, $B_{pk} \stackrel{\text{def}}{=} \text{HNF}(L(B_{sk}))$.

A ciphertext in a GGH-type cryptosystem is a vector $\vec{c}$ close to the lattice $L(B_{pk})$, and the message which is encrypted in this ciphertext is somehow embedded in the distance from $\vec{c}$ to the nearest lattice vector. To encrypt a message m, the sender chooses a short "error vector" $\vec{e}$ that encodes m, and then computes the ciphertext as $\vec{c} \leftarrow \vec{e} \mod B_{pk}$. Note that if $\vec{e}$ is short enough (i.e., less than $\lambda_1(L)/2$), then it is indeed the distance between $\vec{c}$ and the nearest lattice point.

To decrypt, the key-holder uses its "good" basis $B_{sk}$ to recover $\vec{e}$ by setting $\vec{c} \leftarrow \vec{c} \mod B_{sk}$ and then recovers m from $\vec{c}$. The reason decryption works is that, if the parameters are chosen correctly, then the parallelepiped $P(B_{sk})$ of the secret key will be a "plump" parallelepiped that contains a sphere of radius bigger than $\|\vec{c}\|$, so that $\vec{c}$ is the point inside $P(B_{sk})$ that equals $\vec{c}$ modulo L. On the other hand, the parallelepiped $P(B_{pk})$ of the public key will be very skewed, and will not contain a sphere of large radius, making it useless for solving BDDP.

2.4 Gentry's Somewhat-Homomorphic Cryptosystem

Gentry's somewhat homomorphic encryption scheme [3] can be seen as a GGH-type scheme over ideal lattices. The public key consists of a "bad" basis $B_{pk}$ of an ideal lattice J, along with some basis $B_I$ of a "small" ideal I (which is used to embed messages into the error vectors). For example, the small ideal I can be taken to be $I=(2)$, the set of vectors with all even coefficients.

A ciphertext in Gentry's scheme is a vector close to a J-point, with the message being embedded in the distance to the nearest lattice point. More specifically, the plaintext space is (some subset of) $R/I=\{0,1\}^n$, for a message in $\vec{m}\in\{0,1\}^n$ set $\vec{e}=2\vec{r}+\vec{m}$ for a random small vector $\vec{r}$, and then output the ciphertext $\vec{c}\leftarrow\vec{e} \bmod B_{pk}$.

The secret key in Gentry's scheme (that plays the role of the "good basis" of J) is just a short vector $\vec{w}\in J^{-1}$. Decryption involves computing the fractional part $[\vec{w}\times\vec{c}]$. Since $\vec{c}=\vec{j}+\vec{e}$ for some $j\in J$, then $\vec{w}\times\vec{c}=\vec{w}\times\vec{j}+\vec{w}\times\vec{e}$. But $\vec{w}\times\vec{j}$ is in R and thus an integer vector, so $\vec{w}\times\vec{c}$ and $\vec{w}\times\vec{e}$ have the same fractional part, $[\vec{w}\times\vec{c}]=[\vec{w}\times\vec{e}]$. If $\vec{w}$ and $\vec{e}$ are short enough—in particular, if one has the guarantee that all of the coefficients of $\vec{w}\times\vec{e}$ have magnitude less than ½—then $[\vec{w}\times\vec{e}]$ equals $\vec{w}\times\vec{e}$ exactly. From $\vec{w}\times\vec{e}$, the decryptor can multiply by $\vec{w}^{-1}$ to recover $\vec{e}$, and then recover $\vec{m}\leftarrow\vec{e} \bmod 2$. The actual decryption procedure from [3] is slightly different, however. Specifically, $\vec{w}$ is "tweaked" so that decryption can be implemented as $\vec{m}\leftarrow\vec{c}-[\vec{w}\times\vec{c}] \bmod 2$ (when I=(2)).

The reason that this scheme is somewhat homomorphic is that for two ciphertexts $\vec{c}_1=\vec{j}_1+\vec{e}_1$ and $\vec{c}_2=\vec{j}_2+\vec{e}_2$, their sum is $\vec{j}_3+\vec{e}_3$ where $\vec{j}_3=\vec{j}_1+\vec{j}_2\in J$ and $\vec{e}_3=\vec{e}_1+\vec{e}_2$ is small. Similarly, their product is $\vec{j}_4+\vec{e}_4$ where $\vec{j}_4=\vec{j}_1\times(\vec{j}_2+\vec{e}_2)+\vec{e}_1\times\vec{j}_2\in J$ and $\vec{e}_4=\vec{e}_1\times\vec{e}_2$ is still small. If fresh encrypted ciphertexts are very very close to the lattice, then it is possible to add and multiply ciphertexts for a while before the error grows beyond the decryption radius of the secret key.

2.4.1 The Smart-Vercauteren Variant

Smart and Vercauteren [13] work over the ring $R=Z[x]/f_n(x)$, where $f_n(x)=x^n+1$ and n is a power of two. The ideal J is set as a principle ideal by choosing a vector $\vec{v}$ at random from some n-dimensional cube, subject to the condition that the determinant of $(\vec{v})$ is prime, and then setting $J=(\vec{v})$. It is known that such ideals can be implicitly represented by only two integers, namely the determinant $d=\det(J)$ and a root r of $f_n(x)$ modulo d. (An easy proof of this fact "from first principles" can be derived from Lemma 1 below.) Specifically, the Hermite Normal Form (HNF) of this ideal lattice is:

$$HNF(J) = \begin{bmatrix} d & 0 & 0 & 0 & 0 \\ -r & 1 & 0 & 0 & 0 \\ -[r^2]_d & 0 & 1 & 0 & 0 \\ -[r^3]_d & 0 & 0 & 1 & 0 \\ & & & & \ddots \\ -[r^{n-1}]_d & 0 & 0 & 0 & 1 \end{bmatrix} \quad (1)$$

It is easy to see that reducing a vector $\vec{a}$ modulo HNF(J) consists of evaluating the associated polynomial a(x) at the point r modulo d, then outputting the vector $\langle [a(r)]_d, 0, 0, \ldots, 0\rangle$ (see Section 5). Hence encryption of a vector $\langle m, 0, 0, \ldots, 0\rangle$ with $m\in\{0,1\}$ can be done by choosing a random small polynomial u(x) and evaluating it at r, then outputting the integer $c\leftarrow[2u(r)+m]_d$.

Smart and Vercauteren also describe a decryption procedure that uses a single integer was the secret key, setting $m\leftarrow(c-\lceil cw/d\rceil)\bmod 2$. Jumping ahead, it is noted that the decryption procedure from Section 6 is very similar, except that the rational division cw/d is replaced by modular multiplication $[cw]_d$.

2.5 Gentry's Fully-Homomorphic Scheme

As explained above, Gentry's somewhat-homomorphic scheme can evaluate low-degree polynomials but not more. Once the degree (or the number of terms) is too large, the error vector $\vec{e}$ grows beyond the decryption capability of the private key. Gentry solved this problem using bootstrapping. He observed in [3] that a scheme that can homomorphically evaluate its own decryption circuit plus one additional operation, can be transformed into a fully-homomorphic encryption. In more details, fix two ciphertexts $\vec{c}_1, \vec{c}_2$ and consider the functions:

$$DAdd_{\vec{c}_1,\vec{c}_2}(sk) \stackrel{def}{=} Dec_{sk}(\vec{c}_1)+Dec_{sk}(\vec{c}_2) \text{ and}$$

$$DMul_{\vec{c}_1,\vec{c}_2}(sk) \stackrel{def}{=} Dec_{sk}(\vec{c}_1)\times Dec_{sk}(\vec{c}_2).$$

A somewhat-homomorphic scheme is called "bootstrappable" if it is capable of homomorphically evaluating the functions $DAdd_{\vec{c}_1,\vec{c}_2}$ and $DMul_{\vec{c}_1,\vec{c}_2}$ for any two ciphertexts $\vec{c}_1, \vec{c}_2$. Given a bootstrappable scheme that is also circular secure, it can be transformed into a fully-homomorphic scheme by adding to the public key an encryption of the secret key, $\vec{c}^*\leftarrow Enc_{pk}(sk)$. Then given any two ciphertexts $\vec{c}_1, \vec{c}_2$, the addition/multiplication of these two ciphertexts can be computed by homomorphically evaluating the functions $DAdd_{\vec{c}_1,\vec{c}_2}(\vec{c}^*)$ or $DMul_{\vec{c}_1,\vec{c}_2}(\vec{c}^*)$. Note that the error does not grow, since one always evaluates these functions on the fresh ciphertext $\vec{c}^*$ from the public key.

Unfortunately, the somewhat-homomorphic scheme from above is not bootstrappable. Although it is capable of evaluating low-degree polynomials, the degree of its decryption function, when expressed as a polynomial in the secret key bits, is too high. To overcome this problem Gentry shows how to "squash the decryption circuit", transforming the original somewhat-homomorphic scheme E into a scheme E* that can correctly evaluate any circuit that E can, but where the complexity of E*'s decryption circuit is much less than E's. In the original somewhat-homomorphic scheme E, the secret key is a vector $\vec{w}$. In the new scheme E*, the public key includes an additional "hint" about $\vec{w}$—namely, a big set of vectors $S=\{\vec{x}_i: i=1, 2, \ldots, S\}$ that have a hidden sparse subset T that adds up to $\vec{w}$. The secret key of E* is the characteristic vector of the sparse subset T, which is denoted $\vec{\sigma}=\langle \sigma_1, \sigma_2, \ldots, \sigma_S\rangle$.

Whereas decryption in the original scheme involved computing $\vec{m}\leftarrow\vec{c}-[\vec{w}\times\vec{c}] \bmod 2$, in the new scheme the ciphertext $\vec{c}$ is "post-processed" by computing the products $\vec{y}_i=\vec{x}_i\times\vec{c}$ for all of the vectors $\vec{x}_i\in S$. Obviously, then, the decryption in the new scheme can be done by computing $\vec{c}-[\Sigma_j\sigma_j\vec{y}_j] \bmod 2$. Using some additional tricks, this computation can be expressed as a polynomial in the $\sigma_i$'s of degree roughly the size of the sparse subset T. (The underlying algorithm is simple grade-school addition—add up the least significant column, bring a carry bit over to the next column if necessary, and so on.) With appropriate setting of the parameters, the subset T can be made small enough to get a bootstrappable scheme.

The "Somewhat Homomorphic" Scheme
3 Key Generation

Herein an approach similar to the Smart-Vercauteren approach [13] is adopted, in that the scheme also uses principal-ideal lattices in the ring of polynomials modulo $f_n(x) \stackrel{def}{=} x^n+1$ with n a power of two. Unlike Smart-Vercauteren, it is not required that these principal-ideal lattices have prime determinant, instead one only needs the HNF to have the same form as in Equation (1). During key-generation choose $\vec{v}$ at random in some cube, verify that the HNF has the right form, and work with the principal ideal $(\vec{v})$. There are two parameters: the dimension n, which must be a power of two, and the bit-size t of coefficients in the generating polynomial. Key-generation consists of the following steps:

1. Choose a random n-dimensional integer lattice $\vec{v}$, where each entry $v_i$ is chosen at random as a t-bit (signed) integer. With this vector $\vec{v}$ associate the formal polynomial $$v(x) \stackrel{def}{=} \sum_{i=0}^{n-1} v_i x^i,$$

as well as the rotation basis:

$$V = \begin{bmatrix} v_0 & v_1 & v_2 & & v_{n-1} \\ -v_{n-1} & v_0 & v_1 & & v_{n-2} \\ -v_{n-2} & -v_{n-1} & v_0 & & v_{n-3} \\ & & & \ddots & \\ -v_1 & -v_2 & -v_3 & & v_0 \end{bmatrix} \quad (2)$$

The i'th row is a cyclic shift of $\vec{v}$ by i positions to the right, with the "overflow entries" negated. Note that the i'th row corresponds to the coefficients of the polynomial $v_i(x)=v(x) \times x^i \pmod{f_n(x)}$. Note that just like V itself, the entire lattice L(V) is also closed under "rotation": Namely, for any vector $\langle u_0, u_1, \ldots, u_{n-1} \rangle \in L(V)$, also the vector $\langle -u_{n-1}, u_0, \ldots, u_{n-2} \rangle$ is in L(V).

2. Next compute the scaled inverse of v(x) modulo $f_n(x)$, namely an integer polynomial w(x) of degree at most n−1, such that $w(x) \times v(x) = \text{constant} \pmod{f_n(x)}$. Specifically, this constant is the determinant of the lattice L(V), which must be equal to the resultant of the polynomials v(x) and $f_n(x)$ (since $f_n$ is monic). Below the resultant is denoted by d, and the coefficient-vector of w(x) is denoted by $\vec{w} = \langle w_0, w_1, \ldots, w_{n-1} \rangle$. It is easy to check that the matrix:

$$W = \begin{bmatrix} w_0 & w_1 & w_2 & & w_{n-1} \\ -w_{n-1} & w_0 & w_1 & & w_{n-2} \\ -w_{n-2} & -w_{n-1} & w_0 & & w_{n-3} \\ & & & \ddots & \\ -w_1 & -w_2 & -w_3 & & w_0 \end{bmatrix} \quad (3)$$

is the scaled inverse of V, namely $W \times V = V \times W = d \cdot I$. One way to compute the polynomial w(x) is by applying the extended Euclidean-GCD algorithm (for polynomials) to v(x) and $f_n(x)$. See Section 4 for a more efficient method of computing w(x).

3. Next check that this is a good generating polynomial.

Specifically, consider $\vec{v}$ to be good if the HNF of V has the same form as in Equation (1), namely all except the leftmost column equal to the identity matrix. See below for a simple check that $\vec{v}$ is good, a condition tested while computing the inverse.

It was observed by Nigel Smart that the HNF has the correct form whenever the determinant is odd and square-free. Indeed, in tests this condition was met with probability roughly 0.5, irrespective of the dimension and bit length, with the failure cases usually due to the determinant if V being even.

Checking the HNF.

Lemma 1 below proves that the HNF of the lattice L(V) has the right form if and only if the lattice contains a vector of the form $\langle -r, 1, 0, \ldots, 0 \rangle$. Namely, if and only if there exists an integer vector $\vec{y}$ and another integer r such that $$\vec{y} \times V = \langle -r, 1, 0, \ldots, 0 \rangle$$

Multiplying the last equation on the right by W, one gets the equivalent condition $$\vec{y} \times V \times W = \langle -r, 1, 0, \ldots, 0 \rangle \times W \Leftrightarrow \vec{y} \times (dI) = d \cdot \vec{y} = -r \cdot \langle w_0, w_1, w_2, \ldots, w_{n-1} \rangle + \langle -w_{n-1}, w_0, w_1, \ldots, w_{n-2} \rangle$$

In other words, there must exist an integer r such that the second row of W minus r times the first row yields a vector of integers that are all divisible by d:

$$-r \cdot \langle w_0, w_1, w_2, \ldots, w_{n-1} \rangle + \langle -w_{n-1}, w_0, w_1, \ldots, w_{n-2} \rangle = 0 \pmod{d} \Leftrightarrow -r \cdot \langle w_0, w_1, w_2, \ldots, w_{n-1} \rangle = \langle w_{n-1}, -w_0, -w_1, \ldots, -w_{n-2} \rangle \pmod{d}$$

The last condition can be checked easily: compute $r := w_0/w_1 \mod d$ (assuming that $w_1$ has an inverse modulo d), then check that $r \cdot w_{i+1} = w_i \pmod{d}$ holds for all $i = 1, \ldots, n-2$ and also $-r \cdot w_0 = w_{n-1} \pmod{d}$. Note that in particular this means that $r^n = -1 \pmod{d}$. (In the instant implementation one need actually test only that last condition, instead of testing all the equalities $r \cdot w_{i+1} = w_i \pmod{d}$.)

Lemma 1 The Hermite normal form of the matrix V from Equation (2) is equal to the identity matrix in all but the leftmost column, if and only if the lattice spanned by the rows of V contains a vector of the form $\vec{r} = \langle -r, 1, 0, \ldots, 0 \rangle$.

Proof. Let B be the Hermite normal form of V. Namely, B is a lower triangular matrix with non-negative diagonal entries, where the rows of B span the same lattice as the rows of V, and the absolute value of every entry under the diagonal in B is no more than half the diagonal entry above it. This matrix B can be obtained from V by a sequence of elementary row operations, and it is unique. It is easy to see that the existence of a vector $\vec{r}$ of this form is necessary: indeed the second row of B must be of this form (since B is equal the identity in all except the leftmost column). It is now proven that this condition is also sufficient. It is clear that the vector $d \cdot \vec{e}_1 = \langle d, 0, \ldots, 0 \rangle$ belongs to L(V): in particular $\langle w_0, w_1, \ldots, w_{n-1} \rangle \times V = \langle d, 0, \ldots, 0 \rangle$. Also, by assumption one has $\vec{r} = -r \cdot \vec{e}_1 + \vec{e}_2 \in L(V)$, for some integer r. Note that one can assume without loss of generality that $-d/2 \leq r < d/2$, since otherwise one could subtract from $\vec{r}$ multiples of the vector $d \cdot \vec{e}_1$ until this condition is satisfied:

$$\langle -r\ 1\ 0\ \ldots\ 0 \rangle - \kappa \cdot \langle d\ 0\ 0\ \ldots\ 0 \rangle = \overline{\langle [-r]_d\ 1\ 0\ \ldots\ 0 \rangle}$$

For $i=1, 2, \ldots, n-1$, denote $r_i \stackrel{def}{=} [r^i]_d$. Below it will be proven by induction that for all $i=1, 2, \ldots, n-1$, the lattice $L(V)$ contains the vector:

$$\vec{r}_i \stackrel{def}{=} -r_i \cdot \vec{e}_1 + \vec{e}_{i+1} = \langle \underbrace{-r_i, 0\ \ldots\ 0, 1}_{1 \text{ in the } i+1\text{'st position}}, 0\ \ldots\ 0\rangle.$$

Placing all these vectors $\vec{r}_i$ at the rows of a matrix, one gets exactly the matrix B that is needed:

$$B = \begin{bmatrix} d & 0 & 0 & 0 \\ -r_1 & 1 & 0 & 0 \\ -r_2 & 0 & 1 & 0 \\ & & \ddots & \\ -r_{n-1} & 0 & 0 & 1 \end{bmatrix}. \quad (5)$$

B is equal to the identity except in the leftmost column, its rows are all vectors in $L(V)$ (so they span a sub-lattice), and since B has the same determinant as V then it cannot span a proper sub-lattice, it must therefore span $L(V)$ itself. It is left to prove the inductive claim. For $i=1$ set $\vec{r}_1 \stackrel{def}{=} \vec{r}$ and the claim follows from the assumption that $\vec{r} \in L(V)$. Assume now that it holds for some $i \in [1, n-2]$ and it is proven for $i+1$. Recall that the lattice $L(V)$ is closed under rotation, and since $\vec{r}_i = -r_i \vec{e}_1 + \vec{e}_{i+1} \in L(V)$ then the right-shifted vector $\vec{s}_{i+1} \stackrel{def}{=} -r_i \vec{e}_2 + \vec{e}_{i+2}$ is also in $L(V)$. This is a circular shift, since $i \leq n-2$ and hence the rightmost entry in $\vec{e}_i$ is zero. Hence $L(V)$ contains also the vector:

$$\vec{s}_{i+1} + r_i \cdot \vec{r} = (-r_i \vec{e}_2 + \vec{e}_{i+2}) + r_i (-r \vec{e}_1 + \vec{e}_2) = -r_i r \cdot \vec{e}_1 + \vec{e}_{i+2}$$

One can now reduce the first entry in this vector modulo d, by adding/subtracting the appropriate multiple of $d \cdot \vec{e}_1$ (while still keeping it in the lattice), thus getting the lattice vector:

$$[-r \cdot r_i]_d \cdot \vec{e}_1 + \vec{e}_{i+2} = -[r^{i+1}]_d \cdot \vec{e}_1 + \vec{e}_{i+2} = \vec{r}_{i+1} \in L(V)$$

This concludes the proof.

Remark 1 Note that the proof of Lemma 3 shows in particular that if the Hermite normal form of V is equal to the identity matrix in all but the leftmost column, then it must be of the form specified in Equation (13). Namely, the first column is $\langle d, -r_1, -r_2, \ldots, -r_{n-1} \rangle^t$, with $r_i = [r^i]_d$ for all i. Hence this matrix can be represented implicitly by the two integers d and r.

3.1 The Public and Secret Keys

In principle the public key is the Hermite normal form of V, but as explained above and in Section 5 it is enough to store for the public key only the two integers d,r. Similarly, in principle the secret key is the pair $(\vec{v}, \vec{w})$, but as explained in Section 6.1 it is sufficient to store only a single (odd) coefficient of $\vec{w}$ and discard $\vec{v}$ altogether.

4 Inverting the Polynomial v(x)

The fastest known methods for inverting the polynomial $v(x)$ modulo $f_n(x) = x^n + 1$ are based on Fast Fourier Transform (FFT): One can evaluate $v(x)$ at all the roots of $f_n(x)$ (either over the complex field or over some finite field), then compute $w^*(\rho) = 1/v(\rho)$ (where inversion is done over the corresponding field), and then interpolate $w^* = v^{-1}$ from all these values. If the resultant of v and $f_n$ has N bits, then this procedure will take $O(n \log n)$ operations over $O(N)$-bit numbers, for a total running time of $\tilde{O}(nN)$. This is close to optimal in general, since just writing out the coefficients of the polynomial $w^*$ takes time $O(nN)$. However, in Section 6.1 it is shown that it is enough to use for the secret key only one of the coefficients of $w = d \cdot w^*$ (where $d = \text{resultant}(v, f_n)$). This raises the possibility that one can compute this one coefficient in time quasi-linear in N (rather than quasi-linear in nN). Below is described a method for doing just that.

The method relies heavily on the special form of $f_n(x) = x^n + 1$, with n being a power of two. Let $\rho_0, \rho_1, \ldots, \rho_{n-1}$ be roots of $f_n(x)$ over the complex field: That is, if $\rho$ is some primitive 2n'th root of unity then $\rho_i = \rho^{2i+1}$. Note that the roots $r_i$ satisfy that $$\rho_{i+\frac{n}{2}} = -\rho_i$$

for all i, and more generally for every index i (with index arithmetic modulo n) and every $j = 0, 1, \ldots, \log n$, if one denotes $n_j \stackrel{def}{=} n/2^j$ then it holds that:

$$(\rho_{i+n_j/2})^{2^j} = (\rho^{2i+n_j+1})^{2^j} = (\rho^{2i+1})^{2^j} \cdot \rho^n = -(\rho_i^{2^j}) \quad (6)$$

The method below takes advantage of Equation (6), as well as a connection between the coefficients of the scaled inverse w and those of the formal polynomial:

$$g(z) \stackrel{def}{=} \prod_{i=0}^{n-1} (v(\rho_i) - z).$$

Invert $v(x) \mod f_n(x)$ by computing the lower two coefficients of $g(z)$, then using them to recover both the resultant and one coefficient of the polynomial $w(x)$, as described next.

Step One: the Polynomial $g(z)$.

Note that although the polynomial $g(z)$ it is defined via the complex numbers $\rho_i$, the coefficients of $g(z)$ are all integers. Below, it is shown how to compute the lower two coefficients of $g(z)$, namely the polynomial $g(z) \mod z^2$. It is observed that since $$\rho_{i+\frac{n}{2}} = -\rho_i$$

then one can write $g(z)$ as:

$$g(z) = \prod_{i=0}^{\frac{n}{2}-1} (v(\rho_i) - z)(v(-\rho_i) - z)$$

$$= \prod_{i=0}^{\frac{n}{2}-1} \left( \underbrace{v(\rho_i)v(-\rho_i)}_{a(\rho_i)} - z\underbrace{(v(\rho_i) + v(-\rho_i))}_{b(\rho_i)} + z^2 \right)$$

$$= \prod_{i=0}^{\frac{n}{2}-1} (a(\rho_i) - zb(\rho_i)) (\mod z^2)$$

Observe further that for both the polynomials $a(x)=v(x)v(-x)$ and $b(x)=v(x)+v(-x)$, all the odd powers of x have zero coefficients. Moreover, the same equalities as above hold if one uses $A(x)=a(x) \bmod f_n(x)$ and $B(x)=b(x) \bmod f_n(x)$ instead of $a(x)$ and $b(x)$ themselves (since one only evaluates these polynomials in roots of $f_n$), and also for A,B all the odd powers of x have zero coefficients (since one reduces modulo $f_n(x)=x^n+1$ with n even).

Thus one can consider the polynomials $\hat{v}, \tilde{v}$ that have half the degree and only use the nonzero coefficients of A,B, respectively. Namely they are defined via $\hat{v}(x^2)=A(x)$ and $\tilde{v}(x^2)=B(x)$. Thus the task of computing the n-product involving the degree-n polynomial $v(x)$ is reduced to computing a product of only n/2 terms involving the degree-n/2 polynomials $\hat{v}(x), \tilde{v}(x)$. Repeating this process recursively, one obtains the polynomial $g(z) \bmod z^2$.

In more detail, denote $U_0(x) \equiv 1$ and $V_0(x)=v(x)$, and for $j=0, 1, \ldots, \log n$ denote $n_j = n/2^j$. Proceed in $m=\log n$ steps to compute the polynomials $U_j(x), V_j(x)$ $(j=1, 2, \ldots, m)$, such that the degrees of $U_j, V_j$ are at most $n_j-1$, and moreover the polynomial $$g_j(z) = \prod_{i=0}^{n_j-1} \left( V_j(\rho_i^{2^j}) - z U_j(\rho_i^{2^j}) \right)$$

has the same first two coefficients as $g(z)$. Namely, $$g_j(z) \stackrel{def}{=} \prod_{i=0}^{n_j-1} \left( V_j(\rho_i^{2^j}) - z U_j(\rho_i^{2^j}) \right) \quad (7)$$
$$= g(z) (\bmod z^2).$$

Equation (7) holds for $j=0$ by definition. Assume that $U_j, V_j$ are computed for some $j<m$ such that Equation (7) holds, and it is shown below how to compute $U_{j+1}$ and $V_{j+1}$. From Equation (6) one knows that $(\rho_{i+n_j/2})^{2^j} = -\rho_i^{2^j}$, so one can express $g_j$ as:

$$g_j(z) = \prod_{i=0}^{n_j/2-1} \left( V_j(\rho_i^{2^j}) - z U_j(\rho_i^{2^j}) \right)\left( V_j(-\rho_i^{2^j}) - z U_j(-\rho_i^{2^j}) \right)$$

$$= \prod_{i=0}^{n_j/2-1} \left( \underbrace{V_j(\rho_i^{2^j}) V_j(-\rho_i^{2^j})}_{=A_j(\rho_i^{2^j})} - z \underbrace{(U_j(\rho_i^{2^j})V_j(-\rho_i^{2^j}) + U_j(-\rho_i^{2^j})V_j(\rho_i^{2^j}))}_{=B_j(\rho_i^{2^j})} \right)$$

$(\bmod z^2)$

Denoting $f_{n_j}(x) \stackrel{def}{=} x^{n_j}+1$ and observing that $\rho_i^{2^j}$ is a root of $f_{n_j}$ for all i, one next considers the polynomials:

$A_j(x) \stackrel{def}{=} V_j(x)V_j(-x) \bmod f_{n_j}(x)$ (with coefficients $a_0, \ldots, a_{n_j-1}$)

$B_j(x) \stackrel{def}{=} U_j(x)V_j(-x)+U_j(-x)V_j(x) \bmod f_{n_j}(x)$ (with coefficients $b_0, \ldots, b_{n_j-1}$)

and observes the following:

Since $\rho_i^{2^j}$ is a root of $f_{n_j}$, then the reduction modulo $f_{n_j}$ makes no difference when evaluating $A_j, B_j$ on $\rho_i^{2^j}$. Namely one has $A_j(\rho_i^{2^j})=V_j(\rho_i^{2^j})V_j(-\rho_i^{2^j})$ and similarly $B_j(\rho_i^{2^j})=U_j(\rho_i^{2^j})V_j(-\rho_i^{2^j})+U_j(-\rho_i^{2^j})V_j(\rho_i^{2^j})$ (for all i).

The odd coefficients of $A_j, B_j$ are all zero. For $A_j$ this is because it is obtained as $V_j(x)V_j(-x)$ and for $B_j$ this is because it is obtained as $R_j(x)+R_j(-x)$ (with $R_j(x)=U_j(x)V_j(-x)$). The reduction modulo $f_{n_j}(x)=x^{n_j}+1$ keeps the odd coefficients all zero, because $n_j$ is even.

Therefore set:

$$U_{j+1}(x) \stackrel{def}{=} \sum_{t=0}^{n_j/2-1} b_{2t} \cdot x^t, \text{ and } V_{j+1}(x) \stackrel{def}{=} \sum_{t=0}^{n_j/2-1} a_{2t} \cdot x^t,$$

so the second bullet above implies that $U_{j+1}(x^2)=B_j(x)$ and $V_{j+1}(x^2)=A_j(x)$ for all x. Combined with the first bullet, one has that:

$$g_{j+1}(z) \stackrel{def}{=} \prod_{i=0}^{n_j/2-1} \left( V_{j+1}(\rho_i^{2^{j+1}}) - z \cdot U_{j+1}(\rho_i^{2^{j+1}}) \right)$$

$$= \prod_{i=0}^{n_j/2-1} \left( A_j(\rho_i^{2^j}) - z \cdot B_j(\rho_i^{2^j}) \right)$$

$$= g_j(z)(\bmod z^2).$$

By the induction hypothesis one also has $g_j(z) \equiv g(z) (\bmod z^2)$, so one gets $g_{j+1}(z) \equiv g(z) (\bmod z^2)$, as needed.

Step Two: Recovering d and $w_0$.

Recall that if $v(x)$ is square free then $$d = \text{resultant}(v, f_n) = \prod_{i=0}^{n-1} v(\rho_i),$$

which is exactly the free term of $$g(z), g_0 = \prod_{i=0}^{n-1} v(\rho_i),$$

Recall also that the linear term in $g(z)$ has coefficient $$g_1 = \sum_{i=0}^{n-1} \prod_{j \neq i} v(\rho_i).$$

Next it is shown that the free term of $w(x)$ is $w_0 = g_1/n$. First, observe that $g_1$ equals the sum of w evaluated in all the roots of $f_n$, namely:

$$g_1 = \sum_{i=0}^{n-1} \prod_{j \neq i} v(\rho_j)$$

$$= \sum_{i=0}^{n-1} \frac{\prod_{j=0}^{n-1} v(\rho_j)}{v(\rho_i)}$$

$$\stackrel{(a)}{=} \sum_{i=0}^{n-1} \frac{d}{v(\rho_i)}$$

$$\stackrel{(b)}{=} \sum_{i=0}^{n-1} w(\rho_i)$$

where Equality (a) follows since $v(x)$ is square free and $d = \text{resultant}(v, f_n)$, and Equality (b) follows since $v(\rho_i) = d/w(\rho_i)$ holds in all the roots of $f_n$. It is left to show that the constant term of $w(x)$ is $$w_0 = n \sum_{i=0}^{n-1} w(\rho_i).$$

To show this, write:

$$\sum_{i=0}^{n-1} w(\rho_i) = \sum_{i=0}^{n-1} \sum_{j=0}^{n-1} w_j \rho_i^j \qquad (8)$$

$$= \sum_{j=0}^{n-1} w_j \sum_{i=0}^{n-1} \rho_i^j$$

$$\stackrel{(\text{â})}{=} \sum_{j=0}^{n-1} w_j \sum_{i=0}^{n-1} (\rho^j)^{2i+1}$$

where the Equality holds since the i'th root of $f_n$ is $\rho_i = \rho^{2i+1}$ where $\rho$ is a 2n-th root of unity. Clearly, the term corresponding to $j=0$ in Equation (8) is $w_0 \cdot n$, it is left to show that all the other terms are zero. This follows since $\rho^j$ is a 2n-th root of unity different from ±1 for all $j=1, 2, \ldots, n-1$, and summing over all odd powers of such root of unity yields zero.

Step Three: Recovering the Rest of w.

One can now use the same technique to recover all the other coefficients of w: Note that since one works modulo $f_n(x) = x^n + 1$, then the coefficient $w_i$ is the free term of the scaled inverse of $x^i \times v \pmod{f_n}$.

In this case one only needs to recover the first two coefficients, however, since interest is in the case where $w_1/w_0 = w_2/w_1 = \ldots = w_{n-1}/w_{n-2} = -w_0/w_{n-1} \pmod{d}$, where $d = \text{resultant}(v, f_n)$. After recovering $w_0, w_1$ and $d = \text{resultant}(v, f_n)$, compute the ratio $r = w_1/w_0 \mod d$ and verify that $r^n = -1 \pmod d$. Then recover as many coefficients of w as needed (via $w_{i+1} = [w_i \cdot r]_d$), until one finds one coefficient which is an odd integer, and that coefficient is the secret key.

5 Encryption

To encrypt a bit $b \in \{0,1\}$ with the public key B (which is implicitly represented by the two integers d,r), first choose a random 0, ±1 "noise vector" $\vec{u} \stackrel{def}{=} \langle u_0, u_1, \ldots, u_{n-1} \rangle$, with each entry chosen as 0 with some probability q and as ±1 with probability $(1-q)/2$ each. Then set $\vec{a} \stackrel{def}{=} 2\vec{u} + b \cdot \vec{e}_1 = \langle 2u_0 + b, 2u_1, \ldots, 2u_{n-1} \rangle$, and the ciphertext is the vector:

$$\vec{c} = \vec{a} \bmod B = \vec{a}(\lceil \vec{a} \times B^{-1} \rfloor \times B) = \underbrace{[\vec{a} \times B^{-1}]}_{[\cdot] \text{ is fractional part}} \times B$$

It is now shown that $\vec{c}$ also can be represented implicitly by just one integer. Recall that B (and therefore also $B^{-1}$) are of a special form:

$$B = \begin{bmatrix} d & 0 & 0 & 0 & & 0 \\ -r & 1 & 0 & 0 & & 0 \\ -[r^2]_d & 0 & 1 & 0 & & 0 \\ -[r^3]_d & 0 & 0 & 1 & & 0 \\ & & & & \ddots & \\ -[r^{n-1}]_d & 0 & 0 & 0 & & 1 \end{bmatrix}, \text{ and}$$

$$B^{-1} = \frac{1}{d} \cdot \begin{bmatrix} 1 & 0 & 0 & 0 & & 0 \\ r & d & 0 & 0 & & 0 \\ [r^2]_d & 0 & d & 0 & & 0 \\ [r^3]_d & 0 & 0 & d & & 0 \\ & & & & \ddots & \\ [r^{n-1}]_d & 0 & 0 & 0 & & d \end{bmatrix}.$$

Denote $\vec{a} = \langle a_0, a_1, \ldots, a_{n-1} \rangle$, and also denote by $a(\cdot)$ the integer polynomial $$a(x) \stackrel{def}{=} \sum_{i=0}^{n-1} a_i x^i.$$

Then one has $$\vec{a} \times B^{-1} = \left\langle \frac{s}{d}, a_1, \ldots, a_{n-1} \right\rangle$$

for some integer s that satisfies $s = a(r) \pmod d$. Hence the fractional part of $\vec{a} \times B^{-1}$ is $$[\vec{a} \times B^{-1}] = \left\langle \frac{[a(r)]_d}{d}, 0, \ldots, 0 \right\rangle,$$

and the ciphertext vector is $$\vec{c} = \left\langle \frac{[a(r)]_d}{d}, 0, \ldots, 0 \right\rangle \times B = \langle [a(r)]_d, 0, \ldots, 0 \rangle.$$

Clearly, this vector can be represented implicitly by the integer $$c \stackrel{def}{=} [a(r)]_d = \left[b + 2 \sum_{i=1}^{n-1} u_i r^i \right]_d.$$

Hence, to encrypt the bit b, one only needs to evaluate the 0, ±1 noise-polynomial $u(\cdot)$ at the point r, then multiply by two and add the bit b (everything modulo d). Now described is an efficient procedure for doing so.

5.1 An Efficient Encryption Procedure

The most expensive operation during encryption is evaluating the degree-(n−1) polynomial u at the point r. Polynomial evaluation using Horner's rule takes n−1 multiplications, but it is known that for small coefficients one can reduce the number of multiplications to only $O(\sqrt{n})$, see [1, 10]. Moreover, observe that it is possible to batch this fast evaluation algorithm, and evaluate k such polynomials in time $O(\sqrt{kn})$.

Begin by noting that evaluating many 0, ±1 polynomials at the same point x can be done about as fast as a naive evaluation of a single polynomial. Indeed, once all the powers (1, x, $x^2, \ldots, x^{n-1}$) are computed then one can evaluate each polynomial just by taking a subset-sum of these powers. As addition is much faster than multiplication, the dominant term in the running time will be the computation of the powers of x, which only need to be done once for all the polynomials.

Next, observe that evaluating a single degree-(n−1) polynomial at a point x can be done quickly given a subroutine that evaluates two degree- $$\lceil \frac{n}{2} - 1 \rceil )$$

polynomials at the same point x. Namely, given $$u(x) = \sum_{i=0}^{n-1} u_i x^i,$$

split it into a "bottom half"

$$u^{bot}(x) = \sum_{i=0}^{n/2-1} u_i x^i$$

and a "top half"

$$u^{top}(x) = \sum_{i=0}^{n/2-1} u_{i+d/2} x^i.$$

Evaluating these two smaller polynomials gets $y^{bot}=u^{bot}(x)$ and $y^{top}=u^{top}(x)$, and then one can compute y=u(x) by setting $y=x^{n/2}y^{top}+y^{bot}$. If the subroutine for evaluating the two smaller polynomials also returns the value of $x^{n/2}$, then one needs just one more multiplication to get the value of y=u(x).

These two observations suggest a recursive approach to evaluating the 0, ±1 polynomial u of degree n−1. Namely, repeatedly cut the degree in half at the price of doubling the number of polynomials, and once the degree is small enough use the "trivial implementation" of just computing all the powers of x. Analyzing this approach, denote by M(k,n) the number of multiplications that it takes to evaluate k polynomials of degree (n−1). Then one has:

$$M(k,n)=\min(n-1, M(2k,n/2)+k+1)$$

To see the bound M(k,n)≤M(2k,n/2)+k+1, note that once the top- and bottom-halves of all the k polynomials are evaluated, one needs one multiplication per polynomial to put the two halves together, and one last multiplication to compute $x^n$ (which is needed in the next level of the recursion) from $x^{n/2}$ (which was computed in the previous level). Obviously, making the recursive call takes less multiplications than the "trivial implementation" whenever n−1>(n/2−1)+k+1. Also, an easy inductive argument shows that the "trivial implementation" is better when n−1<(n/2−1)+k+1. Thus, one gets the recursive formula:

$$M(k,n) = \begin{cases} M(2k, n/2)+k+1 & \text{when } n/2 > k+1 \\ n-1 & \text{otherwise.} \end{cases}$$

Solving this formula obtains M(k,n)≤min(n−1,$\sqrt{2kn}$). In particular, the number of multiplications needed for evaluating a single degree-(n−1) polynomial is M(1,n)≤$\sqrt{2n}$.

This "more efficient" batch procedure relies on the assumption that one has enough memory to keep all these partially evaluated polynomials at the same time. The experiments, in view of the equipment used, were only able to use it in dimensions up to $n=2^{15}$, trying to use it in higher dimension resulted in the process being killed after it ran out of memory. A more sophisticated implementation could take the available amount of memory into account, and stop the recursion earlier to preserve space at the expense of more running time. An alternative approach, of course, is to store partial results to disk. More experiments are needed to determine what approach yields better performance for which parameters. It is also noted that increases in equipment power (e.g., processing power, storage space, access speed, etc.) may yield practicable solutions for higher dimensions.

5.2 The Euclidean Norm of Fresh Ciphertexts

When choosing the noise vector for a new ciphertext, one wants to make it as sparse as possible, i.e., increase as much as possible the probability q of choosing each entry as zero. The only limitation is that q needs to be bounded sufficiently below 1 to make it hard to recover the original noise vector from c.

There are two types of attacks that should be considered: lattice-reduction attacks that try to find the closest lattice point to c, and exhaustive-search/birthday attacks that try to guess the coefficients of the original noise vector. The lattice-reduction attacks should be thwarted by working with lattices with high-enough dimension, so one concentrates here on exhaustive-search attacks. Roughly, if the noise vector has l bits of entropy, then one expects birthday-type attacks to be able to recover it in $2^{l/2}$ time, so one needs to ensure that the noise has at least 2λ bits of entropy for security parameter λ. Namely, for dimension n one needs to choose q sufficiently smaller than one so that $$2^{(1-q)n} \cdot \binom{n}{qn} > 2^{2\lambda}.$$

Another "hybrid" attack is to choose a small random subset of the powers of r (e.g., only 200 of them) and "hope" that they include all the noise coefficients. If this holds then one can now search for a small vector in this low-dimension lattice (e.g., dimension 200). For example, if one were to work in dimension n=2048 and use only 16 nonzero entries for noise, then choosing 200 of the 2048 entries one has probability of about $$\left(\frac{200}{2048}\right)^{16} \approx 2^{54}$$

of including all of them (hence one can recover the original noise by solving $2^{54}$ instances of SVP in dimension 200). The same attack will have success probability of only ≈$2^{-80}$ if one were to use 24 nonzero entries.

For the public challenges a (somewhat aggressive) setting was chosen where the number of nonzero entries in the noise vector is between 15 and 20. Note that increasing the noise will only have a moderate effect on the performance numbers, for example using 30-40 nonzero entries is likely to cinrease the size of the key (and the running time) by only about 10%.

6 Decryption

The decryption procedure takes the ciphertext c (which implicitly represents the vector $\vec{c} = \langle c, 0, \ldots, 0 \rangle$) and "in principle" it also has the two matrices V, W. It recovers the vector $\vec{a} = 2\vec{u} + b \cdot \vec{e}_1$ that was used during encryption as:

$$\vec{a} \leftarrow \vec{c} \bmod V = \vec{c}\left(\left[\vec{c} \times \underbrace{V^{-1}}_{=W/d}\right] \times V\right) = \underbrace{[\vec{c} \times W/d]}_{[\cdot] \text{ is fractional part}} \times V,$$

and then outputs the least significant bit of the first entry of $\vec{a}$, namely $b := a_0 \bmod 2$.

The reason that this decryption procedure works is that the rows of V (and therefore also of W) are close to being orthogonal to each other, and hence the "operator infinity-norm" of W is small. Namely, for any vector $\vec{x}$, the largest entry in $\vec{x} \times W$ (in absolute value) is not much larger than the largest entry in $\vec{x}$ itself. Specifically, the procedure from above succeeds when all the entries of $\vec{a} \times W$ are smaller than $d/2$ in absolute value. To see that, note that $\vec{a}$ is the distance between $\vec{c}$ and some point in the lattice L(V), namely one can express $\vec{c}$ as $\vec{c} = \vec{y} \times V + \vec{a}$ for some integer vector $\vec{y}$. Hence one has:

$$[\vec{c} \times W/d] \times V = [\vec{y} \times V \times W/d + \vec{a} \times W/d] \stackrel{(*)}{=} [\vec{a} \times W/d] \times V$$

where the equality (*) follows since $\vec{y} \times V \times W/d$ is an integer vector. The vector $[\vec{a} \times W/d] \times V$ is supposed to be $\vec{a}$ itself, namely one needs $[\vec{a} \times W/d] \times V = \vec{a} = (\vec{a} \times W/d) \times V$. But this last condition holds if and only if $[\vec{a} \times W/d] = (\vec{a} \times W/d)$, i.e., $\vec{a} \times W/d$ is equal to its fractional part, which means that every entry in $\vec{a} \times W/d$ must be less than ½ in absolute value.

6.1 An Optimized Decryption Procedure

It is next shown that the encrypted bit b can be recovered by a significantly cheaper procedure: Recall that the (implicitly represented) ciphertext vector $\vec{c}$ is decrypted to the bit b when the distance from $\vec{c}$ to the nearest vector in the lattice L(V) is of the form $\vec{a} = 2\vec{u} + b\vec{e}_1$, and moreover all the entries in $\vec{a} \times W$ are less than $d/2$ in absolute value. As stated above, in this case one has $[\vec{c} \times W/d] = [\vec{a} \times W/d] = \vec{a} \times W/d$, which is equivalent to the condition $[\vec{c} \times W]_d = [\vec{a} \times W]_d = \vec{a} \times W$. Recall now that $\vec{c} = \langle c, 0, \ldots, 0 \rangle$, hence:

$$[\vec{c} \times W]_d = [c \cdot \langle w_0, w_1, \ldots, w_{n-1}\rangle]_d = \langle [cw_0]_d, [cw_1]_d, \ldots, [cw_{n-1}]_d\rangle.$$

On the other hand, one has:

$$[\vec{c} \times W]_d = \vec{a} \times W = 2\vec{u} \times W + b\vec{e}_1 \times W = 2\vec{u} \times W + b \cdot \langle w_0, w_1, \ldots, w_{n-1}\rangle.$$

Putting these two equations together, one sees that any decryptable ciphertext c must satisfy the relation:

$$\langle [cw_0]_d, [cw_1]_d, \ldots, [cw_{n-1}]_d\rangle = b \cdot \langle w_0, w_1, \ldots, w_{n-1}\rangle \pmod{2}.$$

In other words, for every i one has $[c \cdot w_i]_d = b \cdot w_i \pmod{2}$. It is therefore sufficient to keep only one of the $w_i$'s (which must be odd), and then recover the bit b as $b := [c \cdot w_i]_d \bmod 2$.

7 How Homomorphic is This Scheme?

Some experiments were run to get a handle on the degree and number of monomials that the somewhat homomorphic scheme can handle, and to help choose the parameters. In these experiments key pairs are generated for parameters n (dimension) and t (bit-length), and for each key pair encrypt many bits, evaluate on the ciphertexts many elementary symmetric polynomials of various degrees and number of variables, decrypt the results, and check whether or not one gets back the same polynomials in the plaintext bits. Table 1 shows supported degree vs. number of variables and bit-length of the generating polynomial, all tests were run in dimension n=128.

TABLE 1

| | m = #-of-variables | | | | |
|---|---|---|---|---|---|
| t = bit-length | m = 64 | m = 96 | m = 128 | m = 192 | m = 256 |
| t = 64 | 13 | 12 | 11 | 11 | 10 |
| t = 128 | 33 | 28 | 27 | 26 | 24 |
| t = 256 | 64 | 76 | 66 | 58 | 56 |
| t = 384 | 64 | 96 | 128 | 100 | 95 |

Cells contain the largest supported degree for every m, t combination

More specifically, for each key pair polynomials were tested on 64 to 256 variables. For every fixed number of variables m, 12 tests were run. In each test m bits were encrypted, evaluating all the elementary symmetric polynomials in these variables (of degree up to m), decrypting the results, and comparing them to the results of applying the same polynomials to the plaintext bits. For each setting of m, the highest degree was recorded for which all 12 tests were decrypted to the correct value. Call this the "largest supported degree" for those parameters.

These experiments used fresh ciphertexts of expected Euclidean length roughly $2 \cdot \sqrt{20} \approx 9$, regardless of the dimension. This was done by choosing each entry of the noise vector $\vec{u}$ as 0 with probability $$1 - \frac{20}{n},$$

and as ±1 with probability $$\frac{10}{n}$$

each. With that choice, the degree of polynomials that the somewhat-homomorphic scheme could evaluate did not depend on the dimension n: Various dimensions were tested from 128 to 2048 with a few settings of t and m, and the largest supported degree was nearly the same in all these dimensions. Thereafter the experiments tested all the other settings only in dimension n=128.

The results are described in Table 1. As expected, the largest supported degree grows linearly with the bit-length parameter t, and decreases slowly with the number of variables (since more variables means more terms in the polynomial).

These results can be more or less explained by the assumptions that the decryption radius of the secret key is roughly $2^t$, and that the noise in an evaluated ciphertext is roughly $c^{degree} \times \sqrt{\text{\#-of-monomials}}$, where c is close to the Euclidean norm of fresh ciphertexts (i.e., c≈9). For elementary symmetric polynomials, the number of monomials is exactly $$\binom{m}{deg}.$$

Hence to handle polynomials of degree deg with m variables, one needs to set t large enough so that $$2^t \geq c^{deg} \times \sqrt{\binom{m}{deg}},$$

in order for the noise in the evaluated ciphertexts to still be inside the decryption radius of the secret key.

Trying to fit the data from Table 1 to this expression, observe that c is not really a constant, rather it gets slightly smaller when t gets larger. For t=64 one has c∈[9.14,11.33], for t=128 one has c∈[7.36,8.82], for t=256 one gets c∈[7.34, 7.92], and for t=384 one has c∈[6.88,7.45]. The small deviation observed may stem from the fact that the norm of the individual monomials is not exactly $c^{deg}$ but rather has some distribution around that size, and as a result the norm of the sum of all these monomials differs somewhat from $\sqrt{\text{\#-of-monomials}}$ times the expected $c^{deg}$.

A Fully Homomorphic Scheme

8 Squashing the Decryption Procedure

Recall that the decryption routine of the "somewhat homomorphic" scheme decrypts a ciphertext c∈$Z_d$ using the secret key w∈$Z_d$ by setting b←[wc]$_d$ mod 2. Unfortunately, viewing c,d as constants and considering the decryption function $D_{c,d}$(w)=[wc]$_d$ mod 2, the degree of $D_{c,d}$ (as a polynomial in the secret key bits) is higher than what the somewhat-homomorphic scheme can handle. Hence that scheme is not yet bootstrappable. To achieve bootstrapping, therefore change the secret-key format and add some information to the public key to get a decryption routine of lower degree, as done in [3].

On a high level, add to the public key also a "big set" of elements $\{x_i \in Z_d : i=1, 2, \ldots, S\}$, such that there exists a very sparse subset of the $x_i$'s that sums up to w modulo d. The secret key bits will be the characteristic vector of that sparse subset, namely a bit vector $\vec{\sigma} = \langle \sigma_1, \ldots, \sigma_S \rangle$ such that the Hamming weight of $\vec{\sigma}$ is s<<S, and $\Sigma_i \sigma_i x_i = w \pmod{d}$.

Then, given a ciphertext c∈$Z_d$, post-process it by computing (in the clear) all the integers $y_i \stackrel{def}{=} \langle cx_i \rangle_d$ (i.e., c times $x_i$, reduced modulo d to the interval [0, d)). The decryption function $D_{c,d}(\vec{\sigma})$ can now be written as:

$$D_{c,d}(\vec{\sigma}) \stackrel{def}{=} \left[\sum_{i=1}^{S} \sigma_i y_i\right]_d \mod 2$$

Note that the $y_i$'s are in the interval [0,d) rather than [−d/2,+d/2). This is done for implementation convenience, and correctness is not impacted since the sum of these $y_i$'s is later reduced again modulo d to the internal [−d/2,+d/2). It is now shown that (under some conditions), this function $D_{c,d}(\cdot)$ can be expressed as a low-degree polynomial in the bits $\sigma_i$. One has:

$$\left[\sum_{i=1}^{S} \sigma_i y_i\right]_d = \left(\sum_{i=1}^{S} \sigma_i y_i\right) - d \cdot \left[\frac{\sum_i \sigma_i y_i}{d}\right]$$

$$= \left(\sum_{i=1}^{S} \sigma_i y_i\right) - d \cdot \left[\sum_{i=1}^{S} \sigma_i \frac{y_i}{d}\right],$$

and therefore to compute $D_{c,d}(\vec{\sigma})$ one can reduce modulo 2 each term in the right-hand-side separately, and then XOR all these terms:

$$D_{c,d}(\vec{\sigma}) = \left(\bigoplus_{i=1}^{S} \sigma_i \langle y_i \rangle_2\right) \oplus \langle d \rangle_2 \cdot \left\langle\left[\sum_{i=1}^{S} \sigma_i \frac{y_i}{d}\right]\right\rangle_2$$

$$= \bigoplus_{i=1}^{S} \sigma_i \langle y_i \rangle_2 \oplus \left\langle\left[\sum_{i=1}^{S} \sigma_i \frac{y_i}{d}\right]\right\rangle_2$$

(where the last equality follows since d is odd and so $\langle d \rangle_2 = 1$). Note that the $y_i$'s and d are constants that are in the clear, and $D_{c,d}$ is a function only of the $\sigma_i$'s. Hence the first big XOR is just a linear functions of the $\sigma_i$'s, and the only nonlinear term in the expression above is the rounding function $$\left\langle\left[\sum_{i=1}^{S} \sigma_i \frac{y_i}{d}\right]\right\rangle_2.$$

Observe that if the ciphertext c of the underlying scheme is much closer to the lattice than the decryption capability of w, then wc is similarly much closer to a multiple of d than d/2. The bootstrappable scheme will therefore keep the noise small enough so that the distance from c to the lattice is below 1/(s+1) of the decryption radius, and thus the distance from wc to the nearest multiple of d is bounded below d/2(s+1). (Recall that s is the number of nonzero bits in the secret key.) Namely, one has:

$$abs([wc]_d) = abs\left(\left[\sum_{i=1}^{S} \sigma_i y_i\right]_d\right) < \frac{d}{2(s+1)}$$

and therefore also:

$$abs\left(\left[\sum_{i=1}^{S} \sigma_i \frac{y_i}{d}\right]\right) < \frac{1}{2(s+1)},$$

where abs(*) indicates absolute value.

Recall now that the $y_i$'s are all in [0, d−1], and therefore $y_i/d$ is a rational number in [0,1). Let p be the precision parameter, which is set to:

$$p \stackrel{def}{=} \lceil \log_2(s+1) \rceil.$$

For every i, denote by $z_i$ the approximation of $y_i/d$ to within p bits after the binary point. Note that $z_i$ is in the interval [0,1], and in particular it could be equal to 1. Formally, $z_i$ is the closest number to $y_i/d$ among all the numbers of the form $a/2^p$, with a an integer and $0 \leq a \leq 2^P$. Then $$\text{abs}\left(z_i - \frac{y_i}{d}\right) \leq 2^{-(p+1)} \leq 1/2(s+1).$$

Consider now the effect of replacing one term of the form $$\sigma_i \cdot \frac{y_i}{d}$$

in the sum above by $\sigma_i \cdot z_i$: If $\sigma_i = 0$ then the sum remains unchanged, and if $\sigma_i = 1$ then the sum changes by at most $2^{-(p+1)} \leq \frac{1}{2}(s+1)$. Since only s of the $\sigma_i$'s are nonzero, it follows that the sum $\Sigma_i \sigma_i z_i$ is at most $s/2(s+1)$ away from the sum $$\sum_i \sigma_i \frac{y_i}{d}.$$

And since the distance between the latter sum and the nearest integer is smaller than $\frac{1}{2}(s+1)$, then the distance between the former sum and the same integer is strictly smaller than $\frac{1}{2}(s+1) + s/2(s+1) = \frac{1}{2}$. It follows that both sums will be rounded to the same integer, namely:

$$\left\lceil \sum_{i=1}^{S} \sigma_i \frac{y_i}{d} \right\rfloor = \left\lceil \sum_{i=1}^{S} \sigma_i z_i \right\rfloor$$

It is concluded that for a ciphertext c which is close enough to the underlying lattice, the function $D_{c,d}$ can be computed as $D_{c,d}(\vec{\sigma}) = \langle \lceil \Sigma_i \sigma_i z_i \rfloor \rangle_2 \oplus \oplus_i \sigma_i \langle y_i \rangle_2$, and moreover the only nonlinear part in this computation is the addition and rounding (modulo two) of the $z_i$'s, which all have only p bits of precision to the right of the binary point.

8.1 Adding the $z_i$'s

Although it was shown in [3] that adding a sparse subset of the "low precision" numbers $\sigma_i z_i$'s can be done with a low-degree polynomial, a naive implementation (e.g., using a simple grade-school addition) would require computing about s·S multiplications to implement this operation. Now described is an alternative procedure that requires only about $s^2$ multiplications.

For this alternative procedure, use a slightly different encoding of the sparse subset. Namely, instead of having a single vector $\vec{\sigma}$ of Hamming weight s, instead keep s vectors $\vec{\sigma}_1, \ldots, \vec{\sigma}_s$, each of Hamming weight 1, whose bitwise sum is the original vector $\vec{\sigma}$. (In other words, split the '1'-bits in $\vec{\sigma}$ between the s vectors $\vec{\sigma}_k$, putting a single '1' in each vector.)

In this implementation one also has s different big sets, $B_1, \ldots, B_s$, and each vector $\vec{\sigma}_k$ chooses one element from the corresponding $B_k$, such that these s chosen elements sum up to w modulo d. Denote the elements of $B_k$ by $\{x(k,i): i=1, 2, \ldots, S\}$, and the bits of $\vec{\sigma}_k$ by $\sigma_{k,i}$. Also denote $y(k,i) \stackrel{def}{=} \langle c \cdot x(k,i) \rangle_d$ and $z(k,i)$ is the approximation of $y(k,i)/d$ with p bits of precision to the right of the binary point. Using these notations, one can re-write the decryption function $D_{c,d}$ as:

$$D_{c,d}(\vec{\sigma}_1, \ldots, \vec{\sigma}_s) = \left\langle \left\lceil \sum_{k=1}^{s} \underbrace{\left(\sum_{i=1}^{S} \sigma_{k,i} z(k,i)\right)}_{q_k} \right\rfloor \right\rangle_2 \oplus \bigoplus_{i,k} \sigma_{k,i} \langle y(k,i) \rangle_2 \qquad (9)$$

Denoting $q_k \stackrel{def}{=} \Sigma_i \sigma_{k,i} z(k,i)$ (for $k=1, 2, \ldots, s$), observe that each $q_k$ is obtained by adding S numbers, at most one of which is nonzero. One can therefore compute the j'th bit of $q_k$ by simply XOR-ing the j'th bits of all the numbers $\sigma_{k,i} z(k,i)$ (for $i=1, 2, \ldots, S$), since one knows a-priori that at most one of these bits in nonzero. When computing homomorphic decryption, this translates to just adding modulo d all the ciphertexts corresponding to these bits. The result is a set of s numbers $u_j$, each with the same precision as the z's (i.e., only $p = \lceil \log(s+1) \rceil$ bits to the right of the binary point).

Grade-School Addition.

Once one has only s numbers with $p = \lceil \log(s+1) \rceil$ bits of precision in binary representation, one can use the simple grade-school algorithm for adding them: Arrange these numbers in s rows and p+1 columns: one column for each bit-position to the right of the binary point, and one column for the bits to the left of the binary point. Denote these columns (from left to right) by indexes $0, -1, \ldots, -p$. For each column keep a stack of bits, and process the columns from right ($-p$) to left (0): for each column compute the carry bits that it sends to the columns on its left, and then push these carry bits on top of the stacks of these other columns before moving to process the next column.

In general, the carry bit that column $-j$ sends to column $-j+\Delta$ is computed as the elementary symmetric polynomial of degree $2^\Delta$ in the bits of column $-j$. If column $-j$ has m bits, then one can compute all the elementary symmetric polynomials in these bits up to degree $2^\Delta$ using less than $m2^\Delta$ multiplications. The $\Delta$'s that are needed as one processes the columns in order (column $-p$, then $1-p$, all the way through column $-1$) are $p-1, p-2, p-3, \ldots 1$, respectively. Also, the numbers of bits in these columns at the time that they are processed are $s, s+1, s+2, \ldots, s+p-1$, respectively. Hence the total number of multiplications throughout this process is bounded by $$s \cdot 2^{p-1} + \sum_{k=1}^{p-1} (s+k) \cdot 2^{p-k} = O(s^2).$$

Other Addition Algorithms

One can also use other algorithms to add these s numbers of precision p, which could be done in less than $O(s^2)$ multiplications. (For example, using the 3-for-2 trick as proposed in [3] requires only $O(s \cdot p)$ multiplications.) In this exemplary implementation grade-school addition is used nonetheless since (a) it results in a slightly smaller polynomial degree (only 15 rather than 16, for these parameters); and (b) the additions algorithm takes only about 10% of the total miming time, hence optimizing its performance had a relatively low priority.

9 Reducing the Public-Key Size

There are two main factors that contribute to the size of the public key of the fully-homomorphic scheme. One is the need to specify an instance of the sparse-subset-sum problem, and the other is the need to include in the public key also encryption of all the secret-key bits. In the next two subsections it is shown how to reduce the size of each of these two parts.

9.1 The Sparse-Subset-Sum Construction

Recall that with the optimization from Section 8.1, this instance of the Sparse-Subset-Sum problem consists of s "big sets" $B_1, \ldots, B_s$, each with S elements in $Z_d$, such that there is a collection of elements, one from each $B_k$, that add up to the secret key w modulo d.

Representing all of these big sets explicitly would require putting in the public key s·S elements from $Z_d$. Instead, keep only s elements in the public key, $x_1, \ldots, x_s$, and each of these elements implicitly defines one of the big sets. Specifically, the big sets are defined as geometric progressions in $Z_d$: the k'th big set $B_k$ consists of the elements $x(k,i) = \langle x_k \cdot R^i \rangle_d$ for $i=0, 1, \ldots, S-1$, where R is some parameter. The sparse subset is still one element from each progression, such that these s elements add up to the secret key w. Namely, there is a single index $i_k$ in every big set such that $\Sigma_k x(k, i_k) = w \pmod{d}$. The parameter R is set to avoid some lattice-reduction attacks on this specific form of the sparse-subset-sum problem, see the bottom of Section 10.2 for more details.

9.2 Encrypting the Secret Key

As discussed in Section 8.1, the secret key of the squashed scheme consists of s bit-vectors, each with S bits, such that only one bit in each vector is one, and the others are all zeros. If one were to encrypt each one of these bits individually, then one would need to include in the public key s·S ciphertexts, each of which is an element in $Z_d$. Instead, it is preferable to include an implicit representation that takes less space but still allows for computing encryptions of all these bits.

Since the underlying scheme is somewhat homomorphic, then in principle it is possible to store for each big set $B_k$ an encrypted description of the function that on input i outputs 1 if an only if (iff) $i = i_k$. Such a function can be represented using only log S bits (i.e., the number of bits that it takes to represent $i_k$), and it can be expressed as a polynomial of total degree log S in these bits. Hence, in principle it is possible to represent the encryption of all the secret-key bits using only s log S ciphertexts, but there are two serious problems with this solution:

Recall the decryption function from Equation (9), $$D_{c,d}(\ldots) = \left(\left\lfloor \sum_{k=1}^{s} \left(\sum_{i=1}^{S} \sigma_{k,i} z(k, i)\right)\right\rceil\right)_2 \oplus \bigoplus_{i,k} \sigma_{k,i} \langle y(k, i) \rangle_2.$$

Since the encryption of each of the bits $\sigma_{k,i}$ is now a degree-log S polynomial in the ciphertexts that are kept in the public key, then one needs the underlying somewhat-homomorphic scheme to support polynomials of degrees log S times higher than what would be needed if all the $\sigma_{k,i}$ themselves were stored. Perhaps even more troubling is the increase in running time: Whereas before computing the bits of $$q_k = \sum_{i=1}^{S} \sigma_{k,i} z(k, i)$$

involved only additions, now one also needs S log S multiplications to determine all the $\sigma_{k,i}$'s, thus negating the running-time advantage of the optimization from Section 8.1.

Instead, use a different tradeoff that lets one store in the public key only $O(\sqrt{S})$ ciphertexts for each big set, and compute $p\sqrt{S}$ multiplications per each of the $q_k$'s. Specifically, for every big set $B_k$ keep in the public key some $c = \lceil 2\sqrt{S} \rceil$ ciphertexts, all but two of them are encryptions of zero. Then the encryption of every secret-key bit $\sigma_{k,i}$ is obtained by multiplying two of these ciphertexts. Specifically, let $a, b \in [1, c]$, and denote the index of the pair $(a,b)$ (in the lexicographical order over pairs of distinct numbers in $[1, c]$) by:

$$i(a, b) \stackrel{def}{=} (a - 1) \cdot c - \binom{a}{2} + (b - a)$$

In particular, if $a_k$, $b_k$ are the indexes of the two 1-encryptions (in the group corresponding to the k'th big set $B_k$), then $i_k = i(a_k, b_k)$.

A naive implementation of the homomorphic decryption with this representation will compute explicitly the encryption of every secret key bit (by multiplying two ciphertexts), and then add a subset of these ciphertexts. Here one can use a better implementation, where first add the ciphertexts in groups before multiplying. Specifically, let $\{\eta \text{hd } m^{(k)} : k \in [s], m \in [c]\}$ be the bits whose encryption is stored in the public key (where for each k exactly two of the bits $\eta \text{hd } m^{(k)}$ are '1' and the rest are '0', and each of the bits $\sigma_{k,i}$ is obtained as a product of two of the $\eta \text{hd } m^{(k)}$'s). Then compute each of the $q_k$'s as:

$$q_k = \sum_{a,b} \underbrace{\eta_a^{(k)} \eta_b^{(k)}}_{\sigma(k, i(a,b))} z(k, i(a, b)) \quad (10)$$

$$= \sum_{a} \eta_a^{(k)} \sum_{b} \eta_b^{(k)} z(k, i(a, b))$$

Since one has the bits of $z(k, i(a, b))$ in the clear, one can get the encryptions of the bits of $\eta \text{hd } b^{(k)} z(k, i(a, b))$ by multiplying the ciphertext for $\eta \text{hd } b^{(k)}$ by either zero or one. The only real $Z_d$ multiplications that are needed for implementation are the multiplications by the $\eta \text{hd } a^{(k)}$'s, and one only has $O(p\sqrt{S})$ such multiplications for each $q_k$.

Note that there is a space-time tradeoff by choosing different values of the parameter c (i.e., the number of ciphertexts that are stored in the public key for every big set). One must choose $c \geq \lceil \sqrt{2S} \rceil$ to be able to encode any index $i \in [S]$ by a pair $$(a, b) \in \binom{c}{2},$$

but one can choose it even larger. Increasing c will increase the size of the public key accordingly, but decrease the number of multiplications that need to be computed when evaluating Equation (10). In particular, setting $c = \lceil 2\sqrt{S} \rceil$ increases the space requirements (over $c = \lceil \sqrt{2S} \rceil$) only by a $\sqrt{2}$ factor, but cuts the number of multiplications in half. Accordingly, in this exemplary implementation use the setting $c = \lceil 2\sqrt{S} \rceil$.

10 Setting the Parameters

Table 2 shows the various parameters of the fully homomorphic scheme. The specific numeric values correspond to the three challenges.

TABLE 2

| Parameter | Meaning |
| --- | --- |
| $\lambda = 72$ | security parameter (Section 10.1) |
| $\mu = 2.34, 0.58, 0.15$ | BDD-hardness parameter (Section 10.1) |

TABLE 2-continued

| Parameter | Meaning |
|---|---|
| s = 15 | size of the sparse subset |
| p = 4 | precision parameter: number of bits for the z(k, i)'s |
| d = 15 | the degree of the squashed decryption polynomial |
| t = 380 | bit-size of the coefficients of the generator polynomial v |
| n = $2^{11}, 2^{13}, 2^{15}$ | the dimension of the lattice |
| S = 1024, 1024, 4096 | size of the big sets |
| R = $2^{51}, 2^{204}, 2^{850}$ | ratio between elements in the big sets |

10.1 The Security Parameters $\lambda$ and $\mu$

There are two main security parameters that drive the choice of all the others: one is a security parameter $\lambda$ (that controls the complexity of exhaustive-search/birthday attacks on the scheme), and the other is a "BDDP-hardness parameter" $\mu$. More specifically, the parameter $\mu$ quantifies the exponential hardness of the Shortest-Vector-Problem (SVP) and Bounded-Distance Decoding problems (BDDP) in lattices. Specifically, assume that for any k and (large enough) n, it takes time $2^k$ to approximate SVP or BDDP in n-dimensional lattices (What is really being assumed is that this hardness holds for the specific lattices that result from the scheme) to within a factor of $$2^{\frac{\mu \cdot n}{k/\log k}}.$$

Use this specific form since it describes the asymptotic behavior of the best algorithms for approximating SVP and BDDP (i.e., the ones based on block reductions [14]).

One can make a guess as to the "true value" of $\mu$ by extrapolating from the results of Gama and Nguyen [2]: They reported achieving BDDP approximation factors of $1.01^n \approx 2^{n/70}$ for "unique shortest lattices" in dimension n in the range of 100-400. Assuming that their implementation took $\approx 2^{40}$ computation steps to compute, one has that $\mu \log(40)/40 \approx 1/70$, which gives $\mu \approx 0.11$.

For the challenges, however, start from larger values of $\mu$, corresponding to stronger (maybe false) hardness assumptions. Specifically, the three challenges correspond to the three values $\mu \approx 2.17$, $\mu \approx 10.54$, and $\mu \approx 0.14$. This makes it plausible that at least the smaller challenges could be solved (once the lattice-reduction technology is adapted to lattices in dimensions of a few thousands). For the security parameter $\lambda$ chose the moderate value $\lambda = 72$. (This means that there may be birthday-type attacks on the scheme with complexity $2^{72}$, at least in a model where each bignum arithmetic operation counts as a single step.)

10.2 The Other Parameters

Once one has the parameters $\lambda$ and $\mu$, one can compute all the other parameters of the system.

The Sparse-Subset Size s and Precision Parameter p.

The parameter that most influences this implementation is the size of the sparse subset. Asymptotically, this parameter can be made as small as $\Theta(\lambda/\log \lambda)$, so just set it to be $\lambda/\log \lambda$, rounded up to the next power of two minus one. For $\lambda = 72$ one has $\lambda/\log \lambda \approx 11.7$, so set s=15.

Next determine the precision p that needs to be kept of the z(k,i)'s. Recall that for any element in any of the big sets x(k,i)∈$B_k$ set z(k,i) to be a p-bit-precision approximation of the rational number $\langle c \cdot x(k,i) \rangle_d/d$. To avoid rounding errors, one needs p to be at least $\lceil \log(s+1) \rceil$, so for s=15 one has p=4.

This means that one represents each z(k,i) with four bits of precision to the right of the binary digit, and one bit to the left of the binary digit (since after rounding one may have z(k,i)=1).

The Degree of Squashed Decryption.

Observe that using the grade-school algorithm for adding $s=2^p-1$ integers, each with p bits of precision, the degree of the polynomial that describes the carry bit to the p+1'th position is less than $2^p$. Specifically for the cases of s=15 and p=4, the degree of the carry bit is exactly 15. Table 3 shows carry propagation for grade-school addition of 15 numbers with four bits of precision. To see this, Table 3 describes the carry bits that result from adding the bits in each of the four columns to the right of the binary point (where one ignores carry bits beyond the first position to the left of the point):

The carry bit from column −4 to column −3 is a degree-2 polynomial in the bits of column −4, the carry bit to column −2 is a degree-4 polynomial, the carry bit to column −1 is a degree-8 polynomial, and there are no more carry bits (since only 15 bits are added).

The carry bit from column −3 to column −2 is a degree-2 polynomial in the bits of column −3, including the carry bit from column −4. But since that carry bit is itself a degree-2 polynomial, then any term that includes that carry bit has degree 3. Hence the total degree of the carry bit from column −3 to column −2 is 3. Similarly, the total degrees of the carry bits from column −3 to columns −1, 0 are 5, 9, respectively (since these are products of 4 and 8 bits, one of which has degree 2 and all the others have degree 1).

By a similar argument every term in the carry from column −3 to −2 is a product of two bits, but since column −3 includes two carry bits of degrees 4 and 3, then their product has total degree 7. Similarly, the carry to column 0 has total degree 9 (=4+3+1+1).

Repeating the same argument, one has that the total degree of the carry bit from column −1 to columns 0 is 15 (=7+8).

It is concluded that the total degree of the grade-school addition algorithm for this case is 15, but since one is using the space/degree trade-off from Section 9.2 then every input to this algorithm is itself a degree-2 polynomial, so one has total degree of 30 for the squashed-decryption polynomial.

One can check that the number of degree-15 monomials in the polynomial representing the grade-school addition algorithm is $$\binom{15}{8} \times \binom{15}{4} \times \binom{15}{2} \times 15 \approx 2^{34}.$$

Also, every bit in the input of the grade-school addition algorithm is itself a sum of S bits, each of which is a degree-2 monomial in the bits from the public key. Hence each degree-15 monomial in the grade-school addition polynomial corresponds to $S^{15}$ degree-30 monomials in the bits from the public key, and the entire decryption polynomial has $2^{34} \times S^{15}$ degree-30 monomials.

TABLE 3

| columns: | 0• | −1 | −2 | −3 | −4 |
|---|---|---|---|---|---|
| carry-degree from column −4: | | | 8 | 4 | 2 |
| carry-degree from column −3: | 9 | 5 | 3 | | |
| carry-degree from column −2: | 9 | 7 | | | |

TABLE 3-continued

| columns: | 0• | −1 | −2 | −3 | −4 |
|---|---|---|---|---|---|
| carry-degree from column −1: | 15 | | | | |
| max degree: | 15 | 8 | 4 | 2 | 1 |

The Bit-Size t of the Generating Polynomial.

Since one needs to support a product of two homomorphically-decrypted bits, then the scheme must support polynomials with $2^{68} \cdot S^{30}$ degree-60 monomials. Recall from Section 5.2 that one chooses the noise in fresh ciphertexts with roughly 15-20 nonzero ±1 coefficients, and one multiplies the noise by 2, so fresh ciphertexts have Euclidean norm of roughly $2\sqrt{20} \approx 9$. The experimental results from Section 7 suggest that for a degree-60 polynomial with M terms one needs to set the bit-length parameter t large enough so that $2^t \geq c^{60} \times \sqrt{M}$ where c is slightly smaller than the norm of fresh ciphertexts (e.g., $c \approx 7$ for sufficiently large values of t).

Therefore it is expected to be able to handle homomorphic-decryption (plus one more multiplication) if one sets t large enough so that $2^{t-p} \geq c^{60} \cdot \sqrt{2^{68} \cdot S^{30}}$. (Use $2^{t-p}$ rather than $2^t$ since one needs the resulting ciphertext to be $2^p$ closer to the lattice than the decryption radium of the key, see Section 8.) For the concrete parameters (p=4, S≦2048) one has the requirement $2^{t-p} \geq c^{60} \cdot 2^{(68+11\cdot 30)/2} = c^{60} \cdot 2^{199}$.

Using the experimental estimate $c \approx 7$ (so $c^{60} \approx 2^{170}$), this means that one expects to be able to handle bootstrapping for $t \approx 170+199+4=373$. The experiments confirm this expectation, in fact the experiments were able to support homomorphic decryption of the product of two bits by setting the bit-length parameter to t=380.

The Dimension n.

One needs to choose the dimension n large enough so that the achievable approximation factor $2^{\mu n \, \log \lambda / \lambda}$ is larger than the Minkowski bound for the lattice (which is $\approx 2^t$), so one needs $n = \lambda t / \mu \log \lambda$. In this case t=380 and $\lambda / \log \lambda \approx 11.67$, so choosing the dimension as $n \in \{2^{11}, 2^{13}, 2^{15}\}$ corresponds to the settings $\mu \in \{2.17, 0.54, 0.14\}$, respectively.

Another way to look at the same numbers is to assume that the value $\mu \approx 0.11$ from the work of Gama and Nguyen [2] holds also in much higher dimensions, and deduce the complexity of breaking the scheme via lattice reduction. For n=2048 one has $\lambda / \log \lambda = 2048 \cdot 0.11 / 380 < 1$, which means that the small challenge should be readily breakable. Repeating the computations with this value of $\mu = 0.11$ for the medium and large challenges yields $\lambda \approx 6$ and $\lambda \approx 55$, corresponding to complexity estimates of $2^6$ and $2^{55}$, respectively. Hence, if this estimate holds then even the large challenge may be feasibly breakable (albeit with significant effort).

This "optimistic" view should be taken with a grain of salt, however, since there are significant polynomial factors that need to be accounted for. It is expected that once these additional factors are incorporated, the large challenge will turn out to be practically secure, perhaps as secure as RSA-1024. It is hoped that the challenges will spur additional research into the "true hardness" of lattice reduction in these high dimensions.

The Big-Set Size S.

One constraint on the size of the big sets is that birthday-type exhaustive search attacks on the resulting SSSP problem should be hard. Such attacks take time $S^{\lceil s/2 \rceil}$, so one needs $S^{\lceil s/2 \rceil} \geq 2^\lambda$. For the setting with $\lambda=72$, s=15, one needs $S^8 \geq 2^{72}$, which means S≧512.

Another constraint on S is that it has to be large enough to thwart lattice attacks on the SSSP instance. The basic lattice-based attack consists of putting all the s·S elements in all the big sets (denoted $\{x(k,i):k=1,\ldots,s, i=1,\ldots,S\}$) in the following matrix:

$$B = \begin{pmatrix} 1 & & & & & x(1,1) \\ & 1 & & & & x(1,2) \\ & & \ddots & & & \vdots \\ & & & 1 & & x(s,S) \\ & & & & 1 & -w \\ & & & & & d \end{pmatrix}.$$

with w being the secret key of the somewhat homomorphic scheme (recall that here is considered an attacker who knows w and tries to recover the sparse subset) and d being the determinant of the lattice (i.e., the modulus in the public key). Clearly, if $\sigma_{1,1}, \ldots, \sigma_{s,S}$ are the bits of the secret key, then the lattice spanned by the rows of B contains the vector $\langle \sigma_{1,1}, \ldots, \sigma_{s,S}, 1, 0 \rangle$, whose length is $\sqrt{sS+1}$. To hide that vector, one needs to ensure that the BDDP approximation factor for this lattice is larger than the Minkowski bound for it, namely $2^{\mu(sS+2) \log \lambda / \lambda} \geq \sqrt{sS+2} \sqrt{d} \approx 2^{tn/(sS+2)}$, which is roughly equivalent to $sS \geq \sqrt{tn\lambda / \mu \log \lambda}$. Using s=15, t=380, $\lambda=72$ and the values of n and $\mu$ in the different dimensions, this gives the bounds S≧137 for the small challenge, S≧547 for the medium challenge, and S≧2185 for the large challenge.

Combining the two constraints, set S=512 for the small challenge, S=547 for the medium challenge, and S=2185 for the large challenge.

The Ratio R Between Elements in the Big Sets.

Since "big sets" of a special type (i.e., geometric progressions mod d) are used, consider also a lattice attack that uses this special form. Namely, consider the lattice that includes only the first element in each progression:

$$B = \begin{pmatrix} 1 & & & & & x(1,1) \\ & 1 & & & & x(2,1) \\ & & \ddots & & & \\ & & & 1 & & x(s,1) \\ & & & & 1 & -w \\ & & & & & d \end{pmatrix}$$

and use the fact that there is a combination of these x(i,1)'s with coefficients at most $R^{S-1}$ that yields the element w modulo d. R must therefore be chosen large enough so that such combinations likely exist for many w's. This holds when $R^{s(S-1)} > d \approx 2^{nt}$. Namely, one needs $\log R > nt/sS$. For the parameters in dimensions $2^{11}, 2^{13}, 2^{15}$, one has $$\log R \geq \frac{380}{15} \cdot \left\{ \frac{2^{11}}{512}, \frac{2^{13}}{547}, \frac{2^{15}}{2185} \right\} \approx \{102, 381, 381\}.$$

11 Performance

Table 3 shows parameters of the underlying somewhat-homomorphic scheme.

The bit-length of the determinant is $|d| \approx \log_2 d$. Decryption time in dimension 512 is below the precision of the measurements. Tables 4 and 5 show parameters of the fully homomorphic scheme, as used for the public challenges.

TABLE 3

| Dimension n | bit-size t | determinant d | keyGen | Encrypt | Decrypt |
|---|---|---|---|---|---|
| 512 | 380 | \|d\| = 195764 | 0.32 sec | 0.19 sec | — |
| 2048 | 380 | \|d\| = 785006 | 1.2 sec | 1.8 sec | 0.02 sec |
| 8192 | 380 | \|d\| = 3148249 | 10.6 sec | 19 sec | 0.13 sec |
| 32768 | 380 | \|d\| = 12625500 | 3.2 min | 3 min | 0.66 sec |

A strong contemporary machine was used to evaluate the performance of this implementation: It was run on an IBM System x3500 server, featuring a 64-bit quad-core Intel® Xeon® E5450 processor, running at 3 GHz, with 12 MB L2 cache and 24 GB of RAM.

The implementation uses Shoup's NTL library [15] version 5.5.2 for high-level numeric algorithms, and GNU's GMP library [7] version 5.0.1 for the underlying integer arithmetic operations. The code was compiled using the gcc compiler (version 4.4.1) with compilation flags gcc-O2-m64.

TABLE 4

| Dimension n | bit-size t | sparse-subset-size s | big-set size S | big-set ratio R |
|---|---|---|---|---|
| 512 | 380 | 15 | 512 | $2^{26}$ |
| 2048 | 380 | 15 | 512 | $2^{102}$ |
| 8192 | 380 | 15 | 547 | $2^{381}$ |
| 32768 | 380 | 15 | 2185 | $2^{381}$ |

TABLE 5

| Dimension n | bit-size t | # of ctxts in PK (s · c) | PK size ≈s · c · \|d\| | keyGen | Recrypt |
|---|---|---|---|---|---|
| 512 | 380 | 690 | 17 MByte | 2.5 sec | 6 sec |
| 2048 | 380 | 690 | 69 MByte | 41 sec | 32 sec |
| 8192 | 380 | 705 | 284 MByte | 8.4 min | 2.8 min |
| 32768 | 380 | 1410 | 2.25 GByte | 2.2 hour | 31 min |

The main results of the experiments are summarized in Tables 3 and 5, for the parameter-setting that was used to generate the public challenges [6]. Table 3 summarizes the main parameters of the underlying somewhat-homomorphic scheme. Recall that the public key of the underlying scheme consists of two \|d\|-bit integers and the secret key is one \|d\|-bit integer, so the size of these keys range from 50/25 KB for dimension 512 up to 3/1.5 MB for dimension 32768.

Table 5 summarizes the main parameters of the fully homomorphic scheme. Note that most of the key-generation time is spent encrypting the secret-key bits: indeed one can check that key generation time for a public key with m ciphertexts takes roughly $\sqrt{m}$ longer than encryption of a single bit. (This is due to the batch encryption procedure from Section 5.1.)

Also note that 80-90% of the Recrypt time is spent adding the S numbers in each of the s big-sets, to come up with the final s numbers, and only 10-20% of the time is spent on the grade-school addition of these final s numbers. Even with the optimization from Section 9.2, the vast majority of that 80-90% is spent computing the multiplications from Equation (10). For example, in dimension 32768 one computes a single Recrypt operation in 31 minutes, of which 23 minutes are used to compute the multiplications from Equation (10), about 3.5 minutes are used to compute the arithmetic progressions (which are used for the big sets), two more minutes for the additions from Equation (10), and the remaining 2.5 minutes are spent doing grade-school addition.

REFERENCES:

[1] R. M. Avanzi. Fast evaluation of polynomials with small coefficients modulo an integer. Web document, http://caccioppoli.mac.rub.de/website/papers/trick.pdf, 2005.

[2] N. Gama and P. Q. Nguyen. Predicting lattice reduction. In *Advances in Cryptology—EUROCRYPT'08*, volume 4965 of *Lecture Notes in Computer Science*, pages 31-51. Springer, 2008.

[3] C. Gentry. Fully homomorphic encryption using ideal lattices. In STOC '09, pages 169-178 ACM, 2009.

[4] C. Gentry. Toward basing fully homomorphic encryption on worst-case hardness. In Advances in Cryptology—CRYPT'10, volume 6223 of *Lecture Notes in Computer Science*, pages {.Springer, 2010.

[5] Gentry, C., Halevi, S.: Implementing Gentry's Fully-Homomorphic Encryption Scheme. Cryptology ePrint Archive, Report 2010/520 (2010). http://eprint.iacr.org/.

[6] O. Goldreich, S. Goldwasser, and S. Halevi. Public-key cryptosystems from lattice reduction problems. In *Advances in Cryptology—CRYPTO'97*, volume 1294 of *Lecture Notes in Computer Science*, pages 112 {131. Springer, 1997.

[7] V. Lyubashevsky, C. Peikert, and O. Regev. On ideal lattices and learning with errors over rings. In *Advances in Cryptology—EUROCRYPT'10*, volume 6110 of *Lecture Notes in Computer Science*, pages 1 {23. Springer, 2010.

[8] D. Micciancio. Improving lattice based cryptosystems using the hermite normal form. In CaLC'01, volume 2146 of *Lecture Notes in Computer Science*, pages 126 {145. Springer, 2001.

[9] Ogura, N., Yamamoto, G., Kobayashi, T., Uchiyama, S.: An improvement of key generation algorithm for gentry's homomorphic encryption scheme. In: Advances in Information and Computer Security—5th International Workshop on Security, IWSEC 2010. *Lecture Notes in Computer Science*, vol. 6434, pp. 70-83. Springer (2010).

[10] M. S. Paterson and L. J. Stockmeyer. On the number of nonscalar multiplications necessary to evaluate polynomials. *SIAM Journal on Computing*, 2 (1):60 {66, 1973.

[11] C. Peikert and A. Rosen. Lattices that admit logarithmic worst-case to average-case connection factors. In *Proceedings of the 39th Annual ACM Symposium on Theory of Computing {STOC'07*, pages 478 {487. ACM, 2007.

[12] R. Rivest, L. Adleman, and M. Dertouzos. On data banks and privacy homomorphisms. In *Foundations of Secure Computation*, pages 169 {177. Academic Press, 1978.

[13] N. P. Smart and F. Vercauteren. Fully homomorphic encryption with relatively small key and ciphertext sizes. In *Public Key Cryptography—PKC'10*, volume 6056 of *Lecture Notes in Computer Science*, pages 420 {443. Springer, 2010.

[14] D. Stehle and R. Steinfeld. Faster fully homomorphic encryption. Cryptology ePrint Archive, Report 2010/299, 2010. http://eprint.iacr.org/.

[15] C. Gentry. *A fully homomorphic encryption scheme*. PhD thesis, Stanford University, 2009. http://crypto.stanford-.edu/craig.

[16] C. Gentry and S. Halevi. Public Challenges for Fully-Homomorphic Encryption. TBA, 2010.

[17] The GNU Multiple Precision Arithmetic Library. http://gmplib.org/, Version 5.0.1, 2010.

[18] C.-P. Schnorr. A hierarchy of polynomial time lattice basis reduction algorithms. *Theor. Comput. Sci.*, 53:201 {224, 1987.

[19] V. Shoup. NTL: A Library for doing Number Theory. http://shoup.net/ntl/, Version 5.5.2, 2010.

Further Exemplary Embodiments

FIG. 1 illustrates a block diagram of an exemplary system in which various exemplary embodiments of the invention may be implemented. The system 100 may include at least one circuitry 102 (e.g., circuitry element, circuitry components, integrated circuit) that may in certain exemplary embodiments include at least one processor 104. The system 100 may also include at least one memory 106 (e.g., a volatile memory device, a non-volatile memory device), and/or at least one storage 108. The storage 108 may include a non-volatile memory device (e.g., EEPROM, ROM, PROM, RAM, DRAM, SRAM, flash, firmware, programmable logic, etc.), magnetic disk drive, optical disk drive and/or tape drive, as non-limiting examples. The storage 108 may comprise an internal storage device, an attached storage device and/or a network accessible storage device, as non-limiting examples. The system 100 may include at least one program logic 110 including code 112 (e.g., program code) that may be loaded into the memory 106 and executed by the processor 104 and/or circuitry 102. In certain exemplary embodiments, the program logic 110, including code 112, may be stored in the storage 108. In certain other exemplary embodiments, the program logic 110 may be implemented in the circuitry 102. Therefore, while FIG. 1 shows the program logic 110 separately from the other elements, the program logic 110 may be implemented in the memory 106 and/or the circuitry 102, as non-limiting examples.

The system 100 may include at least one communications component 114 that enables communication with at least one other component, system, device and/or apparatus. As non-limiting examples, the communications component 114 may include a transceiver configured to send and receive information, a transmitter configured to send information and/or a receiver configured to receive information. As a non-limiting example, the communications component 114 may comprise a modem or network card. The system 100 of FIG. 1 may be embodied in a computer or computer system, such as a desktop computer, a portable computer or a server, as non-limiting examples. The components of the system 100 shown in FIG. 1 may be connected or coupled together using one or more internal buses, connections, wires and/or (printed) circuit boards, as non-limiting examples.

It should be noted that in accordance with the exemplary embodiments of the invention, one or more of the circuitry 102, processor(s) 104, memory 106, storage 108, program logic 110 and/or communications component 114 may store one or more of the various items (e.g., public/private key(s), ciphertexts, encrypted items, matrices, variables, equations, formula, operations, operational logic, logic) discussed herein. As a non-limiting example, one or more of the above-identified components may receive and/or store the information (e.g., to be encrypted, resulting from decryption) and/or the ciphertext (e.g., to be decrypted, to be operated on homomorphically, resulting from encryption). As a further non-limiting example, one or more of the above-identified components may receive and/or store the encryption function(s) and/or the decryption function(s), as described herein.

The exemplary embodiments of this invention may be carried out by computer software implemented by the processor 104 or by hardware, or by a combination of hardware and software. As a non-limiting example, the exemplary embodiments of this invention may be implemented by one or more integrated circuits. The memory 106 may be of any type appropriate to the technical environment and may be implemented using any appropriate data storage technology, such as optical memory devices, magnetic memory devices, semiconductor-based memory devices, fixed memory and removable memory, as non-limiting examples. The processor 104 may be of any type appropriate to the technical environment, and may encompass one or more of microprocessors, general purpose computers, special purpose computers and processors based on a multi-core architecture, as non-limiting examples.

Below are further descriptions of various non-limiting, exemplary embodiments of the invention. Some of the below-described exemplary embodiments are numbered separately for purposes of clarity. This numbering should not be construed as entirely separating the various exemplary embodiments since aspects of one or more exemplary embodiments may be practiced in conjunction with one or more other aspects or exemplary embodiments.

Building on section 5.1, it is noted that standard polynomial evaluation using Horner's rule takes n multiplications to implement for a degree-n polynomial. It is known that for small coefficients this can be reduced to only $O(\sqrt{n})$ multiplications. This has applications in many areas, and, in particular, is useful for implementing Gentry's fully-homomorphic encryption (e.g., in conjunction with bootstrapping). Other applications that require evaluation of small-coefficient polynomials arise in elliptic-curve cryptography, for example, see [1]. However, if the need arises to evaluate many polynomials then one must pay the $O(\sqrt{n})$ complexity cost for each one.

In this context, if t bits are used to represent a point then anything less than $2^{\sqrt{t}}$ would be considered "small." The coefficients have to be much smaller than the point at which the polynomial is evaluated.

One exemplary embodiment of the invention enables a reduction in this complexity cost. In such a manner, evaluating k polynomials of degree n (with small coefficients) can be done with only $O(\sqrt{kn})$ multiplications. When the number (k) of polynomials is large, this offers a significant speedup in operations.

Figure 2:
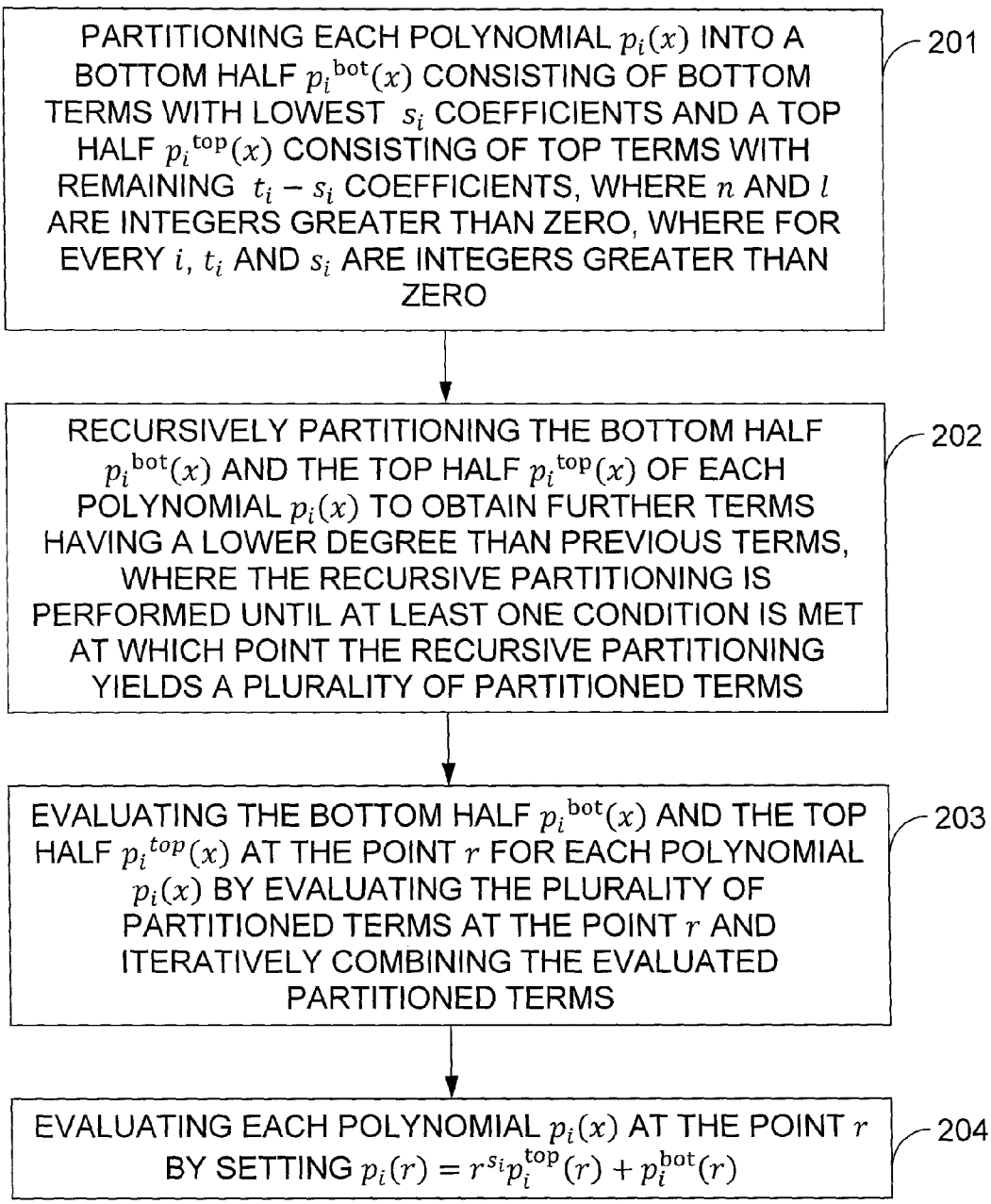
FIG. 2 depicts a logic flow diagram illustrative of the operation of an exemplary method, and the operation of an exemplary computer program, in accordance with the exemplary embodiments of this invention.

(1) In one exemplary embodiment of the invention, and as shown in FIG. 2, a method for evaluating at a point r one or more polynomials $p_1(x), \ldots, p_l(x)$ of maximum degree up to n−1, where for every i the polynomial $p_i(x)$ has a degree of exactly $t_i-1$, the method comprising: partitioning (e.g., by an apparatus, by at least one processor, by at least one processing component, by at least one integrated circuit, by hardware) each polynomial $p_i(x)$ into a bottom half $p_i^{bot}(x)$ consisting of bottom terms with lowest $s_i$ coefficients and a top half $p_i^{top}(x)$ consisting of top terms with remaining $t_i-s_i$ coefficients, where n and 1 are integers greater than zero, where for every i, $t_i$ and $s_i$ are integers greater than zero (201); recursively partitioning (e.g., by the apparatus) the bottom half $p_i^{bot}(x)$ and the top half $p_i^{top}(x)$ of each polynomial $p_i(x)$ to obtain further terms having a lower degree than previous terms, where the recursive partitioning is performed until at least one condition is met at which point the recursive partitioning yields a plurality of partitioned terms (202); evaluating (e.g., by the apparatus) the bottom half $p_i^{bot}(x)$ and the top half $p_i^{top}(x)$ at the point r for each polynomial $p_i(x)$ by evaluating the plurality of partitioned terms at the point r and iteratively combining the evaluated partitioned terms (203); and evaluating (e.g., by the apparatus) each polynomial $p_i(x)$ at the point r by setting $p_i(r)=r^{s_i}p_i^{top}(r)+p_i^{bot}(r)$ (204).

A method as above, where recursively partitioning the bottom half $p_i^{bot}(x)$ and the top half $p_i^{top}(x)$ of each polynomial $p_i(x)$ comprises iteratively doubling a number of terms while reducing a degree of the terms by half. A method as in any above, where the at least one condition is with respect to a current number of polynomial terms k and a current maximal degree m of the polynomial terms, where powers of r are expressed as $r, r^2, r^3, \ldots, r^m$, where in response to the at least one condition being met all the powers of r up to the current maximal degree m of the polynomial terms are computed and all of the polynomial terms are evaluated by adding up all of the powers of r multiplied by their respective coefficients:

$$p_i(r) = \sum_{r=0}^{r=m} p_{ij} r^j,$$

where for every i and j, $p_{ij}$ is the coefficient of $r^j$ in the polynomial $p_i(x)$. A method as in any above, where the at least one condition is with respect to a current number of polynomial terms k and a current maximal degree m of the polynomial terms, where the at least one condition comprises the current number of polynomial terms k being larger than half of the current maximal degree m:

$$k > \frac{m}{2}.$$

A method as in any above, where for every i, $$s_i = \frac{n}{2},$$

rounded to an integer.

A method as in any above, where iteratively combining the evaluated partitioned terms is performed until evaluations of the bottom half $p_i^{bot}(x)$ and the top half $p_i^{top}(x)$ at the point r are obtained. A method as in any above, where the method is utilized in conjunction with encryption of at least one bit. A method as in any above, further comprising: obtaining (e.g., by the apparatus) one or more ciphertext results by multiplying the evaluation of each of the one or more polynomials $p_1(x), \ldots, p_l(x)$ at the point r by two and for every i adding a bit $b_i$.

A computer program comprising machine readable instructions which when executed by an apparatus control it to perform the method as in any one of the preceding claims. A method as in any above, implemented as a computer program. A method as in any above, implemented as a program of instructions stored (e.g., tangibly embodied) on a program storage device (e.g., at least one memory, at least one computer-readable medium) and executable by a computer (e.g., at least one processor). A method as in any above, further comprising one or more aspects of the exemplary embodiments of the invention as described further herein.

(2) In another exemplary embodiment of the invention, and as shown in FIG. 2, a computer readable storage medium (e.g., a memory, at least one memory, non-transitory) tangibly embodying a program of instructions executable by a machine (e.g., a processor, at least one processor, a computer) for performing operations for evaluating at a point r one or more polynomials $p_1(x), \ldots, p_l(x)$ of maximum degree up to n−1, where for every i the polynomial $p_i(x)$ has a degree of exactly $t_i-1$, the operations comprising: partitioning each polynomial $p_i(x)$ into a bottom half $p_i^{bot}(x)$ consisting of bottom terms with lowest $s_i$ coefficients and a top half $p_i^{top}(x)$ consisting of top terms with remaining $t_i-s_i$ coefficients, where n and l are integers greater than zero, where for every i, $t_i$ and $s_i$ are integers greater than zero (201); recursively partitioning the bottom half $p_i^{bot}(x)$ and the top half $p_i^{top}(x)$ of each polynomial $p_i(x)$ to obtain further terms having a lower degree than previous terms, where the recursive partitioning is performed until at least one condition is met at which point the recursive partitioning yields a plurality of partitioned terms (202); evaluating the bottom half $p_i^{bot}(x)$ and the top half $p_i^{top}(x)$ at the point r for each polynomial $p_i(x)$ by evaluating the plurality of partitioned terms at the point r and iteratively combining the evaluated partitioned terms (203); and evaluating each polynomial $p_i(x)$ at the point r by setting $p_i(r)=r^{s_i}p_i^{top}(r)+p_i^{bot}(r)$ (204).

A computer readable storage medium as in any above, further comprising one or more additional aspects of the exemplary embodiments of the invention as described herein.

(3) In a further exemplary embodiment of the invention, an apparatus for evaluating at a point r one or more polynomials $p_1(x), \ldots, p_l(x)$ of maximum degree up to n−1, the apparatus comprising: at least one memory configured to store the one or more polynomials $p_1(x), \ldots, p_l(x)$, where for every i the polynomial $p_i(x)$ has a degree of exactly $t_i-1$; and at least one processor configured to partition each polynomial $p_i(x)$ into a bottom half $p_i^{bot}(x)$ consisting of bottom terms with lowest $s_i$ coefficients and a top half $p_i^{top}(x)$ consisting of top terms with remaining $t_i-s_i$ coefficients, where n and l are integers greater than zero, where for every i, $t_i$ and $s_i$ are integers greater than zero (201); recursively partition the bottom half $p_i^{bot}(x)$ and the top half $p_i^{top}(x)$ of each polynomial $p_i(x)$ to obtain further terms having a lower degree than previous terms, where the recursive partitioning is performed until at least one condition is met at which point the recursive partitioning yields a plurality of partitioned terms (202); evaluate the bottom half $p_i^{bot}(x)$ and the top half $p_i^{top}(x)$ at the point r for each polynomial $p_i(x)$ by evaluating the plurality of partitioned terms at the point r and iteratively combining the evaluated partitioned terms (203); and evaluate each polynomial $p_i(x)$ at the point r by setting $p_i(r)=r^{s_i}p_i^{top}(r)+p_i^{bot}(r)$ (204).

An apparatus as in any above, further comprising one or more additional aspects of the exemplary embodiments of the invention as described herein.

(4) In another exemplary embodiment of the invention, an apparatus for evaluating at a point r one or more polynomials $p_1(x), \ldots, p_l(x)$ of maximum degree up to n−1, where for every i the polynomial $p_i(x)$ has a degree of exactly $t_i-1$, the apparatus comprising: means for partitioning each polynomial $p_i(x)$ into a bottom half $p_i^{bot}(x)$ consisting of bottom terms with lowest $s_i$ coefficients and a top half $p_i^{top}(x)$ consisting of top terms with remaining $t_i-s_i$ coefficients, where n and l are integers greater than zero, where for every i, $t_i$ and $s_i$ are integers greater than zero; means for recursively partitioning the bottom half $p_i^{bot}(x)$ and the top half $p_i^{top}(x)$ of each polynomial $p_i(x)$ to obtain further terms having a lower degree than previous terms, where the recursive partitioning is performed until at least one condition is met at which point the recursive partitioning yields a plurality of partitioned terms; means for evaluating the bottom half $p_i^{bot}(x)$ and the top half $p_i^{top}(x)$ at the point r for each polynomial $p_i(x)$ by evaluating the plurality of partitioned terms at the point r and iteratively combining the evaluated partitioned terms; and means for evaluating each polynomial $p_i(x)$ at the point r by setting $p_i(r)=r^{s_i}p_i^{top}(r)+p_i^{bot}(r)$.

An apparatus as above, further comprising means for storing the one or more polynomials $p_1(x), \ldots, p_l(x)$. An apparatus as in any above, where the means for storing comprises at least one storage medium, memory or memory medium. An apparatus as in any above, where the means for partitioning, means for recursively partitioning, means for evaluating the bottom half $p_i^{bot}(x)$ and the top half $p_i^{top}(x)$ and means for evaluating each polynomial $p_i(x)$ comprise at least one processor, at least one processing component, at least one circuit or at least one integrated circuit. An apparatus as in any above, further comprising one or more additional aspects of the exemplary embodiments of the invention as described herein.

(5) In a further exemplary embodiment of the invention, an apparatus for evaluating at a point r one or more polynomials $p_1(x), \ldots, p_l(x)$ of maximum degree up to n−1, where for every i the polynomial $p_i(x)$ has a degree of exactly $t_i−1$, the apparatus comprising: first circuitry (e.g., partitioning circuitry, first processing circuitry) configured to partition each polynomial $p_i(x)$ into a bottom half $p_i^{bot}(x)$ consisting of bottom terms with lowest $s_i$ coefficients and a top half $p_i^{top}(x)$ consisting of top terms with remaining $t_i−s_i$ coefficients, where n and l are integers greater than zero, where for every i, $t_i$ and $s_i$ are integers greater than zero; second circuitry (e.g., recursive partitioning circuitry, second processing circuitry) configured to recursively partition the bottom half $p_i^{bot}(x)$ and the top half $p_i^{top}(x)$ of each polynomial $p_i(x)$ to obtain further terms having a lower degree than previous terms, where the recursive partitioning is performed until at least one condition is met at which point the recursive partitioning yields a plurality of partitioned terms; third circuitry (e.g., first evaluation circuitry, third processing circuitry) configured to evaluate the bottom half $p_i^{bot}(x)$ and the top half $p_i^{top}(x)$ at the point r for each polynomial $p_i(x)$ by evaluating the plurality of partitioned terms at the point r and iteratively combining the evaluated partitioned terms; and fourth circuitry (e.g., second evaluation circuitry, fourth processing circuitry) configured to evaluate each polynomial $p_i(x)$ at the point r by setting $p_i(r)=r^{s_i}p_i^{top}(r)+p_i^{bot}(r)$.

An apparatus as in any above, further comprising one or more additional aspects of the exemplary embodiments of the invention as described herein.

Figure 3:
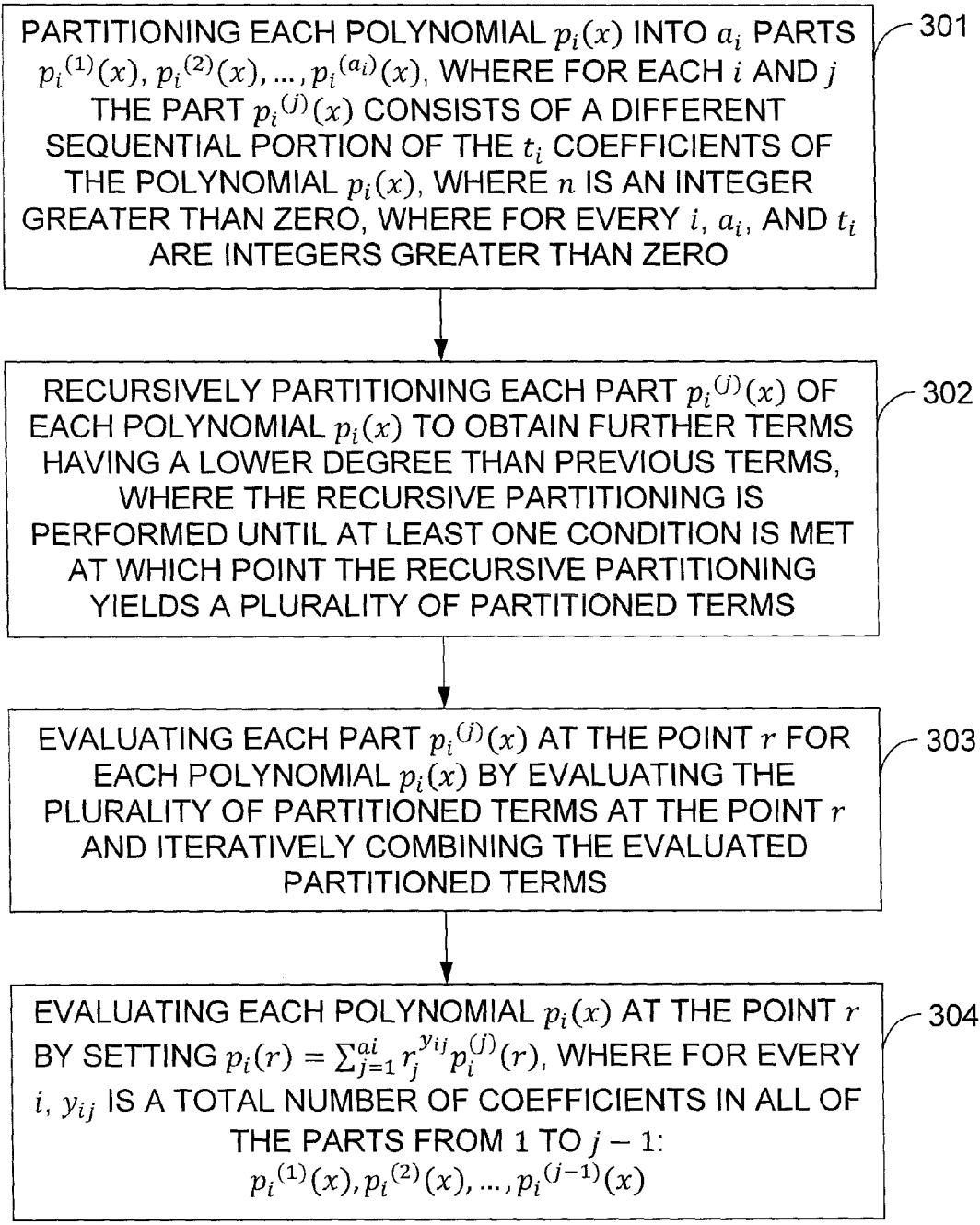
FIG. 3 depicts a logic flow diagram illustrative of the operation of an exemplary method, and the operation of an exemplary computer program, in accordance with the exemplary embodiments of this invention.

(6) In another exemplary embodiment of the invention, and as shown in FIG. 3, a method for evaluating at a point r one or more polynomials $p_1(x), \ldots, p_l(x)$ of maximum degree up to n−1, where for every i the polynomial $p_i(x)$ has a degree of exactly $t_i−1$, the method comprising: partitioning (e.g., by an apparatus, by at least one processor, by at least one processing component, by at least one integrated circuit, by hardware) each polynomial $p_i(x)$ into $a_i$ parts $p_i^{(1)}(x), p_i^{(2)}(x), \ldots, p_i^{(a_i)}(x)$, where for each i and j the part $p_i^{(j)}(x)$ consists of a different sequential portion of the $t_i$ coefficients of the polynomial $p_i(x)$, where n is an integer greater than zero, where for every i, $a_i$, and $t_i$ are integers greater than zero (301); recursively partitioning (e.g., by the apparatus) each part $p_i^{(j)}(x)$ of each polynomial $p_i(x)$ to obtain further terms having a lower degree than previous terms, where the recursive partitioning is performed until at least one condition is met at which point the recursive partitioning yields a plurality of partitioned terms (302); evaluating (e.g., by the apparatus) each part $p_i^{(j)}(x)$ at the point r for each polynomial $p_i(x)$ by evaluating the plurality of partitioned terms at the point r and iteratively combining the evaluated partitioned terms (303); and evaluating (e.g., by the apparatus) each polynomial $p_i(x)$ at the point r by setting $$p_i(r) = \sum_{j=1}^{a_i} r_j^{y_{ij}} p_i^{(j)}(r),$$

where for every i, $y_{ij}$ is a total number of coefficients in all of the parts from 1 to j−1: $p_i^{(1)}(x), p_i^{(2)}(x), \ldots, p_i^{(j−1)}(x)$ (304).

A method as in any above, where $a_i=2$ for all i. A method as in any above, where $a_i>2$ for some i. A method as in any above, where recursively partitioning each part $p_i^{(j)}(x)$ of each polynomial $p_i(x)$ comprises iteratively doubling a number of terms while reducing a degree of the terms by half. A method as in any above, where the at least one condition is with respect to a current number of polynomial terms k and a current maximal degree m of the polynomial terms, where powers of r are expressed as $r, r^2, r^3, \ldots, r^m$, where in response to the at least one condition being met all the powers of r up to the current maximal degree m of the polynomial terms are computed and all of the polynomial terms are evaluated by adding up all of the powers of r multiplied by their respective coefficients:

$$p_i(r) = \sum_{r=0}^{r=m} p_{ij} r^j,$$

where for every i and j, $p_{ij}$ is the coefficient of $r^j$ in the polynomial $p_i(x)$. A method as in any above, where the at least one condition is with respect to a current number of polynomial terms k and a current maximal degree m of the polynomial terms, where the at least one condition comprises the current number of polynomial terms k being larger than half of the current maximal degree m:

$$k > \frac{m}{2}.$$

A method as in any above, where iteratively combining the evaluated partitioned terms comprises iteratively combining lowest powers of the evaluated partitioned terms to obtain higher power terms. A method as in any above, where iteratively combining the evaluated partitioned terms is performed until evaluations of each part $p_i^{(j)}(x)$ at the point r are obtained. A method as in any above, further comprising: obtaining at least one ciphertext result by multiplying the evaluation of each polynomial $p_i(x)$ at the point r by two and for every i adding a bit $b_i$.

A computer program comprising machine readable instructions which when executed by an apparatus control it to perform the method as in any one of the preceding. A method as in any above, implemented as a computer program. A method as in any above, implemented as a program of instructions stored (e.g., tangibly embodied) on a program storage device (e.g., at least one memory, at least one computer-readable medium) and executable by a computer (e.g., at least one processor). A method as in any above, further comprising one or more aspects of the exemplary embodiments of the invention as described further herein.

(7) In a further exemplary embodiment of the invention, and as shown in FIG. 2, a computer readable storage medium (e.g., a memory, at least one memory, non-transitory) tangibly embodying a program of instructions executable by a machine (e.g., a processor, at least one processor, a computer) for performing operations for evaluating at a point r one or more polynomials $p_1(x), \ldots, p_l(x)$ of maximum degree up to n−1, where for every i the polynomial $p_i(x)$ has a degree of exactly $t_i−1$, the operations comprising: partitioning each polynomial $p_i(x)$ into $a_i$ parts $p_i^{(1)}(x), p_i^{(2)}(x), \ldots, p_i^{(a_i)}(x)$, where for each i and j the part $p_i^{(j)}(x)$ consists of a different sequential portion of the $t_i$ coefficients of the polynomial $p_i(x)$, where n is an integer greater than zero, where for every i, $a_i$, and $t_i$ are integers greater than zero (301); recursively partitioning each part $p_i^{(j)}(x)$ of each polynomial $p_i(x)$ to obtain further terms having a lower degree than previous terms, where the recursive partitioning is performed until at least one condition is met at which point the recursive partitioning yields a plurality of partitioned terms (302); evaluating each part $p_i^{(j)}(x)$ at the point r for each polynomial $p_i(x)$ by evaluating the plurality of partitioned terms at the point r and iteratively combining the evaluated partitioned terms (303); and evaluating each polynomial $p_i(x)$ at the point r by setting $$p_i(r) = \sum_{j=1}^{ai} r_j^{y_{ij}} p_i^{(j)}(r),$$

where for every i, $y_{ij}$ is a total number of coefficients in all of the parts from 1 to j−1: $p_i^{(1)}(x), p_i^{(2)}(x), \ldots, p_i^{(j-1)}(x)$ (304).

A computer readable storage medium as in any above, further comprising one or more additional aspects of the exemplary embodiments of the invention as described herein.

(8) In another exemplary embodiment of the invention, an apparatus for evaluating at a point r one or more polynomials $p_1(x), \ldots, p_I(x)$ of maximum degree up to n−1, the apparatus comprising: at least one memory configured to store the one or more polynomials $p_1(x), \ldots, p_I(x)$, where for every i the polynomial $p_i(x)$ has a degree of exactly $t_i$−1; and at least one processor configured to partition each polynomial $p_i(x)$ into $a_i$ parts $p_i^{(1)}(x), p_i^{(2)}(x), \ldots, p_i^{(a_i)}(x)$, where for each i and j the part $p_i^{(j)}(x)$ consists of a different sequential portion of the $t_i$ coefficients of the polynomial $p_i(x)$, where n is an integer greater than zero, where for every i, $a_i$, and $t_i$ are integers greater than zero; recursively partition each part $p_i^{(j)}(x)$ of each polynomial $p_i(x)$ to obtain further terms having a lower degree than previous terms, where the recursive partitioning is performed until at least one condition is met at which point the recursive partitioning yields a plurality of partitioned terms; evaluate each part $p_i^{(j)}(x)$ at the point r for each polynomial $p_i(x)$ by evaluating the plurality of partitioned terms at the point r and iteratively combining the evaluated partitioned terms; and evaluate each polynomial $p_i(x)$ at the point r by setting $$p_i(r) = \sum_{j=1}^{ai} r_j^{y_{ij}} p_i^{(j)}(r),$$

where for every i, $y_{ij}$ is a total number of coefficients in all of the parts from 1 to j−1: $p_i^{(1)}(x), p_i^{(2)}(x), \ldots, p_i^{(j-1)}(x)$.

An apparatus as in any above, further comprising one or more additional aspects of the exemplary embodiments of the invention as described herein.

(9) In a further exemplary embodiment of the invention, an apparatus for evaluating at a point r one or more polynomials $p_1(x), \ldots, p_I(x)$ of maximum degree up to n−1, where for every i the polynomial $p_i(x)$ has a degree of exactly $t_i$−1, the apparatus comprising: means for partitioning each polynomial $p_i(x)$ into $a_i$ parts $p_i^{(1)}(x), p_i^{(2)}(x), \ldots, p_i^{(a_i)}(x)$, where for each i and j the part $p_i^{(j)}(x)$ consists of a different sequential portion of the $t_i$ coefficients of the polynomial $p_i(x)$, where n is an integer greater than zero, where for every i, $a_i$, and $t_i$ are integers greater than zero; means for recursively partitioning each part $p_i^{(j)}(x)$ of each polynomial $p_i(x)$ to obtain further terms having a lower degree than previous terms, where the recursive partitioning is performed until at least one condition is met at which point the recursive partitioning yields a plurality of partitioned terms; means for evaluating each part $p_i^{(j)}(x)$ at the point r for each polynomial $p_i(x)$ by evaluating the plurality of partitioned terms at the point r and iteratively combining the evaluated partitioned terms; and means for evaluating each polynomial $p_i(x)$ at the point r by setting $$p_i(r) = \sum_{j=1}^{ai} r_j^{y_{ij}} p_i^{(j)}(r),$$

where for every i, $y_{ij}$ is a total number of coefficients in all of the parts from 1 to j−1: $p_i^{(1)}(x), p_i^{(2)}(x), \ldots, p_i^{(j-1)}(x)$.

An apparatus as above, further comprising means for storing the one or more polynomials $p_1(x), \ldots, p_I(x)$. An apparatus as in any above, where the means for storing comprises at least one storage medium, memory or memory medium. An apparatus as in any above, where the means for partitioning, means for recursively partitioning, means for evaluating each part $p_i^{(j)}(x)$ and means for evaluating each polynomial $p_i(x)$ comprise at least one processor, at least one processing component, at least one circuit or at least one integrated circuit. An apparatus as in any above, further comprising one or more additional aspects of the exemplary embodiments of the invention as described herein.

(10) In another exemplary embodiment of the invention, an apparatus for evaluating at a point r one or more polynomials $p_1(x), \ldots, p_I(x)$ of maximum degree up to n−1, where for every i the polynomial $p_i(x)$ has a degree of exactly $t_i$−1, the apparatus comprising: first circuitry (e.g., partitioning circuitry, first processing circuitry) configured to partition each polynomial $p_i(x)$ into $a_i$ parts $p_i^{(1)}(x), p_i^{(2)}(x), \ldots, p_i^{(a_i)}(x)$, where for each i and j the part $p_i^{(j)}(x)$ consists of a different sequential portion of the $t_i$ coefficients of the polynomial $p_i(x)$, where n is an integer greater than zero, where for every i, $a_i$, and $t_i$ are integers greater than zero; second circuitry (e.g., recursive partitioning circuitry, second processing circuitry) configured to recursively partition each part $p_i^{(j)}(x)$ of each polynomial $p_i(x)$ to obtain further terms having a lower degree than previous terms, where the recursive partitioning is performed until at least one condition is met at which point the recursive partitioning yields a plurality of partitioned terms; third circuitry (e.g., first evaluation circuitry, third processing circuitry) configured to evaluate each part $p_i^{(j)}(x)$ at the point r for each polynomial $p_i(x)$ by evaluating the plurality of partitioned terms at the point r and iteratively combining the evaluated partitioned terms; and fourth circuitry (e.g., second evaluation circuitry, fourth processing circuitry) configured to evaluate each polynomial $p_i(x)$ at the point r by setting $$p_i(r) = \sum_{j=1}^{ai} r_j^{y_{ij}} p_i^{(j)}(r),$$

where for every i, $y_{ij}$ is a total number of coefficients in all of the parts from 1 to j−1: $p_i^{(1)}(x), p_i^{(2)}(x), \ldots, p_i^{(j-1)}(x)$.

An apparatus as in any above, further comprising one or more additional aspects of the exemplary embodiments of the invention as described herein.

Figure 4:
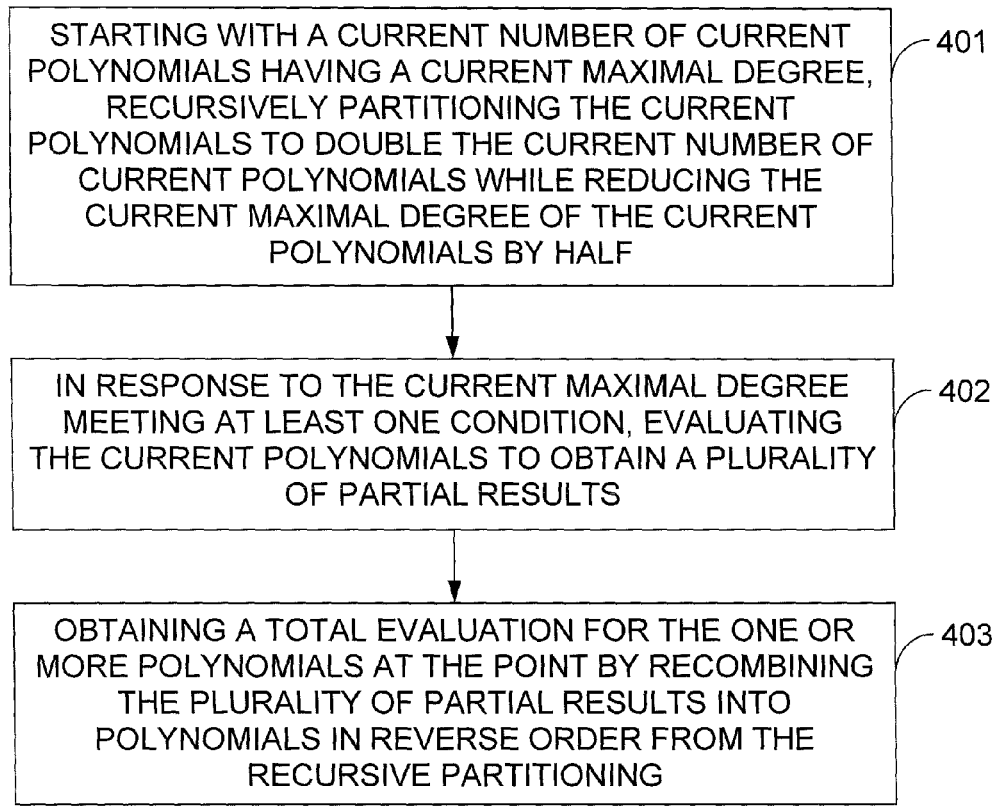
FIG. 4 depicts a logic flow diagram illustrative of the operation of another exemplary method, and the operation of an exemplary computer program, in accordance with the exemplary embodiments of this invention.

(11) In a further exemplary embodiment of the invention, and as shown in FIG. 4, a method for evaluating at a point one or more polynomials, comprising: starting with a current number of current polynomials having a current maximal degree, recursively partitioning (e.g., by an apparatus, by at least one processor, by at least one processing component, by at least one integrated circuit, by hardware) the current polynomials to double the current number of current polynomials while reducing the current maximal degree of the current polynomials by half (401); in response to the current maximal degree meeting at least one condition, evaluating (e.g., by the apparatus) the current polynomials to obtain a plurality of partial results (402); and obtaining (e.g., by the apparatus) a total evaluation for the one or more polynomials at the point by recombining the plurality of partial results into polynomials in reverse order from the recursive partitioning (403).

A method as in any above, where recursively partitioning the current polynomials comprises iteratively doubling a number of polynomials while reducing a maximum degree of the polynomials by half. A method as in any above, where the at least one condition is with respect to the current number of current polynomials and the current maximal degree. A method as in any above, where the at least one condition is with respect to the current number of current polynomials and the current maximal degree, where the at least one condition comprises the current number of current polynomials being larger than half of the current maximal degree.

A computer program comprising machine readable instructions which when executed by an apparatus control it to perform the method as in any one of the preceding. A method as in any above, implemented as a computer program. A method as in any above, implemented as a program of instructions stored (e.g., tangibly embodied) on a program storage device (e.g., at least one memory, at least one computer-readable medium) and executable by a computer (e.g., at least one processor). A method as in any above, further comprising one or more aspects of the exemplary embodiments of the invention as described further herein.

(12) In another exemplary embodiment of the invention, and as shown in FIG. 4, a computer readable storage medium (e.g., a memory, at least one memory, non-transitory) tangibly embodying a program of instructions executable by a machine (e.g., a processor, at least one processor, a computer) for performing operations for evaluating at a point one or more polynomials, the operations comprising: starting with a current number of current polynomials having a current maximal degree, recursively partitioning the current polynomials to double the current number of current polynomials while reducing the current maximal degree of the current polynomials by half (401); in response to the current maximal degree meeting at least one condition, evaluating the current polynomials to obtain a plurality of partial results (402); and obtaining a total evaluation for the one or more polynomials at the point by recombining the plurality of partial results into polynomials in reverse order from the recursive partitioning (403).

A computer readable storage medium as in any above, further comprising one or more additional aspects of the exemplary embodiments of the invention as described herein.

(13) In a further exemplary embodiment of the invention, an apparatus for evaluating at a point one or more polynomials, comprising: at least one memory configured to store the one or more polynomials; and at least one processor configured, starting with a current number of current polynomials having a current maximal degree (e.g., the one or more polynomials), to recursively partition the current polynomials to double the current number of current polynomials while reducing the current maximal degree of the current polynomials by half; in response to the current maximal degree meeting at least one condition, to evaluate the current polynomials to obtain a plurality of partial results; and to obtain a total evaluation for the one or more polynomials at the point by recombining the plurality of partial results into polynomials in reverse order from the recursive partitioning.

An apparatus as in any above, further comprising one or more additional aspects of the exemplary embodiments of the invention as described herein.

(14) In another exemplary embodiment of the invention, an apparatus for evaluating at a point one or more polynomials, comprising: means, starting with a current number of current polynomials having a current maximal degree, for recursively partitioning the current polynomials to double the current number of current polynomials while reducing the current maximal degree of the current polynomials by half; means, in response to the current maximal degree meeting at least one condition, for evaluating the current polynomials to obtain a plurality of partial results; and means for obtaining a total evaluation for the one or more polynomials at the point by recombining the plurality of partial results into polynomials in reverse order from the recursive partitioning.

An apparatus as above, further comprising means for storing the one or more polynomials. An apparatus as in any above, where the means for storing comprises at least one storage medium, memory or memory medium. An apparatus as in any above, where the means for recursively partitioning, means for evaluating and means for obtaining comprise at least one processor, at least one processing component, at least one circuit or at least one integrated circuit. An apparatus as in any above, further comprising one or more additional aspects of the exemplary embodiments of the invention as described herein.

(15) In a further exemplary embodiment of the invention, an apparatus for evaluating at a point one or more polynomials, comprising: first circuitry (e.g., partitioning circuitry, first processing circuitry) configured, starting with a current number of current polynomials having a current maximal degree, to recursively partition the current polynomials to double the current number of current polynomials while reducing the current maximal degree of the current polynomials by half; second circuitry (e.g., evaluation circuitry, second processing circuitry) configured, in response to the current maximal degree meeting at least one condition, to evaluate the current polynomials to obtain a plurality of partial results; and third circuitry (e.g., obtaining circuitry, third processing circuitry) configured to obtaining a total evaluation for the one or more polynomials at the point by recombining the plurality of partial results into polynomials in reverse order from the recursive partitioning.

An apparatus as in any above, further comprising one or more additional aspects of the exemplary embodiments of the invention as described herein.

Building on section 4, consider an integer polynomial v(x) modulo a polynomial $f_n(x)$ of the form $f_n(x)=x^n \pm 1$, where n is a power of 2. Arithmetic modulo polynomials of this form are often a convenient way to realize mathematical structures. As a non-limiting example, they provide an efficient technique for implementing Gentry's fully-homomorphic encryption scheme. Previous solutions computed the entire inverse polynomial, there was no provision for computing only a single coefficient, for example. Exemplary embodiments of this invention enable computation of only the desired coefficient(s) (e.g., less than the entire inverse), and, thus, provide savings in solution time, complexity and processing.

Another exemplary embodiment of the invention provides an algorithm for computing (at least) one coefficient of the inverse polynomial w*(x) modulo $f_n(x)$ in time (n·polylog n), where $$w^*(x) = \frac{1}{v(x)} = v^{-1}(x).$$

The algorithm also may compute the resultant of the input polynomials v(x) and $f_n(x)$.

Figure 5:
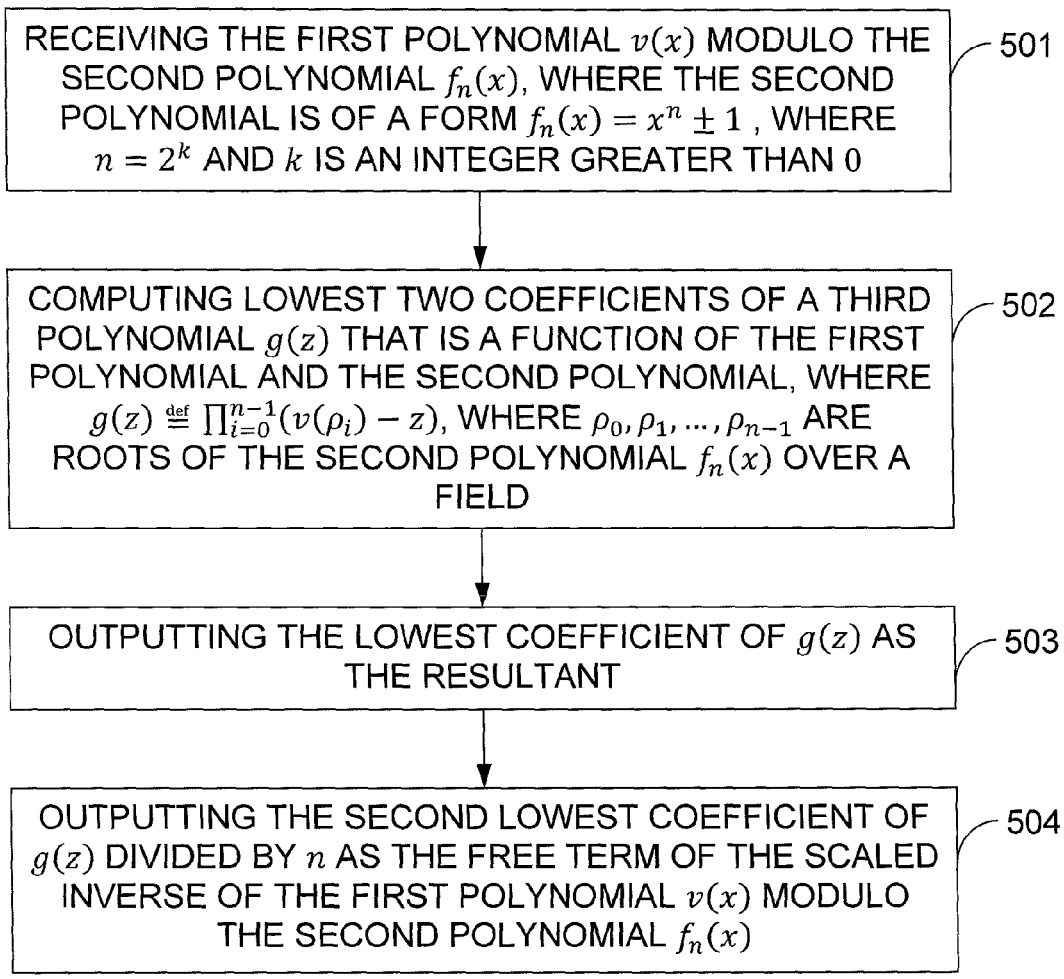
FIG. 5 depicts a logic flow diagram illustrative of the operation of a further exemplary method, and the operation of an exemplary computer program, in accordance with the exemplary embodiments of this invention.

(16) In another exemplary embodiment of the invention, and as shown in FIG. 5, a method for computing a resultant and a free term of a scaled inverse of a first polynomial v(x) modulo a second polynomial $f_n(x)$, comprising: receiving (e.g., by an apparatus, by at least one processor, by at least one processing component, by at least one integrated circuit, by hardware) the first polynomial v(x) modulo the second polynomial $f_n(x)$, where the second polynomial is of a form $f_n(x)=x^n \pm 1$, where $n=2^k$ and k is an integer greater than 0 (501); computing (e.g., by the apparatus) lowest two coefficients of a third polynomial g(z) that is a function of the first polynomial and the second polynomial, where $$g(z) \overset{def}{=} \prod_{i=0}^{n-1} (v(\rho_i) - z),$$

where $\rho_0, \rho_1, \ldots, \rho_{n-1}$ are roots of the second polynomial $f_n(x)$ over a field (502); outputting (e.g., by the apparatus) the lowest coefficient of g(z) as the resultant (503); and outputting (e.g., by the apparatus) the second lowest coefficient of g(z) divided by n as the free term of the scaled inverse of the first polynomial v(x) modulo the second polynomial $f_n(x)$.

A method as in any above, where computing the lowest two coefficients of the third polynomial g(z) comprises computing a fourth polynomial h(z), where $h(z)=g(z) \bmod z^2$. A method as in any above, where computing the fourth polynomial $h(z)=g(z) \bmod z^2$ comprises computing pairs of polynomials $U_j(x)$ and $V_j(x)$ for $j=0, 1, \ldots, \log n$, such that for all j it holds that g(z) is congruent modulo $z^2$ to a fifth polynomial $G_j(z)$, where $$G_j(z) \overset{def}{=} \prod_{i=0}^{\frac{n}{2^j}} (V_j(\rho_i^{2^j}) - zU_j(\rho_i^{2^j})).$$

A method as in any above, where for every j the polynomials $U_{j+1}(x^2)$ and $V_{j+1}(x^2)$ are defined as:

$$U_{j+1}(x^2) \overset{def}{=} U_j(x)V_j(-x) + U_j(-x)V_j(x) \bmod (x^{\frac{n}{2^j}} \pm 1) \text{ and}$$

$$V_{j+1}(x^2) \overset{def}{=} V_j(x)V_j(-x) \bmod (x^{\frac{n}{2^j}} \pm 1).$$

A method as in any above, where the first polynomial v(x) modulo the second polynomial $f_n(x)$ is derived from a sixth polynomial u(x) such that $v(x)=x^i \cdot u(x) \bmod f_n(x)$, where i is an integer less than n: i<n. A method as in any above, where the free term of the scaled inverse of the first polynomial v(x) modulo the second polynomial $f_n(x)$ comprises the i-th coefficient of the scaled inverse of u(x). A method as in any above, where the free term of the scaled inverse of the first polynomial v(x) modulo the second polynomial $f_n(x)$ is used as a private key for decryption of a ciphertext. A method as in any above, where the field is (comprises) a complex field. A method as in any above, where the field is (comprises) a finite field. A method as in any above, where the field is (comprises) a complex field or a finite field.

A computer program comprising machine readable instructions which when executed by an apparatus control it to perform the method as in any one of the preceding. A method as in any above, implemented as a computer program. A method as in any above, implemented as a program of instructions stored (e.g., tangibly embodied) on a program storage device (e.g., at least one memory, at least one computer-readable medium) and executable by a computer (e.g., at least one processor). A method as in any above, further comprising one or more aspects of the exemplary embodiments of the invention as described further herein.

(17) In a further exemplary embodiment of the invention, and as shown in FIG. 5, a computer readable storage medium (e.g., a memory, at least one memory, non-transitory) tangibly embodying a program of instructions executable by a machine (e.g., a processor, at least one processor, a computer) for performing operations for computing a resultant and a free term of a scaled inverse of a first polynomial v(x) modulo a second polynomial $f_n(x)$, the operations comprising: receiving the first polynomial v(x) modulo the second polynomial $f_n(x)$, where the second polynomial is of a form $f_n(x)=x^n \pm 1$, where $n=2^k$ and k is an integer greater than 0 (501); computing lowest two coefficients of a third polynomial g(z) that is a function of the first polynomial and the second polynomial, where $$g(z) \overset{def}{=} \prod_{i=0}^{n-1} (v(\rho_i) - z),$$

where $\rho_0, \rho_1, \ldots, \rho_{n-1}$ are roots of the second polynomial $f_n(x)$ over a field (502); outputting the lowest coefficient of g(z) as the resultant (503); and outputting the second lowest coefficient of g(z) divided by n as the free term of the scaled inverse of the first polynomial v(x) modulo the second polynomial $f_n(x)$.

A computer readable storage medium as in any above, further comprising one or more additional aspects of the exemplary embodiments of the invention as described herein.

(18) In another exemplary embodiment of the invention, an apparatus comprising: at least one storage medium configured to store a first polynomial v(x) modulo a second polynomial $f_n(x)$, where the second polynomial is of a form $f_n(x)=x^n \pm 1$, where $n=2^k$ and k is an integer greater than 0; and at least one processor configured to compute a resultant and a free term of a scaled inverse of the first polynomial v(x) modulo the second polynomial $f_n(x)$ by computing lowest two coefficients of a third polynomial g(z) that is a function of the first polynomial and the second polynomial, where $$g(z) \overset{def}{=} \prod_{i=0}^{n-1} (v(\rho_i) - z),$$

where $\rho_0, \rho_1, \ldots, \rho_{n-1}$ are roots of the second polynomial $f_n(x)$ over a field; outputting the lowest coefficient of g(z) as the resultant; and outputting the second lowest coefficient of g(z) divided by n as the free term of the scaled inverse of the first polynomial v(x) modulo the second polynomial $f_n(x)$.

An apparatus as in any above, further comprising one or more additional aspects of the exemplary embodiments of the invention as described herein.

(19) In a further exemplary embodiment of the invention, an apparatus for computing a resultant and a free term of a scaled inverse of a first polynomial v(x) modulo a second polynomial $f_n(x)$, the apparatus comprising: means for receiving the first polynomial v(x) modulo the second polynomial $f_n(x)$, where the second polynomial is of a form $f_n(x)=x^n \pm 1$, where $n=2^k$ and k is an integer greater than 0; means for computing lowest two coefficients of a third polynomial g(z) that is a function of the first polynomial and the second polynomial, where $$g(z) \stackrel{def}{=} \prod_{i=0}^{n-1}(v(\rho_i)-z),$$

where $\rho_0, \rho_1, \ldots, \rho_{n-1}$ are roots of the second polynomial $f_n(x)$ over a field; means for outputting the lowest coefficient of g(z) as the resultant; and means for outputting the second lowest coefficient of g(z) divided by n as the free term of the scaled inverse of the first polynomial v(x) modulo the second polynomial $f_n(x)$.

An apparatus as in any above, further comprising means for storing the first polynomial v(x) modulo the second polynomial $f_n(x)$. An apparatus as in any above, where the means for storing comprises at least one storage medium, memory or memory medium. An apparatus as in any above, where the means for receiving, the means for computing, the means for outputting the lowest coefficient of g(z) and the means for outputting the second lowest coefficient of g(z) comprise at least one processor, at least one processing component, at least one circuit or at least one integrated circuit. An apparatus as in any above, further comprising one or more additional aspects of the exemplary embodiments of the invention as described herein.

(20) In another exemplary embodiment of the invention, an apparatus for computing a resultant and a free term of a scaled inverse of a first polynomial v(x) modulo a second polynomial $f_n(x)$, the apparatus comprising: first circuitry (e.g., receiving circuitry, first processing circuitry) configured to receive the first polynomial v(x) modulo the second polynomial $f_n(x)$, where the second polynomial is of a form $f_n(x)=x^n \pm 1$, where $n=2^k$ and k is an integer greater than 0; second circuitry (e.g., computation circuitry, second processing circuitry) configured to compute lowest two coefficients of a third polynomial g(z) that is a function of the first polynomial and the second polynomial, where $$g(z) \stackrel{def}{=} \prod_{i=0}^{n-1}(v(\rho_i)-z),$$

where $\rho_0, \rho_1, \ldots, \rho_{n-1}$ are roots of the second polynomial $f_n(x)$ over a field; third circuitry (e.g., first output circuitry, third processing circuitry) configured to output the lowest coefficient of g(z) as the resultant; and fourth circuitry (e.g., second output circuitry, fourth processing circuitry) configured to output the second lowest coefficient of g(z) divided by n as the free term of the scaled inverse of the first polynomial v(x) modulo the second polynomial $f_n(x)$.

An apparatus as in any above, further comprising one or more additional aspects of the exemplary embodiments of the invention as described herein.

Building on sections 8 and 9, FIG. 6 shows a table with an example for implementing various exemplary embodiments of the invention. In FIG. 6, the leftmost column shows the type of data portrayed in that particular row. The rightmost column shows the maximum index (maximum value of i) for that row's data. The intermediate columns (between the leftmost and rightmost columns) show the data points corresponding to that value of i (see the top row). The rows are roughly arranged in sequential order for performing an exemplary method, computer program and system as described herein.

In the example shown in FIG. 6, there is a big set B that has 9 elements $z_i$ (N=9). There is a small set S that has 3 elements $s_j$ (n=3) and is a subset of the big set B. There is a bit vector $\vec{\sigma}$ that has 9 bits $\sigma_i$ such that $\sigma_i=1$ if $z_i \in S$ else $\sigma_i=0$. There is an encrypted vector $\vec{d}$ that has 9 ciphertexts $d_i$ that are each an encryption of the corresponding bit $\sigma_i$. The big set B is partitioned into 3 parts $p_j$ with each of the 3 parts $p_j$ having a plurality of different elements from the big set B. The elements $s_j$ of the small set S consist of one element from each of the 3 parts $p_j$. As shown in FIG. 6, the row for "Part ($p_j$)" indicates of which part $p_j$ each i-index item is a member.

The provided ciphertext element c is post-processed by multiplying the ciphertext element c by all elements of the big set B to obtain an intermediate vector $\vec{y}=\langle y_1, y_2, \ldots, y_N\rangle$ such that the element $y_i$ of the intermediate vector $\vec{y}$ is computed as $y_i=c \times z_i$. The individual elements $y_i$ of the intermediate vector $\vec{y}$ are represented in binary (as a sequence of bits).

The elements of the intermediate vector $\vec{y}$ are homomorphically multiplied by the ciphertexts $d_i$ in the encrypted vector $\vec{d}$ to obtain a ciphertext vector $\vec{x}$ that has 9 ciphertext elements $x_i$ such that $\vec{x}=\langle x_1, x_2, \ldots, x_N\rangle$. Each ciphertext element $x_i$ in the ciphertext vector $\vec{x}$ is an encryption of the product $y_i \cdot \sigma_i$. Since each $y_i$ is represented in binary, each $x_i$ may comprise one or more ciphertexts, for example, with each ciphertext being an encryption of a bit from $y_i$ as multiplied by $\sigma_i$. All of the ciphertext elements $x_i$ of the ciphertext vector $\vec{x}$ are homomorphically summed to obtain a resulting ciphertext that comprises an encryption of the at least one bit b. This homomorphic summation is not a direct addition of ciphertexts.

(21) In a further exemplary embodiment of the invention, and as shown in FIG. 7, a method for homomorphic decryption, comprising: providing (e.g., by an apparatus, by at least one processor, by at least one processing component, by at least one integrated circuit, by hardware) a ciphertext comprising a ciphertext element c that is obtained by encrypting at least one bit b using a public key h, where the public key h and a private key w collectively comprise an encryption key pair such that the private key w enables decryption of data that has been encrypted using the public key h to form a ciphertext, where there exists a big set B that includes N elements $z_i$ such that B={$z_1, z_2, \ldots, z_N$}, where there exists a small set S that includes n elements $s_j$ such that S={$s_1, s_2, \ldots, s_n$}, where the small set S is a subset of the big set B, where n<N, where n is an integer greater than one, where summing up the elements $s_j$ of the small set S yields the private key w, where there exists a bit vector $\vec{\sigma}$ that includes N bits $\sigma_i$ such that $\vec{\sigma}=\langle \sigma_1, \sigma_2, \ldots, \sigma_N \rangle$, where for all i the bit $\sigma_i=1$ if $z_i \in S$ else the bit $\sigma_i=0$, where there exists an encrypted vector $\vec{d}$ that includes N ciphertexts $d_i$ such that $\vec{d}=\langle d_1, d_2, \ldots, d_N \rangle$, where for all i the ciphertext $d_i$ of the encrypted vector $\vec{d}$ is an encryption of the bit $\sigma_i$ (701); post-processing (e.g., by the apparatus) the provided ciphertext element c by multiplying the provided ciphertext element c by all elements of the big set B to obtain an intermediate vector $\vec{y}=\langle y_1, y_2, \ldots, y_N \rangle$, where for all i the element $y_i$ of the intermediate vector $\vec{y}$ is computed as $y_i=c \times z_i$ (702); homomorphically multiplying (e.g., by the apparatus) the elements $y_i$ of the intermediate vector $\vec{y}$ by the ciphertexts $d_i$ in the encrypted vector $\vec{d}$ to obtain a ciphertext vector $\vec{x}$ comprised of ciphertexts, where the ciphertext vector $\vec{x}$ includes N ciphertext elements $x_i$ such that $\vec{x}=\langle x_1, x_2, \ldots, x_N \rangle$, where for all i the ciphertext element $x_i$ in the ciphertext vector $\vec{x}$ is an encryption of the product $y_i \cdot \sigma_i$ (703); and homomorphically summing (e.g., by the apparatus) all of the ciphertext elements $x_i$ of the ciphertext vector $\vec{x}$ to obtain a resulting ciphertext that comprises an encryption of the at least one bit b, where the big set B is partitioned into n parts $p_j$ with each of the n parts $p_j$ having a plurality of different elements from the big set B, where the elements $s_j$ of the small set S consist of one element from each of the n parts $p_j$ (704).

A method as in any above, where the private key w comprises at least one of: an integer, a vector, a matrix and an element in an algebraic ring. A method as in any above, where each of the n parts has N/n different elements from the big set B. A method as in any above, where the encrypted vector $\vec{d}$ is represented by n partial encrypted vectors $\vec{e_j}$, one for each part $p_j$ of the big set B, where for all j the partial encrypted vector $\vec{e_j}$ comprises $t_j$ ciphertexts, two of which are encryptions of 1 and the rest being encryptions of 0. A method as in any above, where for all j the j'th part of the big set B has a size $a_j$, where the number of ciphertexts $t_j$ in the partial encrypted vector $\vec{e_j}$ satisfies the relation: $t_j \geq \lceil \sqrt{2a_j} \rceil$. A method as in any above, where each ciphertext $d_i$ in the encrypted vector $\vec{d}$ is computed as a function of two ciphertexts from one of the partial encrypted vectors $\vec{e_j}$. A method as in any above, where each ciphertext $d_i$ in the encrypted vector $\vec{d}$ is computed as a product of two ciphertexts from one of the partial encrypted vectors $\vec{e_j}$. A method as in any above, where each of the n parts $p_j$ comprises a geometric progression of elements $z_i$ from the big set B. A method as in any above, where each of the n parts $p_j$ comprises a geometric progression of elements $z_i$ from the big set B.

A computer program comprising machine readable instructions which when executed by an apparatus control it to perform the method as in any one of the preceding. A method as in any above, implemented as a computer program. A method as in any above, implemented as a program of instructions stored (e.g., tangibly embodied) on a program storage device (e.g., at least one memory, at least one computer-readable medium) and executable by a computer (e.g., at least one processor). A method as in any above, further comprising one or more aspects of the exemplary embodiments of the invention as described further herein.

(22) In another exemplary embodiment of the invention, and as shown in FIG. 7, a computer readable storage medium (e.g., a memory, at least one memory, non-transitory) tangibly embodying a program of instructions executable by a machine (e.g., a processor, at least one processor, a computer) for performing operations for homomorphic decryption, the operations comprising: providing a ciphertext comprising a ciphertext element c that is obtained by encrypting at least one bit b using a public key h, where the public key h and a private key w collectively comprise an encryption key pair such that the private key w enables decryption of data that has been encrypted using the public key h to form a ciphertext, where there exists a big set B that includes N elements $z_i$ such that $B=\{z_1, z_2, \ldots, z_N\}$, where there exists a small set S that includes n elements $s_j$ such that $S=\{s_1, s_2, \ldots, s_n\}$, where the small set S is a subset of the big set B, where n<N, where n is an integer greater than one, where summing up the elements $s_j$ of the small set S yields the private key w, where there exists a bit vector $\vec{\sigma}$ that includes N bits $\sigma_i$ such that $\vec{\sigma}=\langle \sigma_1, \sigma_2, \ldots, \sigma_N \rangle$, where for all i the bit $\sigma_i=1$ if $z_i \in S$ else the bit $\sigma_i=0$, where there exists an encrypted vector $\vec{d}$ that includes N ciphertexts $d_i$ such that $\vec{d}=\langle d_1, d_2, \ldots, d_N \rangle$, where for all i the ciphertext $d_i$ of the encrypted vector $\vec{d}$ is an encryption of the bit $\sigma_i$ (701); post-processing the provided ciphertext element c by multiplying the provided ciphertext element c by all elements of the big set B to obtain an intermediate vector $\vec{y}=\langle y_1, y_2, \ldots, y_N \rangle$, where for all i the element $y_i$ of the intermediate vector $\vec{y}$ is computed as $y_i=c \times z_i$ (702); homomorphically multiplying the elements $y_i$ of the intermediate vector $\vec{y}$ by the ciphertexts $d_i$ in the encrypted vector $\vec{d}$ to obtain a ciphertext vector $\vec{x}$ comprised of ciphertexts, where the ciphertext vector $\vec{x}$ includes N ciphertext elements $x_i$ such that $\vec{x}=\langle x_1, x_2, \ldots, x_N \rangle$, where for all i the ciphertext element $x_i$ in the ciphertext vector $\vec{x}$ is an encryption of the product $y_i \cdot \sigma_i$ (703); and homomorphically summing all of the ciphertext elements $x_i$ of the ciphertext vector $\vec{x}$ to obtain a resulting ciphertext that comprises an encryption of the at least one bit b, where the big set B is partitioned into n parts $p_j$ with each of the n parts $p_j$ having a plurality of different elements from the big set B, where the elements $s_j$ of the small set S consist of one element from each of the n parts $p_j$ (704).

A computer readable storage medium as in any above, further comprising one or more additional aspects of the exemplary embodiments of the invention as described herein.

(23) In a further exemplary embodiment of the invention, an apparatus (e.g., for homomorphic decryption) comprising: at least one storage medium configured to store a ciphertext comprising a ciphertext element c that is obtained by encrypting at least one bit b using a public key h, where the public key h and a private key w collectively comprise an encryption key pair such that the private key w enables decryption of data that has been encrypted using the public key h to form a ciphertext, where there exists a big set B that includes N elements $z_i$ such that $B=\{z_1, z_2, \ldots, z_N\}$, where there exists a small set S that includes n elements $s_j$ such that $S=\{s_1, s_2, \ldots, s_n\}$, where the small set S is a subset of the big set B, where n<N, where n is an integer greater than one, where summing up the elements $s_j$ of the small set S yields the private key w, where there exists a bit vector $\vec{\sigma}$ that includes N bits $\sigma_i$ such that $\vec{\sigma} = \langle \sigma_1, \sigma_2, \ldots, \sigma_N \rangle$, where for all i the bit $\sigma_i=1$ if $z_i \in S$ else the bit $\sigma_i=0$, where there exists an encrypted vector $\vec{d}$ that includes N ciphertexts $d_i$ such that $\vec{d} = \langle d_1, d_2, \ldots, d_N \rangle$, where for all i the ciphertext $d_i$ of the encrypted vector $\vec{d}$ is an encryption of the bit $\sigma_i$; and at least one processor configured to post-process the provided ciphertext element c by multiplying the provided ciphertext element c by all elements of the big set B to obtain an intermediate vector $\vec{y} = \langle y_1, y_2, \ldots, y_N \rangle$, where for all i the element $y_i$ of the intermediate vector $\vec{y}$ is computed as $y_i = c \times z_i$, where the at least one processor is further configured to homomorphically multiply the elements $y_i$ of the intermediate vector $\vec{y}$ by the ciphertexts $d_i$ in the encrypted vector $\vec{d}$ to obtain a ciphertext vector $\vec{x}$ comprised of ciphertexts, where the ciphertext vector $\vec{x}$ includes N ciphertext elements $x_i$ such that $\vec{x} = \langle x_1, x_2, \ldots, x_N \rangle$, where for all i the ciphertext element $x_i$ in the ciphertext vector $\vec{x}$ is an encryption of the product $y_i \cdot \sigma_i$, where the at least one processor is further configured to homomorphically sum all of the ciphertext elements $x_i$ of the ciphertext vector $\vec{x}$ to obtain a resulting ciphertext that comprises an encryption of the at least one bit b, where the big set B is partitioned into n parts $p_j$ with each of the n parts $p_j$ having a plurality of different elements from the big set B, where the elements $s_j$ of the small set S consist of one element from each of the n parts $p_j$.

An apparatus as in any above, further comprising one or more additional aspects of the exemplary embodiments of the invention as described herein.

(24) In another exemplary embodiment of the invention, an apparatus (e.g., for homomorphic decryption) comprising: means for providing a ciphertext comprising a ciphertext element c that is obtained by encrypting at least one bit b using a public key h, where the public key h and a private key w collectively comprise an encryption key pair such that the private key w enables decryption of data that has been encrypted using the public key h to form a ciphertext, where there exists a big set B that includes N elements $z_i$ such that $B = \{z_1, z_2, \ldots, z_N\}$, where there exists a small set S that includes n elements $s_j$ such that $S = \{s_1, s_2, \ldots, s_n\}$, where the small set S is a subset of the big set B, where n<N, where n is an integer greater than one, where summing up the elements $s_j$ of the small set S yields the private key w, where there exists a bit vector $\vec{\sigma}$ that includes N bits $\sigma_i$ such that $\vec{\sigma} = \langle \sigma_1, \sigma_2, \ldots, \sigma_N \rangle$, where for all i the bit $\sigma_i=1$ if $z_i \in S$ else the bit $\sigma_i=0$, where there exists an encrypted vector $\vec{d}$ that includes N ciphertexts $d_i$ such that $\vec{d} = \langle d_1, d_2, \ldots, d_N \rangle$, where for all i the ciphertext $d_i$ of the encrypted vector $\vec{d}$ is an encryption of the bit $\sigma_i$; means for post-processing the provided ciphertext element c by multiplying the provided ciphertext element c by all elements of the big set B to obtain an intermediate vector $\vec{y} = \langle y_1, y_2, \ldots, y_N \rangle$, where for all i the element $y_i$ of the intermediate vector $\vec{y}$ is computed as $y_i = c \times z_i$; means for homomorphically multiplying the elements $y_i$ of the intermediate vector $\vec{y}$ by the ciphertexts $d_i$ in the encrypted vector $\vec{d}$ to obtain a ciphertext vector $\vec{x}$ comprised of ciphertexts, where the ciphertext vector $\vec{x}$ includes N ciphertext elements $x_i$ such that $\vec{x} = \langle x_1, x_2, \ldots, x_N \rangle$, where for all i the ciphertext element $x_i$ in the ciphertext vector $\vec{x}$ is an encryption of the product $y_i \cdot \sigma_i$; and means for homomorphically summing all of the ciphertext elements $x_i$ of the ciphertext vector $\vec{x}$ to obtain a resulting ciphertext that comprises an encryption of the at least one bit b, where the big set B is partitioned into n parts $p_j$ with each of the n parts $p_j$ having a plurality of different elements from the big set B, where the elements $s_j$ of the small set S consist of one element from each of the n parts $p_j$.

An apparatus as in any above, further comprising means for storing at least one of the ciphertext, the at least one bit, the public key, the private key, the big set, the small set, the bit vector, the encrypted vector, the intermediate vector, the ciphertext vector and the resulting ciphertext. An apparatus as in any above, where the means for storing comprises at least one storage medium, memory or memory medium. An apparatus as in any above, where the means for providing, the means for post-processing, the means for homomorphically multiplying and the means for homomorphically summing comprise at least one processor, at least one processing component, at least one circuit or at least one integrated circuit. An apparatus as in any above, further comprising one or more additional aspects of the exemplary embodiments of the invention as described herein.

(25) In a further exemplary embodiment of the invention, an apparatus (e.g., for homomorphic decryption) comprising: first circuitry (e.g., input circuitry, first processing circuitry) configured to provide a ciphertext comprising a ciphertext element c that is obtained by encrypting at least one bit b using a public key h, where the public key h and a private key w collectively comprise an encryption key pair such that the private key w enables decryption of data that has been encrypted using the public key h to form a ciphertext, where there exists a big set B that includes N elements $z_i$ such that $B = \{z_1, z_2, \ldots, z_N\}$, where there exists a small set S that includes n elements $s_j$ such that $S = \{s_1, s_2, \ldots, s_n\}$, where the small set S is a subset of the big set B, where n<N, where n is an integer greater than one, where summing up the elements $s_j$ of the small set S yields the private key w, where there exists a bit vector $\vec{\sigma}$ that includes N bits $\sigma_i$ such that $\vec{\sigma} = \langle \sigma_1, \sigma_2, \ldots, \sigma_N \rangle$, where for all i the bit $\sigma_i=1$ if $z_i \in S$ else the bit $\sigma_i=0$, where there exists an encrypted vector $\vec{d}$ that includes N ciphertexts $d_i$ such that $\vec{d} = \langle d_1, d_2, \ldots, d_N \rangle$, where for all i the ciphertext $d_i$ of the encrypted vector $\vec{d}$ is an encryption of the bit $\sigma_i$; second circuitry (e.g., post-processing circuitry, second processing circuitry) configured to post-process the provided ciphertext element c by multiplying the provided ciphertext element c by all elements of the big set B to obtain an intermediate vector $\vec{y} = \langle y_1, y_2, \ldots, y_N \rangle$, where for all i the element $y_i$ of the intermediate vector $\vec{y}$ is computed as $y_i = c \times z_i$; third circuitry (e.g., homomorphic multiplication circuitry, third processing circuitry) configured to homomorphically multiply the elements $y_i$ of the intermediate vector $\vec{y}$ by the ciphertexts $d_i$ in the encrypted vector $\vec{d}$ to obtain a ciphertext vector $\vec{x}$ comprised of ciphertexts, where the ciphertext vector $\vec{x}$ includes N ciphertext elements $x_i$ such that $\vec{x} = \langle x_1, x_2, \ldots, x_N \rangle$, where for all i the ciphertext element $x_i$ in the ciphertext vector $\vec{x}$ is an encryption of the product $y_i \cdot \sigma_i$; and fourth circuitry (e.g., homomorphic summation circuitry, fourth processing circuitry) configured to homomorphically sum all of the ciphertext elements $x_i$ of the ciphertext vector $\vec{x}$ to obtain a resulting ciphertext that comprises an encryption of the at least one bit b, where the big set B is partitioned into n parts $p_j$ with each of the n parts $p_j$ having a plurality of different elements from the big set B, where the elements $s_j$ of the small set S consist of one element from each of the n parts $p_j$.

An apparatus as in any above, further comprising one or more additional aspects of the exemplary embodiments of the invention as described herein.

(26) In another exemplary embodiment of the invention, and as shown in FIG. 8, a method for homomorphic decryption, comprising: providing (e.g., by an apparatus, by at least one processor, by at least one processing component, by at least one integrated circuit, by hardware) a ciphertext comprising a ciphertext element c that is obtained by encrypting at least one bit b using a public key h, where the public key h and a private key w collectively comprise an encryption key pair such that the private key w enables decryption of data that has been encrypted using the public key h to form a ciphertext, where there exists a big set B that includes N elements $z_i$ such that $B=\{z_1, z_2, \ldots, z_N\}$, where there exists a small set S that includes n elements $s_j$ such that $S=\{s_1, s_2, \ldots, s_n\}$, where the small set S is a subset of the big set B, where n<N, where n is an integer greater than one, where summing up the elements $s_j$ of the small set S yields the private key w, where there exists a bit vector $\vec{\sigma}$ that includes N bits $\sigma_i$ such that $\vec{\sigma}=\langle \sigma_1, \sigma_2, \ldots, \sigma_N \rangle$, where for all i the bit $\sigma_i=1$ if $z_i \in S$ else the bit $\sigma_i=0$, where there exists an encrypted vector $\vec{d}$ that includes N ciphertexts $d_i$ such that $\vec{d}=\langle d_1, d_2, \ldots, d_N \rangle$, where for all i the ciphertext $d_i$ of the encrypted vector $\vec{d}$ is an encryption of the bit $\sigma_i$ (801); post-processing (e.g., by the apparatus) the provided ciphertext element c by multiplying the provided ciphertext element c by all elements of the big set B to obtain an intermediate vector $\vec{y}=\langle y_1, y_2, \ldots, y_N \rangle$, where for all i the element $y_i$ of the intermediate vector $\vec{y}$ is computed as $y_i=c \times z_i$ (802); homomorphically multiplying (e.g., by the apparatus) the elements $y_i$ of the intermediate vector $\vec{y}$ by the ciphertexts $d_i$ in the encrypted vector $\vec{d}$ to obtain a ciphertext vector $\vec{x}$ comprised of ciphertexts, where the ciphertext vector $\vec{x}$ includes N ciphertext elements $x_i$ such that $\vec{x}=\langle x_1, x_2, \ldots, x_N \rangle$, where for all i the ciphertext element $x_i$ in the ciphertext vector $\vec{x}$ is an encryption of the product $y_i \cdot \sigma_i$ (803); and homomorphically summing (e.g., by the apparatus) all of the ciphertext elements $x_i$ of the ciphertext vector $\vec{x}$ to obtain a resulting ciphertext that comprises an encryption of the at least one bit b, where the big set B is comprised of m geometric progressions $\vec{G}_k=\langle g_l \rangle$, where each geometric progression $\vec{G}_k$ comprises a plurality of different elements $z_i$ from the big set B, where m is an integer greater than zero, where for each geometric progression $\vec{G}_k$ a ratio of successive elements $g_l/g_{l-1}$ is the same for all l (804).

A method as in any above, where the private key w comprises at least one of: an integer, a vector, a matrix and an element in an algebraic ring. A method as in any above, where each of the n parts has N/n different elements from the big set B. A method as in any above, where the encrypted vector $\vec{d}$ is represented by n partial encrypted vectors $\vec{e}_j$, one for each part $p_j$ of the big set B, where for all j the partial encrypted vector $\vec{e}_j$ comprises $t_j$ ciphertexts, two of which are encryptions of 1 and the rest being encryptions of 0. A method as in any above, where each of the n parts $p_j$ comprises a geometric progression of elements $z_i$ from the big set B.

A computer program comprising machine readable instructions which when executed by an apparatus control it to perform the method as in any one of the preceding. A method as in any above, implemented as a computer program. A method as in any above, implemented as a program of instructions stored (e.g., tangibly embodied) on a program storage device (e.g., at least one memory, at least one computer-readable medium) and executable by a computer (e.g., at least one processor). A method as in any above, further comprising one or more aspects of the exemplary embodiments of the invention as described further herein.

(27) In a further exemplary embodiment of the invention, and as shown in FIG. 8, a computer readable storage medium (e.g., a memory, at least one memory, non-transitory) tangibly embodying a program of instructions executable by a machine (e.g., a processor, at least one processor, a computer) for performing operations for homomorphic decryption, the operations comprising providing a ciphertext comprising a ciphertext element c that is obtained by encrypting at least one bit b using a public key h, where the public key h and a private key w collectively comprise an encryption key pair such that the private key w enables decryption of data that has been encrypted using the public key h to form a ciphertext, where there exists a big set B that includes N elements $z_i$ such that $B=\{z_1, z_2, \ldots, z_N\}$, where there exists a small set S that includes n elements $s_j$ such that $S=\{s_1, s_2, \ldots, s_n\}$, where the small set S is a subset of the big set B, where n<N, where n is an integer greater than one, where summing up the elements $s_j$ of the small set S yields the private key w, where there exists a bit vector $\vec{\sigma}$ that includes N bits $\sigma_i$ such that $\vec{\sigma}=\langle \sigma_1, \sigma_2, \ldots, \sigma_N \rangle$, where for all i the bit $\sigma_i=1$ if $z_i \in S$ else the bit $\sigma_i=0$, where there exists an encrypted vector $\vec{d}$ that includes N ciphertexts $d_i$ such that $\vec{d}=\langle d_1, d_2, \ldots, d_N \rangle$, where for all i the ciphertext $d_i$ of the encrypted vector $\vec{d}$ is an encryption of the bit $\sigma_i$ (801); post-processing the provided ciphertext element c by multiplying the provided ciphertext element c by all elements of the big set B to obtain an intermediate vector $\vec{y}=\langle y_1, y_2, \ldots, y_N \rangle$, where for all i the element $y_i$ of the intermediate vector $\vec{y}$ is computed as $y_i=c \times z_i$ (802); homomorphically multiplying the elements $y_i$ of the intermediate vector $\vec{y}$ by the ciphertexts $d_i$ in the encrypted vector $\vec{d}$ to obtain a ciphertext vector $\vec{x}$ comprised of ciphertexts, where the ciphertext vector $\vec{x}$ includes N ciphertext elements $x_i$ such that $\vec{x}=\langle x_1, x_2, \ldots, x_N \rangle$, where for all i the ciphertext element $x_i$ in the ciphertext vector $\vec{x}$ is an encryption of the product $y_i \cdot \sigma_i$ (803); and homomorphically summing all of the ciphertext elements $x_i$ of the ciphertext vector $\vec{x}$ to obtain a resulting ciphertext that comprises an encryption of the at least one bit b, where the big set B is comprised of m geometric progressions $\vec{G}_k=\langle g_l \rangle$, where each geometric progression $\vec{G}_k$ comprises a plurality of different elements $z_i$ from the big set B, where m is an integer greater than zero, where for each geometric progression $\vec{G}_k$ a ratio of successive elements $g_l/g_{l-1}$ is the same for all l (804).

A computer readable storage medium as in any above, further comprising one or more additional aspects of the exemplary embodiments of the invention as described herein.

(28) In another exemplary embodiment of the invention, an apparatus (e.g., for homomorphic decryption) comprising: at least one storage medium configured to store a ciphertext comprising a ciphertext element c that is obtained by encrypting at least one bit b using a public key h, where the public key h and a private key w collectively comprise an encryption key pair such that the private key w enables decryption of data that has been encrypted using the public key h to form a ciphertext, where there exists a big set B that includes N elements $z_i$ such that $B=\{z_1, z_2, \ldots, z_N\}$, where there exists a small set S that includes n elements $s_j$ such that $S=\{s_1, s_2, \ldots, s_n\}$, where the small set S is a subset of the big set B, where n<N, where n is an integer greater than one, where summing up the elements $s_j$ of the small set S yields the private key w, where there exists a bit vector $\vec{\sigma}$ that includes N bits $\sigma_i$ such that $\vec{\sigma}=\langle \sigma_1, \sigma_2, \ldots, \sigma_N \rangle$, where for all i the bit $\sigma_i=1$ if $z_i \in S$ else the bit $\sigma_i=0$, where there exists an encrypted vector $\vec{d}$ that includes N ciphertexts $d_i$ such that $\vec{d}=\langle d_1, d_2, \ldots, d_N \rangle$, where for all i the ciphertext $d_i$ of the encrypted vector $\vec{d}$ is an encryption of the bit $\sigma_i$; and at least one processor configured to post-process the provided ciphertext element c by multiplying the provided ciphertext element c by all elements of the big set B to obtain an intermediate vector $\vec{y}=\langle y_1, y_2, \ldots, y_N \rangle$, where for all i the element $y_i$ of the intermediate vector $\vec{y}$ is computed as $y_i=c \times z_i$, where the at least one processor is further configured to homomorphically multiply the elements $y_i$ of the intermediate vector $\vec{y}$ by the ciphertexts $d_i$ in the encrypted vector $\vec{d}$ to obtain a ciphertext vector $\vec{x}$ comprised of ciphertexts, where the ciphertext vector $\vec{x}$ includes N ciphertext elements $x_i$ such that $\vec{x}=\langle x_1, x_2, \ldots, x_N \rangle$, where for all i the ciphertext element $x_i$ in the ciphertext vector $\vec{x}$ is an encryption of the product $y_i \cdot \sigma_i$, where the at least one processor is further configured to homomorphically sum all of the ciphertext elements $x_i$ of the ciphertext vector $\vec{x}$ to obtain a resulting ciphertext that comprises an encryption of the at least one bit b, where the big set B is comprised of m geometric progressions $\vec{G}_k=\langle g_l \rangle$, where each geometric progression $\vec{G}_k$ comprises a plurality of different elements $z_i$ from the big set B, where m is an integer greater than zero, where for each geometric progression $\vec{G}_k$ a ratio of successive elements $g_l/g_{l-1}$ is the same for all l.

An apparatus as in any above, further comprising one or more additional aspects of the exemplary embodiments of the invention as described herein.

(29) In a further exemplary embodiment of the invention, an apparatus (e.g., for homomorphic decryption) comprising: means for providing a ciphertext comprising a ciphertext element c that is obtained by encrypting at least one bit b using a public key h, where the public key h and a private key w collectively comprise an encryption key pair such that the private key w enables decryption of data that has been encrypted using the public key h to form a ciphertext, where there exists a big set B that includes N elements $z_i$ such that $B=\{z_1, z_2, \ldots, z_N\}$, where there exists a small set S that includes n elements $s_j$ such that $S=\{s_1, s_2, \ldots, s_n\}$, where the small set S is a subset of the big set B, where n<N, where n is an integer greater than one, where summing up the elements $s_j$ of the small set S yields the private key w, where there exists a bit vector $\vec{\sigma}$ that includes N bits $\sigma_i$ such that $\vec{\sigma}=\langle \sigma_1, \sigma_2, \ldots, \sigma_N \rangle$, where for all i the bit $\sigma_i=1$ if $z_i \in S$ else the bit $\sigma_i=0$, where there exists an encrypted vector $\vec{d}$ that includes N ciphertexts $d_i$ such that $\vec{d}=\langle d_1, d_2, \ldots, d_N \rangle$, where for all i the ciphertext $d_i$ of the encrypted vector $\vec{d}$ is an encryption of the bit $\sigma_i$; means for post-processing the provided ciphertext element c by multiplying the provided ciphertext element c by all elements of the big set B to obtain an intermediate vector $\vec{y}=\langle y_1, y_2, \ldots, y_N \rangle$, where for all i the element $y_i$ of the intermediate vector $\vec{y}$ is computed as $y_i=c \times z_i$; means for homomorphically multiplying the elements $y_i$ of the intermediate vector $\vec{y}$ by the ciphertexts $d_i$ in the encrypted vector $\vec{d}$ to obtain a ciphertext vector $\vec{x}$ comprised of ciphertexts, where the ciphertext vector $\vec{x}$ includes N ciphertext elements $x_i$ such that $\vec{x}=\langle x_1, x_2, \ldots, x_N \rangle$, where for all i the ciphertext element $x_i$ in the ciphertext vector $\vec{x}$ is an encryption of the product $y_i \cdot \sigma_i$; and means for homomorphically summing all of the ciphertext elements $x_i$ of the ciphertext vector $\vec{x}$ to obtain a resulting ciphertext that comprises an encryption of the at least one bit b, where the big set B is comprised of m geometric progressions $\vec{G}_k=\langle g_l \rangle$, where each geometric progression $\vec{G}_k$ comprises a plurality of different elements $z_i$ from the big set B, where m is an integer greater than zero, where for each geometric progression $\vec{G}_k$ a ratio of successive elements $g_l/g_{l-1}$ is the same for all l.

An apparatus as in any above, further comprising means for storing at least one of the ciphertext, the at least one bit, the public key, the private key, the big set, the small set, the bit vector, the encrypted vector, the intermediate vector, the ciphertext vector and the resulting ciphertext. An apparatus as in any above, where the means for storing comprises at least one storage medium, memory or memory medium. An apparatus as in any above, where the means for providing, the means for post-processing, the means for homomorphically multiplying and the means for homomorphically summing comprise at least one processor, at least one processing component, at least one circuit or at least one integrated circuit. An apparatus as in any above, further comprising one or more additional aspects of the exemplary embodiments of the invention as described herein.

(30) In another exemplary embodiment of the invention, an apparatus (e.g., for homomorphic decryption) comprising: first circuitry (e.g., input circuitry, first processing circuitry) configured to provide a ciphertext comprising a ciphertext element c that is obtained by encrypting at least one bit b using a public key h, where the public key h and a private key w collectively comprise an encryption key pair such that the private key w enables decryption of data that has been encrypted using the public key h to form a ciphertext, where there exists a big set B that includes N elements $z_i$ such that $B=\{z_1, z_2, \ldots, z_N\}$, where there exists a small set S that includes n elements $s_j$ such that $S=\{s_1, s_2, \ldots, s_n\}$, where the small set S is a subset of the big set B, where n<N, where n is an integer greater than one, where summing up the elements $s_j$ of the small set S yields the private key w, where there exists a bit vector $\vec{\sigma}$ that includes N bits $\sigma_i$ such that $\vec{\sigma}=\langle \sigma_1, \sigma_2, \ldots, \sigma_N \rangle$, where for all i the bit $\sigma_i=1$ if $z_i \in S$ else the bit $\sigma_i=0$, where there exists an encrypted vector $\vec{d}$ that includes N ciphertexts $d_i$ such that $\vec{d}=\langle d_1, d_2, \ldots, d_N \rangle$, where for all i the ciphertext $d_i$ of the encrypted vector $\vec{d}$ is an encryption of the bit $\sigma_i$; second circuitry (e.g., post-processing circuitry, second processing circuitry) configured to post-process the provided ciphertext element c by multiplying the provided ciphertext element c by all elements of the big set B to obtain an intermediate vector $\vec{y} = \langle y_1, y_2, \ldots, y_N \rangle$, where for all i the element $y_i$ of the intermediate vector $\vec{y}$ is computed as $y_i = c \times z_i$; third circuitry (e.g., homomorphic multiplication circuitry, third processing circuitry) configured to homomorphically multiply the elements $y_i$ of the intermediate vector $\vec{y}$ by the ciphertexts $d_i$ in the encrypted vector $\vec{d}$ to obtain a ciphertext vector comprised of ciphertexts, where the ciphertext vector $\vec{x}$ includes N ciphertext elements $x_i$ such that $\vec{x} = \langle x_1, x_2, \ldots, x_N \rangle$, where for all i the ciphertext element $x_i$ in the ciphertext vector $\vec{x}$ is an encryption of the product $y_i \cdot \sigma_i$; and fourth circuitry (e.g., homorphic summation circuitry, fourth processing circuitry) configured to homomorphically sum all of the ciphertext elements $x_i$ of the ciphertext vector $\vec{x}$ to obtain a resulting ciphertext that comprises an encryption of the at least one bit b, where the big set B is comprised of m geometric progressions $\vec{G_k} = \langle g_l \rangle$, where each geometric progression $\vec{G_k}$ comprises a plurality of different elements $z_i$ from the big set B, where m is an integer greater than zero, where for each geometric progression $\vec{G_k}$ a ratio of successive elements $g_l/g_{l-1}$ is the same for all l.

An apparatus as in any above, further comprising one or more additional aspects of the exemplary embodiments of the invention as described herein.

The exemplary embodiments of the invention, as discussed herein and as particularly described with respect to exemplary methods, may be implemented in conjunction with a program storage device (e.g., at least one memory) readable by a machine, tangibly embodying a program of instructions (e.g., a program or computer program) executable by the machine for performing operations. The operations comprise steps of utilizing the exemplary embodiments or steps of the method.

The blocks shown in FIGS. 2-5, 7 and 8 further may be considered to correspond to one or more functions and/or operations that are performed by one or more components, circuits, chips, apparatus, processors, computer programs and/or function blocks. Any and/or all of the above may be implemented in any practicable solution or arrangement that enables operation in accordance with the exemplary embodiments of the invention as described herein.

In addition, the arrangement of the blocks depicted in FIGS. 2-5, 7 and 8 should be considered merely exemplary and non-limiting. It should be appreciated that the blocks shown in FIGS. 2-5, 7 and 8 may correspond to one or more functions and/or operations that may be performed in any order (e.g., any suitable, practicable and/or feasible order) and/or concurrently (e.g., as suitable, practicable and/or feasible) so as to implement one or more of the exemplary embodiments of the invention. In addition, one or more additional functions, operations and/or steps may be utilized in conjunction with those shown in FIGS. 2-5, 7 and 8 so as to implement one or more further exemplary embodiments of the invention.

That is, the exemplary embodiments of the invention shown in FIGS. 2-5, 7 and 8 may be utilized, implemented or practiced in conjunction with one or more further aspects in any combination (e.g., any combination that is suitable, practicable and/or feasible) and are not limited only to the steps, blocks, operations and/or functions shown in FIGS. 2-5, 7 and 8.

Any use of the terms "connected," "coupled" or variants thereof should be interpreted to indicate any such connection or coupling, direct or indirect, between the identified elements. As a non-limiting example, one or more intermediate elements may be present between the "coupled" elements. The connection or coupling between the identified elements may be, as non-limiting examples, physical, electrical, magnetic, logical or any suitable combination thereof in accordance with the described exemplary embodiments. As non-limiting examples, the connection or coupling may comprise one or more printed electrical connections, wires, cables, mediums or any suitable combination thereof.

The term "geometric progression" or "geometric sequence" is afforded its conventional meaning for a sequence of numbers where each term after the first is found by multiplying the previous term by a fixed non-zero number, sometimes called the common ratio r. For example, the numbers $x_i$ in a geometric progression will satisfy the following relations for a ratio r:

$$x_i = r x_{i-1}$$
$$r = \frac{x_i}{x_{i-1}}$$

The homomorphic operations (e.g., multiplication, summation) described or referred to herein are afforded their conventional meaning of performing the operation(s) on encrypted data without requiring the decryption of said data and yielding a same result (e.g., barring noise). Non-limiting examples of suitable techniques for implementing these homomorphic operations are described by Gentry in [3].

It should be appreciated that the references herein to encryption and/or decryption may entail the usage of one or more encryption schemes, techniques or methods as known to one of ordinary skill in the art. As an example, different key sizes are available for the encryption scheme (e.g., 512, 1024, 2048, 4096, 8192, 32768, as measured in bits). As a further example, different hash functions may be used for the encryption/decryption, such as MD-4, MD-5, SHA-1 or SHA-2, as non-limiting examples.

As will be appreciated by one skilled in the art, exemplary embodiments of the present invention may be embodied as a system, method or computer program product. Accordingly, exemplary embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, exemplary embodiments of the present invention may take the form of a computer program product embodied in one or more program storage device(s) or computer readable medium(s) having computer readable program code embodied thereon.

Any combination of one or more program storage device(s) or computer readable medium(s) may be utilized. The computer readable medium may be a computer readable signal medium or a computer readable storage medium. As non-limiting examples, a computer readable storage medium may comprise one or more of: an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device (e.g., one or more processors).

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)).

Exemplary embodiments of the present invention are described herein with reference to flowchart illustrations and/or block diagrams of methods, apparatus (systems) and computer program products according to exemplary embodiments of the invention. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via at least one processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other device to cause a series of operational steps to be performed on the computer, other programmable apparatus or other device to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality and operation of possible implementations of systems, methods and computer program products according to various exemplary embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and possibly combinations of blocks in the block diagrams and/or flowchart illustration, can be implemented by special purpose hardware-based systems that perform the specified functions or acts, or combinations of special purpose hardware and software (e.g., computer instructions).

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications will still fall within the scope of the teachings of the exemplary embodiments of the invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method for computing, as part of a homomorphic encryption scheme, a resultant and a free term of a scaled inverse of a first polynomial v(x) modulo a second polynomial $f_n(x)$, comprising:

receiving at a computing system the first polynomial v(x) modulo the second polynomial $f_n(x)$, where the second polynomial is of a form $f_n(x)=x^n \pm 1$, where $n=2^k$ and k is an integer greater than 0;

computing by the computing system lowest two coefficients of a third polynomial g(z) that is a function of the first polynomial and the second polynomial, where $$g(z) \stackrel{def}{=} \prod_{i=0}^{n-1} (v(\rho_i) - z),$$

where $\rho_0, \rho_1, \ldots, \rho_{n-1}$ are roots of the second polynomial $f_n(x)$ over a field, where computing the lowest two coefficients of the third polynomial $g(z)$ comprises computing a fourth polynomial $h(z)$, where $h(z)=g(z) \bmod z^2$, and where computing the fourth polynomial comprises computing pairs of polynomials $U_j(x)$ and $V_j(x)$ for $j=0, 1, \ldots, \log n$, such that for all $j$ it holds that $g(z)$ is congruent modulo $z^2$ to a fifth polynomial $G_j(z)$, where $$G_j(z) \stackrel{def}{=} \prod_{i=0}^{\frac{n}{2^j}} (V_j(\rho_i^{2^j}) - zU_j(\rho_i^{2^j}));$$

outputting by the computing system the lowest coefficient of $g(z)$ as the resultant;

outputting by the computing system the second lowest coefficient of $g(z)$ divided by n as the free term of the scaled inverse of the first polynomial $v(x)$ modulo the second polynomial $f_n(x)$; and using by the computing system the outputted resultant and the outputted free term in operations for the homomorphic encryption scheme.

2. The method of claim 1, where $V_0(x)=v(x)$ and $U_0(x)=1$, where for every $j$ the polynomials $U_{j+1}(x^2)$ and $V_{j+1}(x^2)$ are defined as:

$$U_{j+1}(x^2) \stackrel{def}{=} U_j(x)V_j(-x) + U_j(-x)V_j(x) \bmod \left(x^{\frac{n}{2^j}} \pm 1\right) \text{ and}$$

$$V_{j+1}(x^2) \stackrel{def}{=} V_j(x)V_j(-x) \bmod \left(x^{\frac{n}{2^j}} \pm 1\right).$$

3. The method of claim 1, where the first polynomial $v(x)$ modulo the second polynomial $f_n(x)$ is derived from a sixth polynomial $u(x)$ such that $v(x)=x^i \cdot u(x) \bmod f_n(x)$, where i is an integer less than n: i<n.

4. The method of claim 3, where the free term of the scaled inverse of the first polynomial $v(x)$ modulo the second polynomial $f_n(x)$ comprises the i-th coefficient of the scaled inverse of $u(x)$.

5. The method of claim 1, where the free term of the scaled inverse of the first polynomial $v(x)$ modulo the second polynomial $f_n(x)$ is used as a private key for decryption of a ciphertext.

6. A computer readable storage device tangibly embodying a program of instructions executable by a machine for performing operations for computing, as part of a homomorphic encryption scheme, a resultant and a free term of a scaled inverse of a first polynomial $v(x)$ modulo a second polynomial $f_n(x)$, said operations comprising:

receiving the first polynomial $v(x)$ modulo the second polynomial $f_n(x)$, where the second polynomial is of a form $f_n(x)=x^n \pm 1$, where $n=2^k$ and k is an integer greater than 0;

computing lowest two coefficients of a third polynomial $g(z)$ that is a function of the first polynomial and the second polynomial, where $$g(z) \stackrel{def}{=} \prod_{i=0}^{n-1} (v(\rho_i) - z),$$

where $\rho_0, \rho_1, \ldots, \rho_{n-1}$ are roots of the second polynomial $f_n(x)$ over a field, where computing the lowest two coefficients of the third polynomial $g(z)$ comprises computing a fourth polynomial $h(z)$, where $h(z)=g(z) \bmod z^2$, and where computing the fourth polynomial comprises computing pairs of polynomials $U_j(x)$ and $V_j(x)$ for $j=0, 1, \ldots, \log n$, such that for all $j$ it holds that $g(z)$ is congruent modulo $z^2$ to a fifth polynomial $G_j(z)$, where $$G_j(z) \stackrel{def}{=} \prod_{i=0}^{\frac{n}{2^j}} (V_j(\rho_i^{2^j}) - zU_j(\rho_i^{2^j}));$$

outputting the lowest coefficient of $g(z)$ as the resultant;

outputting the second lowest coefficient of $g(z)$ divided by n as the free term of the scaled inverse of the first polynomial $v(x)$ modulo the second polynomial $f_n(x)$; and using the outputted resultant and the outputted free term in operations for the homomorphic encryption scheme.

7. The computer readable storage device of claim 6, where $V_0(x)=v(x)$ and $U_0(x)=1$, where for every $j$ the polynomials $U_{j+1}(x^2)$ and $V_{j+1}(x^2)$ are defined as:

$$U_{j+1}(x^2) \stackrel{def}{=} U_j(x)V_j(-x) + U_j(-x)V_j(x) \bmod \left(x^{\frac{n}{2^j}} \pm 1\right) \text{ and } V_{j+1}(x^2) \stackrel{def}{=}$$

$$V_j(x)V_j(-x) \bmod \left(x^{\frac{n}{2^j}} \pm 1\right).$$

8. The computer readable storage device of claim 6, where the first polynomial $v(x)$ modulo the second polynomial $f_n(x)$ is derived from a sixth polynomial $u(x)$ such that $v(x)=x^i \cdot u(x) \bmod f_n(x)$, where i is an integer less than n: i<n.

9. The computer readable storage device of claim 8, where the free term of the scaled inverse of the first polynomial $v(x)$ modulo the second polynomial $f_n(x)$ comprises the i-th coefficient of the scaled inverse of $u(x)$.

10. The computer readable storage device of claim 6, where the free term of the scaled inverse of the first polynomial $v(x)$ modulo the second polynomial $f_n(x)$ is used as a private key for decryption of a ciphertext.

11. An apparatus comprising:

at least one storage device configured to store a first polynomial $v(x)$ modulo a second polynomial $f_n(x)$, where the second polynomial is of a form $f_n(x)=x^n \pm 1$, where $n=2^k$ and k is an integer greater than 0; and at least one hardware processor configured to compute, as part of a homomorphic encryption scheme, a resultant and a free term of a scaled inverse of the first polynomial $v(x)$ modulo the second polynomial $f_n(x)$ by computing lowest two coefficients of a third polynomial $g(z)$ that is a function of the first polynomial and the second polynomial where $$g(z) \stackrel{def}{=} \prod_{i=0}^{n-1} (v(\rho_i) - z),$$

where $\rho_0, \rho_1, \ldots, \rho_{n-1}$ are roots of the second polynomial $f_n(x)$ over a field, where computing the lowest two coefficients of the third polynomial $g(z)$ comprises computing a fourth polynomial $h(z)$, where $h(z)=g(z) \bmod z^2$, and where computing the fourth polynomial comprises computing pairs of polynomials $U_j(x)$ and $V_j(x)$ for $j=0, 1, \ldots, \log n$, such that for all j it holds that $g(z)$ is congruent modulo $z^2$ to a fifth polynomial $G_j(z)$, where $$G_j(z) \stackrel{def}{=} \prod_{i=0}^{\frac{n}{2^j}} (V_j(\rho_i^{2^j}) - zU_j(\rho_i^{2^j}));$$

outputting the lowest coefficient of $g(z)$ as the resultant; outputting the second lowest coefficient of $g(z)$ divided by n as the free term of the scaled inverse of the first polynomial $v(x)$ modulo the second polynomial $f_n(x)$;: and using the outputted resultant and the outputted free term in operations for the homomorphic encryption scheme.

12. The apparatus of claim 11, where $V_0(x)=v(x)$ and $U_0(x)=1$, where for every j the polynomials $U_{j+1}(x^2)$ and $V_{j+1}(x^2)$ are defined as:

$$U_{j+1}(x^2) \stackrel{def}{=} U_j(x)V_j(-x) + U_j(-x)V_j(x) \bmod \left(x^{\frac{n}{2^j}} \pm 1\right) \text{ and } V_{j+1}(x^2) \stackrel{def}{=} V_j(x)V_j(-x) \bmod \left(x^{\frac{n}{2^j}} \pm 1\right).$$

13. The apparatus of claim 11, where the first polynomial $v(x)$ modulo the second polynomial $f_n(x)$ is derived from a sixth polynomial $u(x)$ such that $v(x)=x^i \cdot u(x) \bmod f_n(x)$, where i is an integer less than n: i<n.

14. The apparatus of claim 13, where the free term of the scaled inverse of the first polynomial $v(x)$ modulo the second polynomial $f_n(x)$ comprises the i-th coefficient of the scaled inverse of $u(x)$.

15. The apparatus of claim 11, where the free term of the scaled inverse of the first polynomial $v(x)$ modulo the second polynomial $f_n(x)$ is used as a private key for decryption of a ciphertext.

* * * * *